United States Patent
Otsuki et al.

[11] Patent Number: 6,155,668
[45] Date of Patent: Dec. 5, 2000

[54] PRINTER, METHOD OF PRINTING, AND COMPUTER PROGRAM PRODUCT TO ACTUALIZE THE PRINTER

[75] Inventors: Koichi Otsuki; Hiroaki Momose, both of Nagano-ken, Japan

[73] Assignee: Seiko Epson Corporation, Tokyo, Japan

[21] Appl. No.: 09/245,844

[22] Filed: Feb. 8, 1999

[30] Foreign Application Priority Data

Feb. 13, 1998 [JP] Japan .................................. 10-049057
Jun. 2, 1998 [JP] Japan .................................. 10-170635
Jul. 30, 1998 [JP] Japan .................................. 10-230060

[51] Int. Cl.$^7$ .............................. B41J 2/145; B41J 2/15; B41J 29/38
[52] U.S. Cl. ............................................. 347/41; 347/16
[58] Field of Search ................................. 347/41, 16, 12, 347/9, 104

[56] References Cited

U.S. PATENT DOCUMENTS 4,198,642 4/1980 Gamblin .................................. 347/41

FOREIGN PATENT DOCUMENTS 53-2040 1/1978 Japan .

Primary Examiner—Thinh Nguyen
Attorney, Agent, or Firm—Oblon, Spivak, McClelland, Maier & Neustadt, P.C.

[57] ABSTRACT

The technique of extending a printable area, in which an image can be recorded, by carrying out a sub-scan with rollers in a delivering section of a printer having a lower accuracy of sheet feeding often causes dropout of raster lines and thereby deteriorates the picture quality of a resulting printed image. In an ink jet printer of the present invention, the interlace method is applied to record an image in a first area where rollers in a feeding section ensure the accuracy of sheet feeding, in order to attain the high picture quality. The printable area Is extended to a second area, where the rollers in the delivering section are used to carry out the sheet feeding of the lower accuracy after the lower end of a printing medium comes off the rollers in the feeding section. In the present invention, recording of dots is carried out by the interlace method with a reduced number of working nozzles in the second area. This decreases each amount of sub-scan and thereby reduces an error in sheet feeding. The method of enabling each raster line to be formed with different nozzles or the method of creating large dots having a greater diameter may also be applied to form raster lines in the second area. Single or combined application of these techniques significantly improves the picture quality in the second area.

24 Claims, 39 Drawing Sheets

Fig. 7
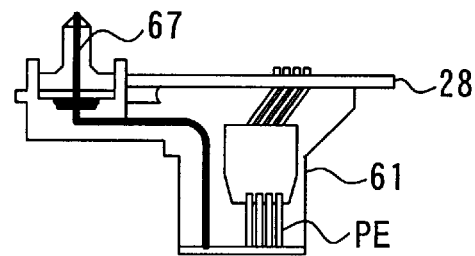
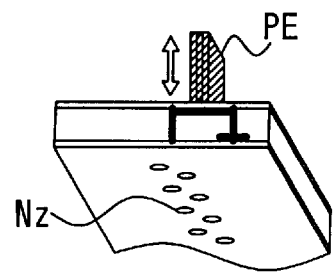
Fig. 8
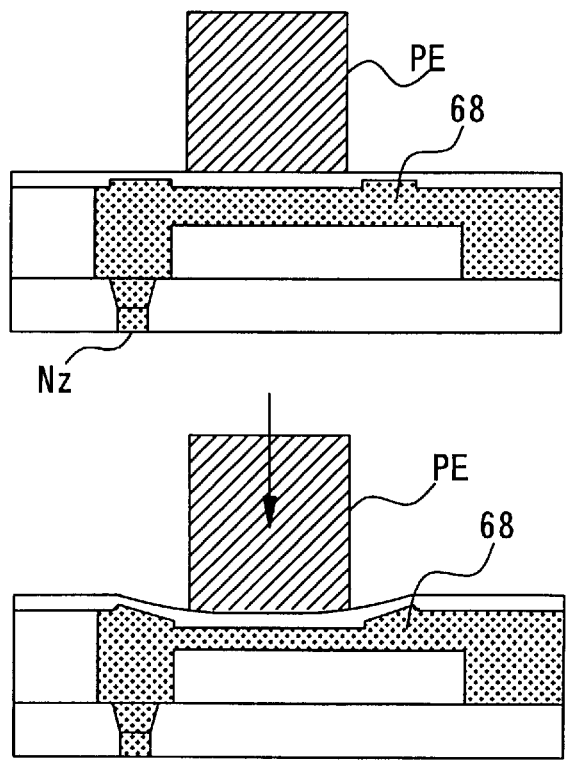

Fig. 10
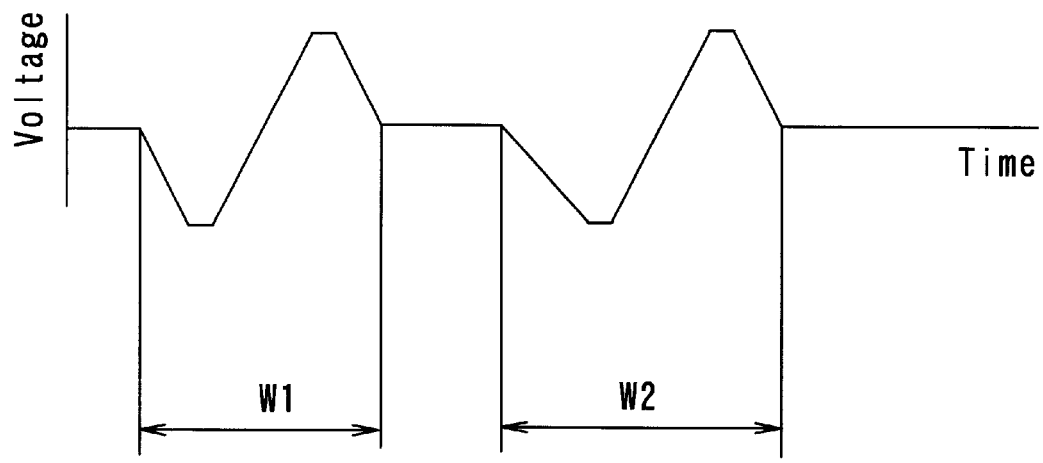
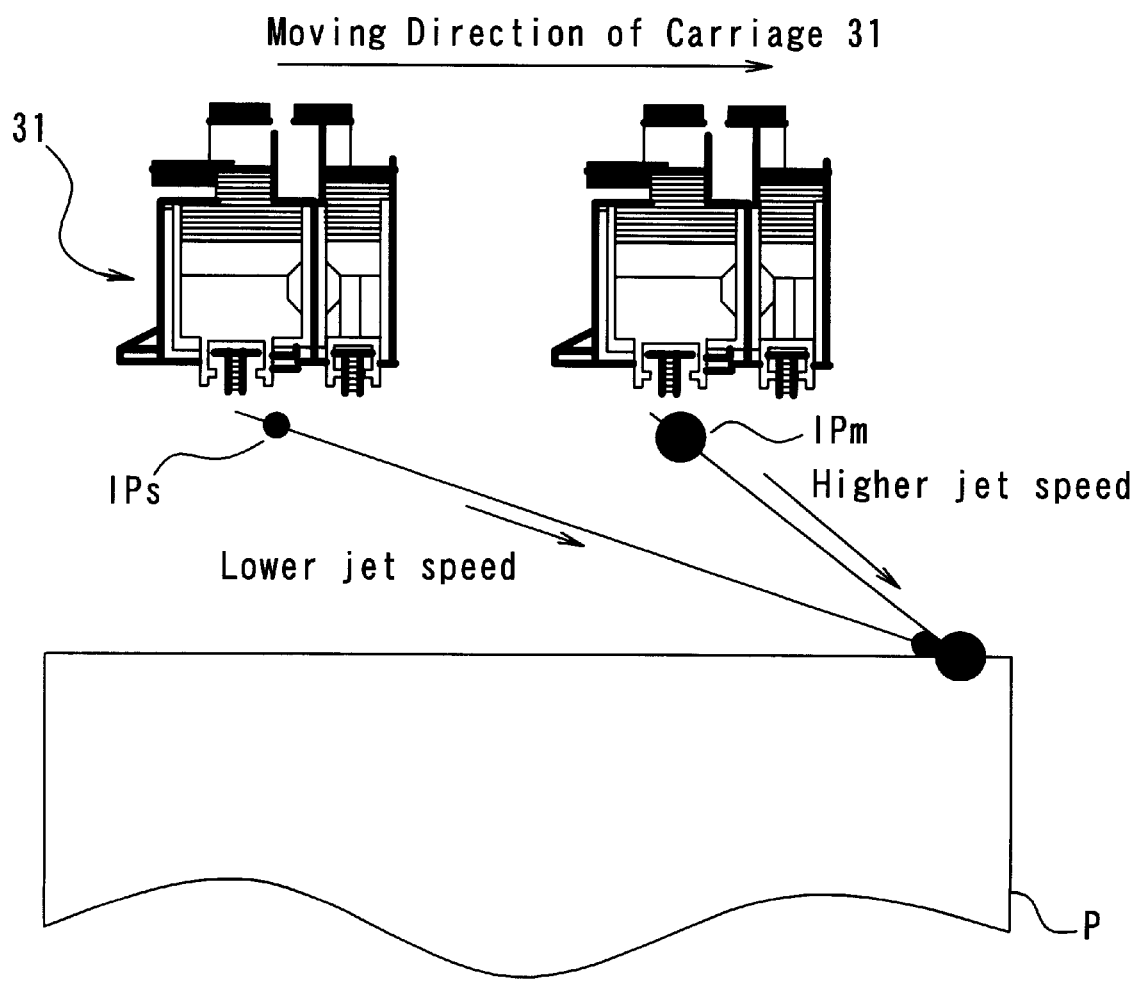

Fig.16

| Passes | P1 | P2 | P3 | P4 | P5 | P6 | P7 | P8 | P9 | P10 | P11 |
|---|---|---|---|---|---|---|---|---|---|---|---|
| Feeding Amounts | 7 | 7 | 7 | 7 | 4 | 3 | 3 | 3 | 5 | 3 | 3 |
| | Standard Printing | | | | Intermediate Processing | | | | Extension Printing | | |
| Nozzle Nos. | | | | | | | | | | | |
| #1 | -52 | -45 | -38 | -31 | n/a | -24 | n/a | n/a | n/a | n/a | n/a |
| #2 | -48 | -41 | -34 | -27 | n/a | -20 | -17 | n/a | n/a | n/a | n/a |
| #3 | -44 | -37 | -30 | -23 | n/a | -16 | -13 | -10 | n/a | n/a | 1 |
| #4 | -40 | -33 | -26 | -19 | n/a | -12 | -9 | -6 | n/a | 2 | 5 |
| #5 | -36 | -29 | -22 | -15 | n/a | -8 | -5 | -2 | 3 | 6 | 9 |
| #6 | -32 | -25 | -18 | -11 | n/a | -4 | -1 | n/a | n/a | n/a | n/a |
| #7 | -28 | -21 | -14 | -7 | -3 | 0 | n/a | n/a | n/a | n/a | n/a | n/a  Data mask operation

| Passes | P1 | P2 | P3 | P4 | P5 | P6 | P7 | P8 | P9 | P10 | P11 |
|---|---|---|---|---|---|---|---|---|---|---|---|
| Feeding Amounts | 7 | 7 | 7 | 7 | 4 | 3 | 3 | 3 | 7 | 5 | 5 |
| Nozzle Nos | Standard Printing | | | | Intermediate Processing | | | | Extension Printing | | |
| #1 | -52 | -45 | -38 | -31 | n/a | -24 | n/a | n/a | n/a | n/a | n/a |
| #2 | -48 | -41 | -34 | -27 | n/a | -20 | -17 | n/a | n/a | n/a | 3 |
| #3 | -44 | -37 | -30 | -23 | n/a | -16 | -13 | -10 | n/a | 2 | 7 |
| #4 | -40 | -33 | -26 | -19 | n/a | -12 | -9 | -6 | 1 | 6 | 11 |
| #5 | -36 | -29 | -22 | -15 | n/a | -8 | -5 | -2 | 5 | 10 | 15 |
| #6 | -32 | -25 | -18 | -11 | n/a | -4 | -1 | n/a | n/a | n/a | n/a |
| #7 | -28 | -21 | -14 | -7 | -3 | 0 | n/a | n/a | n/a | n/a | n/a |

| Passes | P1 | P2 | P3 | P4 | P5 | P6 | P7 | P8 | P9 | P10 | P11 | P12 | P13 | P14 | P15 |
|---|---|---|---|---|---|---|---|---|---|---|---|---|---|---|---|
| Feeding Amounts | 7 | 7 | 7 | 7 | 7 | 7 | 7 | 4 | 1 | 1 | 1 | 1 | 1 | 1 | 1 |
| Pass Nos. | -14 | -13 | -12 | -11 | -10 | -9 | -8 | -7 | -6 | -5 | -4 | -3 | -2 | -1 | 0 |
| Nozzle Nos. | | | Standard Printing | | | | | | | | | Intermediate Processing | | | |
| #1 | -101 | -94 | -87 | -80 | -73 | -66 | -59 | n/a | n/a | n/a | -52 | n/a | n/a | n/a | n/a |
| #2 | -93 | -86 | -79 | -72 | -65 | -58 | -51 | n/a | n/a | -45 | -44 | n/a | n/a | n/a | n/a |
| #3 | -85 | -78 | -71 | -64 | -57 | -50 | -43 | n/a | -38 | -37 | -36 | n/a | n/a | n/a | n/a |
| #4 | -77 | -70 | -63 | -56 | -49 | -42 | -35 | -31 | -30 | -29 | -28 | n/a | n/a | n/a | -24 |
| #5 | -69 | -62 | -55 | -48 | -41 | -34 | -27 | -23 | -22 | -21 | -20 | n/a | n/a | -17 | -16 |
| #6 | -61 | -54 | -47 | -40 | -33 | -26 | -19 | -15 | -14 | -13 | -12 | n/a | -10 | -9 | -8 |
| #7 | -53 | -46 | -39 | -32 | -25 | -18 | -11 | -7 | -6 | -5 | -4 | -3 | -2 | -1 | 0 |

FIG. 22B

| Passes | P16 | P17 | P18 | P19 | P20 | P21 | P22 | P23 | P24 |
|---|---|---|---|---|---|---|---|---|---|
| Feeding Amounts | 21 | 5 | 5 | 5 | 5 | 5 | 5 | 5 | 5 |
| Pass Nos. | 1 | 2 | 3 | 4 | 5 | 6 | 7 | 8 | 9 |
| Nozzle Nos. | | | Extension Printing | | | | | | |
| #1 | n/a | n/a | n/a | n/a | n/a | n/a | 3 | 8 | 13 |
| #2 | n/a | n/a | n/a | n/a | 1 | 6 | 11 | 16 | n/a |
| #3 | n/a | n/a | n/a | 4 | 9 | 14 | n/a | n/a | n/a |
| #4 | n/a | 2 | 7 | 12 | n/a | n/a | n/a | n/a | n/a |
| #5 | 5 | 10 | 15 | n/a | n/a | n/a | n/a | n/a | n/a |
| #6 | n/a | n/a | n/a | n/a | n/a | n/a | n/a | n/a | n/a |
| #7 | n/a | n/a | n/a | n/a | n/a | n/a | n/a | n/a | n/a |

| Passes | P1 | P2 | P3 | P4 | P5 | P6 | P7 | P8 | P9 | P10 | P11 | P12 | P13 |
|---|---|---|---|---|---|---|---|---|---|---|---|---|---|
| Feeding Amounts | 7 | 7 | 7 | 7 | 4 | 3 | 3 | 3 | 11 | 2 | 3 | 4 | 5 |
| Nozzle Nos. | Standard Printing | | | | Intermediate Processing | | | | Extension Printing | | | | |
| #1 | -52 | -45 | -38 | -31 | n/a | -24 | n/a | n/a | n/a | n/a | 2 | 4 | 9 |
| #2 | -48 | -41 | -34 | -27 | n/a | -20 | -17 | n/a | n/a | 3 | 6 | 8 | n/a |
| #3 | -44 | -37 | -30 | -23 | n/a | -16 | -13 | -10 | 1 | 7 | 10 | n/a | n/a |
| #4 | -40 | -33 | -26 | -19 | n/a | -12 | -9 | -6 | 5 | n/a | n/a | n/a | n/a |
| #5 | -36 | -29 | -22 | -15 | n/a | -8 | -5 | -2 | n/a | n/a | n/a | n/a | n/a |
| #6 | -32 | -25 | -18 | -11 | n/a | -4 | -1 | n/a | n/a | n/a | n/a | n/a | n/a |
| #7 | -28 | -21 | -14 | -7 | -3 | 0 | n/a | n/a | n/a | n/a | n/a | n/a | n/a | n/a   Data mask operation

Fig.25

| Passes | P1 | P2 | P3 | P4 | P5 | P6 | P7 | P8 | P9 | P10 | P11 | P12 | P13 | P14 | P15 | P16 |
|---|---|---|---|---|---|---|---|---|---|---|---|---|---|---|---|---|
| Feeding Amounts | 7 | 7 | 7 | 7 | 4 | 3 | 3 | 3 | 3 | 1 | 1 | 1 | 1 | 1 | 1 | 1 |
| Nozzle Nos. | Standard Printing | | | | Intermediate Processing | | | | Extension Printing | | | | | | | |
| #1 | -52 | -45 | -38 | -31 | n/a | -24 | n/a | n/a | n/a | n/a | n/a | n/a | n/a | n/a | n/a | n/a |
| #2 | -48 | -41 | -34 | -27 | n/a | -20 | -17 | n/a | n/a | n/a | n/a | n/a | n/a | n/a | n/a | n/a |
| #3 | -44 | -37 | -30 | -23 | n/a | -16 | -13 | -10 | n/a | n/a | n/a | n/a | n/a | n/a | n/a | n/a |
| #4 | -40 | -33 | -26 | -19 | n/a | -12 | -9 | -6 | 1 | 2 | 3 | 4 | 5 | 6 | 7 | 8 |
| #5 | -36 | -29 | -22 | -15 | n/a | -8 | -5 | -2 | n/a | n/a | n/a | n/a | n/a | n/a | n/a | n/a |
| #6 | -32 | -25 | -18 | -11 | n/a | -4 | -1 | n/a | n/a | n/a | n/a | n/a | n/a | n/a | n/a | n/a |
| #7 | -28 | -21 | -14 | -7 | -3 | 0 | n/a | n/a | n/a | n/a | n/a | n/a | n/a | n/a | n/a | n/a | n/a   Data mask operation

Fig.31

| Passes | P1 | P2 | P3 | P4 | P5 | P6 | P7 | P8 | P9 | P10 | P11 | P12 | P13 | P14 | P15 | P16 |
|---|---|---|---|---|---|---|---|---|---|---|---|---|---|---|---|---|
| Feeding Amounts | 7 | 7 | 7 | 7 | 4 | 3 | 3 | 3 | 3 | 1 | 1 | 1 | 1 | 1 | 1 | 1 |
| Nozzle Nos. | Standard Printing | | | | Intermediate Processing | | | | Extension Printing | | | | | | | |
| #1 | -52 | -45 | -38 | -31 | n/a | -24 | n/a | n/a | n/a | n/a | n/a | n/a | n/a | n/a | n/a | n/a |
| #2 | -48 | -41 | -34 | -27 | n/a | -20 | -17 | n/a | n/a | n/a | n/a | n/a | n/a | n/a | n/a | n/a |
| #3 | -44 | -37 | -30 | -23 | n/a | -16 | -13 | -10 | n/a | n/a | n/a | n/a | n/a | n/a | n/a | n/a |
| #4 | -40 | -33 | -26 | -19 | n/a | -12 | -9 | -6 | 1 | n/a | n/a | n/a | 1 | 2 | 3 | 4 |
| #5 | -36 | -29 | -22 | -15 | n/a | -8 | -5 | -2 | n/a | 2 | 3 | 4 | 5 | 6 | 7 | 8 |
| #6 | -32 | -25 | -18 | -11 | n/a | -4 | -1 | n/a | n/a | n/a | n/a | n/a | n/a | n/a | n/a | n/a |
| #7 | -28 | -21 | -14 | -7 | -3 | 0 | n/a | n/a | n/a | n/a | n/a | n/a | n/a | n/a | n/a | n/a |
| Position in Main Scanning Direction | | | | | | | | | Even | Even | Even | Even | Odd | Odd | Odd | Odd |

Even means that dots of even numbers in the main scanning direction are recorded.
Odd means that dots of odd numbers in the main scanning direction are recorded.

| Passes | P1 | P2 | P3 | P4 | P5 | P6 | P7 | P8 | P9 | P10 | P11 | P12 | P13 | P14 | P15 | P16 |
|---|---|---|---|---|---|---|---|---|---|---|---|---|---|---|---|---|
| Feeding Amounts | 3 | 3 | 3 | 3 | 3 | 3 | 3 | 3 | 2 | 1 | 1 | 1 | 1 | 1 | 1 | 1 |
| Pass Nos. | -15 | -14 | -13 | -12 | -11 | -10 | -9 | -8 | -7 | -6 | -5 | -4 | -3 | -2 | -1 | 0 |
| Nozzle Nos. | | | | Standard Printing | | | | | | | | Intermediate Processing | | | | |
| #1 | -46 | -43 | -40 | -37 | -34 | -31 | -28 | -25 | n/a | n/a | n/a | n/a | n/a | n/a | n/a | n/a |
| #2 | -42 | -39 | -36 | -33 | -30 | -27 | -24 | -21 | -22 | -18 | n/a | -16 | n/a | n/a | n/a | n/a |
| #3 | -38 | -35 | -32 | -29 | -26 | -23 | -20 | -17 | -19 | -18 | -16 | -12 | n/a | -10 | n/a | n/a |
| #4 | -34 | -31 | -28 | -25 | -22 | -19 | -16 | -13 | -15 | -14 | -13 | -8 | -7 | -6 | n/a | -4 |
| #5 | -30 | -27 | -24 | -21 | -18 | -15 | -12 | -9 | -11 | -9 | -5 | -4 | -3 | -2 | -1 | 0 |
| #6 | -26 | -23 | -20 | -17 | -14 | -11 | -8 | -5 | -7 | -6 | -2 | -1 | 0 | n/a | n/a | n/a |
| Position in Main Scanning Direction | Even | Odd | Even | Odd | Even | Odd | Even | Odd | Even | Odd | Even | Odd | Even | Odd | Even | Odd |

FIG. 37B

| Passes | P17 | P18 | P19 | P20 | P21 | P22 |
|---|---|---|---|---|---|---|
| Feeding Amounts | 13 | 1 | 1 | 1 | 1 | 1 |
| Pass Nos. | 1 | 2 | 3 | 4 | 5 | 6 |
| Nozzle Nos. | | Extension Printing | | | | |
| #1 | n/a | n/a | n/a | n/a | 1 | 2 |
| #2 | 1 | 2 | 3 | 4 | 5 | 6 |
| #3 | n/a | n/a | n/a | n/a | n/a | n/a |
| #4 | n/a | n/a | n/a | n/a | n/a | n/a |
| #5 | n/a | n/a | n/a | n/a | n/a | n/a |
| #6 | n/a | n/a | n/a | n/a | n/a | n/a |
| Position in Main Scanning Direction | Even | Odd | Even | Odd | Odd | Even |

Even means that dots of even numbers in the main scanning direction are recorded.
Odd means that dots of odd numbers in the main scanning direction are recorded.

PRINTER, METHOD OF PRINTING, AND COMPUTER PROGRAM PRODUCT TO ACTUALIZE THE PRINTER

BACKGROUND OF THE INVENTION

1. Field of the Invention

The present invention relates to a technique that forms raster lines while carrying out sub-scan to print an image, and more specifically to a technique of extending a printable area in which an image can be recorded.

2. Description of the Related Art

Typical examples of the printer that forms raster lines while carrying out sub-scan so as to print an image on a printing medium according to input image data include a line printer that forms raster lines without main scan, which moves a head forward and backward relative to the printing medium, and a serial scan printer and a drum scan printer that form raster lines with the main scan of the head. These printers, especially ink jet printers use a nozzle array having a plurality of nozzles arranged in a sub-scanning direction for each color, with a view to enhancing the printing speed. The recent trend increases the number of nozzles arranged in the sub-scanning direction and thereby the size of the nozzle array, In order to attain the high-speed printing.

One recording method applied for such printers to improve the picture quality is the technique called the 'interlace method' disclosed in, for example, U.S. Pat. No. 4,198,642 and JAPANESE PATENT LAID-OPEN GAZETTE No. 53-2040. FIG. 43 shows an example of the interlace method. A variety of parameters used in the following description are explained first. In the example of FIG. 43, the number of nozzles N used for dot creation is equal to 3. A nozzle pitch k [dots] represents the ratio of an interval between the centers of adjoining nozzles on the print head to a dot pitch w of the resulting recorded image. In the example of FIG. 43, the nozzle pitch k is equal to 2. Since each raster line or main scanning line is recorded by one pass of the main scan in the example of FIG. 43, the number of repeated scans s is equal to 1. The number of repeated scans s represents the number of passes of the main scan that enable each raster line to be filled with dots. As described later, when the number of repeated scans s is equal to or greater than 2, each pass of the main scan records the dots in an intermittent manner in the main scanning direction. The symbol L in FIG. 43 represents the amount of sheet feeding in the sub-scan and corresponds to 3 raster lines in this example.

The circles including two digits represent the recorded positions of the dots. The left digit denotes the nozzle number, and the right digit denotes the order of recording (that is, which pass of the main scan records the dot).

In the interlace method shown in FIG. 43, the first pass of the main scan creates dots on the respective raster lines with the nozzles #2 and #3, whereas the nozzle #1 does not create any dots. After the sheet feeding of 3 raster lines, the second pass of the main scan forms raster lines with the nozzles #1 through #3. The subsequent procedure repeats the sheet feeding of 3 raster lines and formation of raster lines by the respective passes of the main scan, so as to complete an image. The nozzle #1 does not form a raster line in the first pass of the main scan, because no dots are created on an adjoining raster line located immediately below the raster line by the second or any subsequent pass of the main scan.

The interlace method forms raster lines in this intermittent manner in the sub-scanning direction to complete an image.

One major advantage of the interlace method is that the variations in nozzle pitch and ink spout characteristics can be dispersed on the resulting recorded image. Even if there are variations in nozzle pitch and ink spout characteristics, this method relieves the effects of the variations and thereby improves the picture quality. The example of FIG. 43 regards the case in which the respective raster lines are formed by one pass of the main scan at a specific nozzle pitch. The interlace method is, however, applicable to a variety of settings. For example, the amount of sheet feeding may be varied arbitrarily according to the nozzle pitch, the number of nozzles, and the number of repeated scans.

The interlace method is an extremely effective dot recording technique to improve the picture quality. This method, however, inevitably causes a non-printable area, in which an image can not be recorded, on the lower end of a printing medium when the recording starts from the upper end of the printing medium. FIG. 44 shows the state of dot creation according to the interlace method by the sheet feeding of 7 raster lines with a head having seven nozzles arranged at a nozzle pitch corresponding to 4 raster lines. The symbols P1, P2, . . . in FIG. 44 denote the passes of the main scan, for example, the first pass of the main scan and the second pass of the main scan. The circles including numerals represent the positions of the nozzles in the sub-scanning direction on each pass of the main scan. The encircled numerals denote the nozzle numbers. As a matter of convenience, raster numbers RN are allocated to the respective raster lines. The interlace method is adopted in this example, where each raster line is formed by one pass of the main scan at the corresponding nozzle position.

FIG. 44 shows six passes of the main scan in the vicinity of the lower end of the printing medium. The nozzle #7 in the pass P6 of the main scan is located at the lower-end limit position of the nozzle according to the mechanism of sheet feeding. The sheet feeding mechanism is described with the drawing of FIG. 4.

The sheet feeding mechanism of the printer generally includes two pairs of rollers in a feeding section and a delivering section of the printing medium. In the example of FIG. 4, the rollers in the feeding section of the printing medium include a feeding roller 25a and a follower roller 25b, whereas the rollers in the delivering section of the printing medium include a delivering roller 27a and a star-wheel roller 27b. The accuracy of sheet feeding in the sub-scan is generally ensured by either one of the two pairs of rollers in the feeding section and in the delivering section. In the case where the rollers in the feeding section ensure the accuracy of sheet feeding, the limit of image recording with the sufficient accuracy of sub-scan is the position at which the lower end of the printing medium comes off the feeding roller 25a and the follower roller 25b. The distance between the lower end of the head and the lower end of the printing medium at this moment is determined according to the positions of the feeding roller 25a and the follower roller 25b and is equal to the distance 'a' shown in FIG. 4. The nozzle #7 in the pass P6 of the main scan in FIG. 44 corresponds to the nozzle at such a limit position.

When the image is recorded by the fixed amount of sheet feeding corresponding to 7 raster lines in this state, there is dropout of a raster line RN=−10 as shown in FIG. 44. Adoption of the interlace method accordingly causes the image to be recorded only up to the limit of an area A shown in FIG. 44. According to the combination of sheet feeding amounts in the interlace method, the printable area may be reduced to the position of the nozzle #1 in the pass P6 of the main scan (that is, the area of RN≦−17) in the worst case.

When the head has a width 'h' in the sub-scanning direction, there is a non-printable area corresponding to the distance 'a+h' from the lower end of the printing medium as shown in FIG. 4. The non-printable area is further extended, because the possible errors in sheet feeding require some additional margin.

The non-printable area is negligible in the case of a relatively small-sized nozzle array, that is, when the width 'h' of the head shown in FIG. 4 is relatively small. The recent trend that increases the size of the nozzle array, however, results in a significantly large non-printable area. The large non-printable area significantly damages the advantages of the printer that records the image of high picture quality at a high speed.

After the printing medium comes off the rollers in the feeding section that ensure the accuracy of sheet feeding in the sub-scan, it is possible to continue the sub-scan with the rollers in the delivering section that give only the lower accuracy of sheet feeding. One possible procedure reduces the non-printable area by forming raster lines while carrying out such sheet feeding with the lower accuracy. For example, the pass P7 of the main scan shown in FIG. 44 solves the problem of dropout of raster lines and extends the printable area of the image. In principle, this technique enables the image to be recorded to the lower end of the printing medium.

The dot recording with the lower accuracy of sheet feeding in the sub-scan naturally lowers the picture quality. FIGS. 47 and 48 show a deterioration of picture quality when the accuracy of sheet feeding is lowered. FIG. 45 shows dots recorded in a predetermined area in the case where the sufficient accuracy of sub-scan is ensured. For better understanding of illustration, the raster lines filled with dots are shown alternately by the solid line and the broken line. In the state of FIG. 45, the dots are arranged at fixed recording pitches both in the main scanning direction and in the sub-scanning direction. The dots generally have the size that enables partial overlap with the adjoining dots. The predetermined area is accordingly filled with dots as shown in FIG. 45.

FIG. 46 shows dots recorded in the same area in the case where the sufficient accuracy of sub-scan is not ensured. Even in this case, the sufficient accuracy of main scan is ensured, so that the dots are created at a fixed recording pitch in the main scanning direction. The error in sub-scan, however, varies the recording pitch in the sub-scanning direction. This causes a part having a higher density of dots in the sub-scanning direction, such as an area a1, and a part having a lower density of dots, such as an area a2. The variation in density of dots is visually recognized as unevenness of density that is not included in the original image data and undesirably lowers the picture quality. In some cases, there is even dropout of dots like an area a3 in FIG. 46. The human vision is extremely sensitive to such dropout. The occurrence of such dropout thus significantly damages the picture quality. The interlace method is generally adopted to improve the picture quality, and such deterioration of picture quality is not negligible.

An increase in number of passes of the main scan in the interlace recording process prevents the occurrence of dropout of dots and improves the picture quality of the resulting image. The increase in number of passes of the main scan, however, undesirably lowers the printing speed. The performances of the printer depend upon both the picture quality of the resulting image and the printing speed. There have been no conventional techniques that improve the picture quality in the extended printable area without lowering the printing performances. This problem also arises in the printers that create dots without the main scan of the head.

SUMMARY OF THE INVENTION

The object of the present invention is thus to provide a technique of dot creation by the interlace method, which enables extension of a printable area, in which an image can be recorded, by carrying out formation of raster lines even in the state of sub-scan with a lower accuracy of sheet feeding, as well as improvement in picture quality in the extended printable area without lowering the printing performance.

At least part of the above and the other related objects is realized by a printer that forms a plurality of raster lines with a head, each raster line consisting of an array of dots aligned in a raster-forming direction, which is one direction of a printing medium, and carries out a sub-scan that moves the head in a sub-scanning direction, which is another direction crossing the raster-forming direction, relative to the printing medium, thereby printing an image corresponding to input image data on the printing medium. The printer includes: the head having a plurality of nozzles that can create dots of an identical color and are arranged in the sub-scanning direction at a fixed interval; a raster-forming unit that drives the head to form the plurality of raster lines; a first sub-scan unit that carries out the sub-scan with a first accuracy; a second sub-scan unit that carries out the sub-scan with a second accuracy, which is lower than the first accuracy, when the printing medium is located at a position that does not allow the first sub-scan unit to carry out the sub-scan; a first control unit that controls the first sub-scan unit and the raster-forming unit in a first area where the first sub-scan unit carries out the sub-scan to record the image; and a second control unit that controls the second sub-scan unit and the raster-forming unit in a second area where the second sub-scan unit carries out the sub-scan to compensate for a decrease in accuracy of the sub-scan and form the raster lines.

In the printer of the present invention, the resulting printed image has two areas. The image is recorded while carrying out the sub-scan with a first accuracy in the first area. The image is recorded while carrying out the sub-scan with a second accuracy, which is lower than the first accuracy, in the second area. This arrangement extends a printable area, in which the image can be recorded, compared with the conventional printer that forms the image while carrying out the sub-scan only with the first accuracy. The printer of the present invention forms the raster lines in such a manner that compensates for a decrease in accuracy of the sub-scan in the second area, thereby improving the picture quality in the second area. The technique of dot creation applied for the second area is different from that applied for the first area. The printer of the present invention adopts the different printing techniques in the first area and the second area according to the accuracy of sheet feeding. This arrangement effectively improves the picture quality in the second area without lowering the picture quality in the first area or decreasing the printing speed.

In the printer of the present invention, a variety of arrangements may be applied for the second control unit.

In accordance with a first preferable application of the printer, the second control unit controls the raster-forming unit and the second sub-scan unit to form the raster lines while carrying out the sub-scan in the second area by a predetermined amount of sheet feeding that is smaller than a mean amount of sheet feeding in the first area.

The smaller amount of sheet feeding in each sub-scan generally results in a smaller error in sheet feeding. This preferable arrangement thus ensures the sufficient picture quality in the second area.

In this first application, the predetermined amount of sheet feeding by the second control unit may be equal to one raster line.

The fine sheet feeding of one raster line is the smallest possible amount of sub-scan, which minimizes the error in sheet feeding.

In the first application, the second control unit carries out the sub-scan to enable adjoining raster lines to be formed with different nozzles included in a set of nozzles selected as raster-forming nozzles among the plurality of nozzles mounted on the head.

In the printer of this structure, raster lines are formed only with the set of nozzles selected among the plurality of nozzles mounted on the head. The smaller number of raster-forming nozzles naturally decreases the amount of sheet feeding in the sub-scan and thereby reduces the error in sheet feeding in the second area where the sub-scan is carried out with the second accuracy.

In this printer, the sub-scan is carried out in such a manner that enables the adjoining raster lines to be formed with different nozzles. This technique of sub-scan effectively disperses the positional deviations of dots due to the mechanical errors of nozzles in the process of manufacture, thereby further improving the picture quality of the resulting printed image.

In the printer that forms adjoining raster lines with different nozzles, it is preferable that the second control unit carries out the sub-scan by an amount of sheet feeding that makes a frequency of variation in interval between adjoining raster lines significantly greater than 1 cycle/mm.

The sub-scan with the second accuracy varies the Interval between adjoining raster lines based on the error in sheet feeding and causes unevenness of the density of the image. The unevenness of the density is visually recognized as banding, which deteriorates the picture quality. The visual intensity of the human eye generally has a peak at the spatial frequency of approximately 1 cycle/mm and decreases with an increase in spatial frequency. The printer of the above arrangement makes the frequency of variation in interval between the adjoining raster lines significantly greater than 1 cycle/mm. This enables the unevenness of density due to the variation in interval between adjoining raster lines to be sufficiently inconspicuous. This arrangement thereby improves the picture quality in the second area where the sub-scan is carried out with the second accuracy.

In the printer that forms adjoining raster lines with different nozzles, it is also preferable that the second control unit carries out the sub-scan by an amount of sheet feeding that reduces a number of adjoining raster lines formed by consecutive passes of main scan to be less than k, when the plurality of nozzles are arranged at the predetermined interval corresponding to k raster lines, where k is an integer of not less than 2.

As discussed below, this arrangement effectively prevents the variation in interval between adjoining raster lines due to the error in sheet feeding and thereby improves the picture quality. This arrangement also enhances the frequency for causing the unevenness of density accompanied with the variation in interval between adjoining raster lines, in order to make the unevenness of density sufficiently inconspicuous.

In one embodiment, the head has the plurality of nozzles arranged at the predetermined interval of k raster lines in the sub-scanning direction, and adjoining raster lines are formed with different nozzles. There are (k−1) non-formed raster lines between a pair of raster lines formed by a first pass of the main scan. In the process of successively forming these (k−1) raster lines, the sub-scan is carried out in such a manner that enables adjoining raster lines to be formed consecutively in the sub-scanning direction or in the reverse direction. This technique of sub-scan causes the k adjoining raster lines to be formed consecutively. In other words, the part where adjoining raster lines is not consecutively formed appears on every k raster line. It is assumed here that there is a certain error 'e' in sheet feeding of each sub-scan. In the area where the adjoining raster lines are consecutively formed, the positional deviation of recorded dots between the adjoining raster lines is equal to the error 'e' in sheet feeding. In the area where the adjoining raster lines are not consecutively formed, on the other hand, the positional deviation is equal to the accumulated error in sheet feeding by the (k−1) sub-scans. There is an extremely large error, (k−1)×e, in sheet feeding between the adjoining raster lines that are not consecutively formed. Such a large error in sheet feeding is readily recognizable and lowers the picture quality of the resulting image. This large error in sheet feeding appears at the interval equal to the nozzle interval and is often observed in the frequency range where the human eye has the high visual intensity. The periodical appearance of the large error in sheet feeding especially deteriorates the picture quality.

In the printer of this arrangement, the sub-scan is carried out in such a manner that makes the number of adjoining raster lines formed by the consecutive passes of the main scan less than the nozzle interval k. The maximum error in sheet feeding between adjoining raster lines that are not consecutively formed is accordingly smaller than (k1−)×e. This arrangement also makes the interval, at which the positional deviation of recorded dots between adjoining raster lines varies, shorter than the nozzle interval k. This results in enhancing the spatial frequency of the unevenness of density accompanied with the positional deviation of recorded dots. The printer of this arrangement improves the picture quality in the second area where the sub-scan is carried out with the second accuracy, by means of these functions.

In the structure that the number of adjoining raster lines formed by the consecutive passes of the main scan is less than the nozzle interval k, the raster-forming unit forms the raster lines while carrying out the main scan that moves the head forward and backward relative to the printing medium, and the second control unit carries out the sub-scan by a fixed amount of sheet feeding equal to N/s, where s is a natural number and represents a number of passes of the main scan required to form each raster line and N represents a number of the selected nozzles and is a value that is prime to k and excludes a range of k·s±1.

The amount of sheet feeding that makes the number of adjoining raster lines formed by the consecutive passes of the main scan less than the nozzle interval k is not restricted to the above relationship. For example, even when the number of nozzles is selected in the range of k·s±1, combination of different amounts of sheet feeding may reduce the number of adjoining raster lines formed consecutively to be less than k. Values that are not prime to each other may also be set to the number of nozzles N and the nozzle interval k.

In accordance with a second preferable application of the printer, the raster-forming unit drives the head to form the raster lines while carrying out main scan that moves the head forward and backward relative to the printing medium, and the second control unit controls the raster-forming unit and the second sub-scan unit to form each raster line in the second area by a certain number of passes of the main scan, which is less than a number of passes of the main scan required to form each raster line in the first area.

In the printer of this second application, each raster lines is formed by the greater number of passes of the main scan in the second area where the sub-scan is carried out with the second accuracy. For example, in the case where each raster line is formed by one pass of the main scan in the first area, each raster line is formed by two or more passes of the main scan in the second area. When each raster line is formed by plural passes of the main scan, each pass of the main scan creates dots on the raster line in an intermittent manner in the main scanning direction. A variety of techniques may be applicable to create dots in the intermittent manner. By way of example, in the case where each raster line is formed by two passes of the main scan, the first pass of the main scan creates dots of odd numbers in the main scanning direction, whereas the second pass of the main scan creates dots of even numbers in the main scanning direction. A variety of dot creation techniques are also applicable when each raster line is formed by three or more passes of the main scan. The number of passes of the main scan required to form each raster line is hereinafter referred to as the number of repeated scans.

The technique of forming each raster line by plural passes of the main scan effectively disperses the error in sub-scan in each raster line and thereby improves the picture quality in the second area where the sub-scan is carried out with the lower accuracy. The greater number of repeated scans in the second area than that in the first area enhances the degree of improvement in picture quality in the second area relative to that in the first area. This arrangement enhances the uniformity of picture quality, while extending the printable area, in which the image can be recorded.

In accordance with a third preferable application of the printer, the head enables at least two different types of dots having different amounts of ink to be created by a plurality of nozzles provided for each color and arranged in the sub-scanning direction, and the second control unit controls the raster-forming unit to create dots having a greater amount of ink in the second area at a predetermined ratio that is higher than a ratio in the first area.

In the printer of this third application, the dots having a greater amount of ink are created in the second area. Even if the accuracy in sub-scan is lowered, overlap of the adjoining dots in the sub-scanning direction effectively prevents dropout of raster lines and thereby improves the picture quality in the second area.

The dots having a greater amount of ink have a higher density per unit area. A simple increase in amount of ink for each dot may thus cause the density of the resulting image to be higher than a desired level. It is accordingly preferable to set the ratio of the dots having a greater amount of ink to the dots having a less amount of ink adequately in the range that does not damage the tone of the resulting image.

In accordance with another preferable arrangement of the printer, the first control unit carries out the sub-scan by a predetermined amount of sheet feeding that enables adjoining raster lines to be formed by different nozzles in a predetermined section of the first area that does not adjoin to the second area, and carries out the sub-scan by a smaller amount of sheet feeding than the predetermined amount in a middle area that adjoins to both the predetermined section of the first area and the second area.

The printer of this arrangement favorably extends not only the printable area of the image but the first area. The first area generally has the higher picture quality than the second area, when any one of the above techniques is adopted. This arrangement extends the first area and thereby improves the picture quality of the whole resulting image.

In the printer of this structure, it is preferable that the head has p nozzles arranged at intervals of n raster lines in the sub-scanning direction, where p is an integer of not less than 2 and n is an integer of not less than 2, and that the sub-scan in the middle area completes the image up to a specific raster line, which is closer to the first area by m raster lines than a limit raster line that allows dot creation with the first accuracy, where m denotes an integer of less than $p \times (n-1)$.

This preferable arrangement enables the image to be completed in the middle area when the head is present at the limit position of the sub-scan with the first accuracy. Namely the high picture quality area where the sub-scan is carried out with the first accuracy is extended to the middle area.

In the printer of this structure, it is also preferable that the sub-scan in the middle area causes adjoining raster lines to be formed with different nozzles.

This preferable arrangement effectively disperses the positional deviations of dots due to the mechanical errors of nozzles in the process of manufacture and thereby further improves the picture quality.

In the printer of this structure, it is further preferable that the sub-scan in the middle area has a feeding amount of one raster line.

The fine sheet feeding of one raster line favorably extends the middle area to the limit of the high picture quality area where the sub-scan is carried out with the first accuracy.

In accordance with still another preferable arrangement, the printer further includes: a memory that stores a correlation, which determines whether or not a printing quality corresponding to each possible choice of a parameter is realizable by the second control unit; a quality input unit that inputs a desired choice of the parameter; a print mode specification unit that inputs an instruction of execution of printing by the second control unit; and a restriction unit that refers to the correlation and, when it is determined that a printing quality corresponding to the input choice of the parameter is not realizable by the second control unit, restricts the input of the print mode specification unit.

In the case where the desired printing quality is not realizable if the printing is executed by the second control unit, that is, in the print mode that extends the printable area, the printer of this arrangement restricts the input of this print mode. This arrangement effectively avoids the execution of printing with the lower picture quality than the desired level and thereby prevents wasteful consumption of the printing medium.

A variety of techniques may be applied to restrict the input of the instruction. One possible structure gives a warning that forces the user to reconfirm the settings when the user instructs execution of printing in the print mode that extends the printable area. In this case, there are a greater number of steps prior to the actual execution of printing. Another possible structure rejects the input of the print mode that extends the printable area when the desired printing quality is not realizable. In the printer that enables the user to select a desired print mode among a variety of print modes displayed as possible choices, the print mode that extends the printable area may not be displayed as a possible choice.

The present invention is also directed to a method of forming a plurality of raster lines with a head, each raster line consisting of an array of dots aligned in a raster-forming direction, which is one direction of a printing medium, and carrying out a sub-scan that moves the head in a sub-scanning direction, which is another direction crossing the raster-forming direction, relative to the printing medium, thereby printing an image corresponding to input image data on the printing medium. Here the head has a plurality of nozzles that can create dots of an identical color and are arranged in the sub-scanning direction at a fixed interval. The method includes the steps of: (a) carrying out the sub-scan with a first accuracy to form the raster lines in a first area on the printing medium; and (b) carrying out the sub-scan with a second accuracy, which is lower than the first accuracy, to form the raster lines in a second area, where the sub-scan with the first accuracy is not allowable, in such a manner that compensates for a decrease in accuracy of the sub-scan.

In accordance with one preferable application of the method, the step (b) carries out the sub-scan by a predetermined amount of sheet feeding that is smaller than a mean amount of sheet feeding in the step (a).

It is preferable that the step (b) carries out the sub-scan to enable adjoining raster lines to be formed with different nozzles included in a set of nozzles selected as raster-forming nozzles among the plurality of nozzles mounted on the head.

In accordance with another preferable application of the method, the step (a) forms the raster lines while carrying out main scan that moves the head forward and backward relative to the printing medium, and the step (b) forms each raster line in the second area by a certain number of passes of the main scan, which is less than a number of passes of the main scan required to form each raster line in the first area in the step (a).

In accordance with still another preferable application of the method, the head enables at least two different types of dots having different amounts of ink to be created by a plurality of nozzles provided for each color and arranged in the sub-scanning direction, and a ratio of creating dots having a greater amount of ink is higher in the step (b) than in the step (a).

The method of the present invention having any one of the above arrangements effectively improves the picture quality in the extended printable area by the functions discussed above regarding the printer of the present invention.

The present invention is further directed to a first computer program product, in which a program for causing a printer to form raster lines and carry out a sub-scan in order to print an image on a printing medium is recorded in a computer readable manner. The program causes a computer to carry out the functions of: dividing a printable area, in which the image can be recorded, into a first area where the sub-scan is carried out with a first accuracy and a second area where the subscan is carried out with a second accuracy, which is lower than the first accuracy; and outputting a control. signal to carry out the sub-scan in the second area by a predetermined amount of sheet feeding that is smaller than a mean amount of sheet feeding in the first area.

In accordance with one preferable application of the first computer program product, the predetermined amount of sheet feeding in the second area enables adjoining raster lines to be formed with different nozzles included in a set of nozzles selected as raster-forming nozzles among a plurality of nozzles provided in the printer.

The present invention is also directed to a second computer program product, in which a program for causing a printer to form raster lines and carry out a sub-scan in order to print an image on a printing medium is recorded in a computer readable manner. The program causes a computer to carry out the functions of: dividing a printable area, in which the image can be recorded, into a first area where the sub-scan is carried out with a first accuracy and a second area where the subscan is carried out with a second accuracy, which is lower than the first accuracy; and outputting a control signal to form each raster line in the second area by a certain number of passes of the main scan, which is less than a number of passes of the main scan required to form each raster line in the first area.

The present invention is further directed to a third computer program product, in which a program for causing a printer, which enables creation of at least two different types of dots having different amounts of ink, to create dots and carry out a sub-scan in order to print an image on a printing medium is recorded in a computer readable manner. The program causes a computer to carry out the functions of: dividing a printable area, in which the image can be recorded, into a first area where the sub-scan is carried out with a first accuracy and a second area where the sub-scan is carried out with a second accuracy, which is lower than the first accuracy; and outputting a control signal to create dots having a greater amount of ink in the second area at a predetermined ratio that is higher than a ratio in the first area.

The present invention is further directed to a fourth computer program product, in which a program for causing a printer, which carries out two different types of sub-scan having different accuracy, to print an image on a printing medium is recorded in a computer readable manner. The program causes a computer to carry out the functions of: storing a correlation, which determines whether or not a printing quality corresponding to each possible choice of a parameter is realizable by the sub-scan of lower accuracy; inputting a desired choice of the parameter; inputting a specific print mode that instructs execution of printing with the sub-scan of lower accuracy; and referring to the correlation and, when it is determined that a printing quality corresponding to the input choice of the parameter is not realizable by the sub-scan of lower accuracy, restricting the input of the specific print mode.

The computer executes the program recorded in one of these computer program products, so as to actualize the printer of the present invention discussed above.

Available examples of the computer program products include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media. Still another application is a program supply apparatus that supplies a computer program, which causes the computer to actualize the control functions of one of the above printers, to the computer via a communications path.

All the arrangements of the present invention described above are applicable not only to the printer that forms raster lines through the main scan, which moves the head forward and backward relative to the printing medium, but to the printer that forms raster lines without the main scan.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 7 schematically illustrates the structure of a print head 28 in the printer 22;

FIG. 8 shows the principle of dot creation in the printer 22;

FIG. 10 shows the principle of creating dots of a large diameter in the printer 22;

FIG. 16 is a table showing the raster lines formed by the respective nozzles in each pass of the main scan in the state of FIG. 15;

FIG. 18 is a table showing the raster lines formed by the respective nozzles in each pass of the main scan in the state of FIG. 17;

FIG. 22 is a table showing the raster lines formed by the respective nozzles in each pass of the main scan in the state of FIG. 21;

FIG. 25 is a table showing the raster lines formed by the respective nozzles in each pass of the main scan in the state of FIG. 24;

FIG. 31 is a table showing the raster lines formed by the respective nozzles in each pass of the main scan in the state of FIG. 30;

FIG. 33 is a table showing the raster lines formed by the respective nozzles in each pass of the main scan in the state of FIG. 32;

FIG. 37 is a table showing the raster lines formed by the respective nozzles in each pass of the main scan in the state of FIG. 36;

DESCRIPTION OF THE PREFERRED EMBODIMENTS (1) Structure of Apparatus

Figure 1:
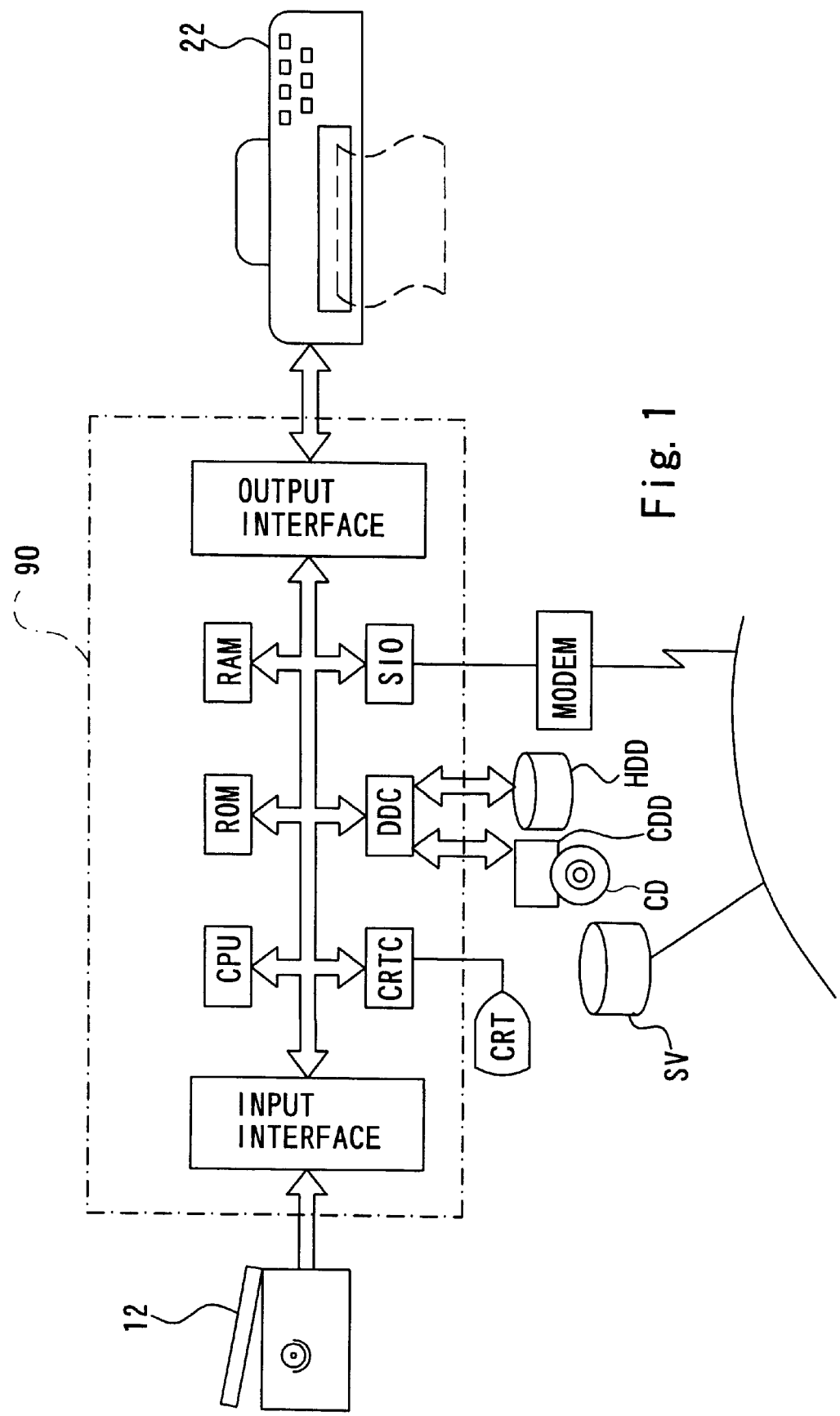
FIG. 1 is a block diagram illustrating the structure of a printing system including a printer 22 embodying the present invention.

FIG. 1 is a block diagram illustrating the structure of a printing system including a printer embodying the present invention. The printing system includes a computer 90 connected to a scanner 12 and a color printer 22. The computer 90 reads a program required for driving the printer 22 from a flexible disk drive 15 or a CD-ROM drive (not shown). The computer 90 is connected to an external network via a modem 18 and can download a program required for driving the printer 22 from a specific server SV into a head disk 16.

Figure 2:
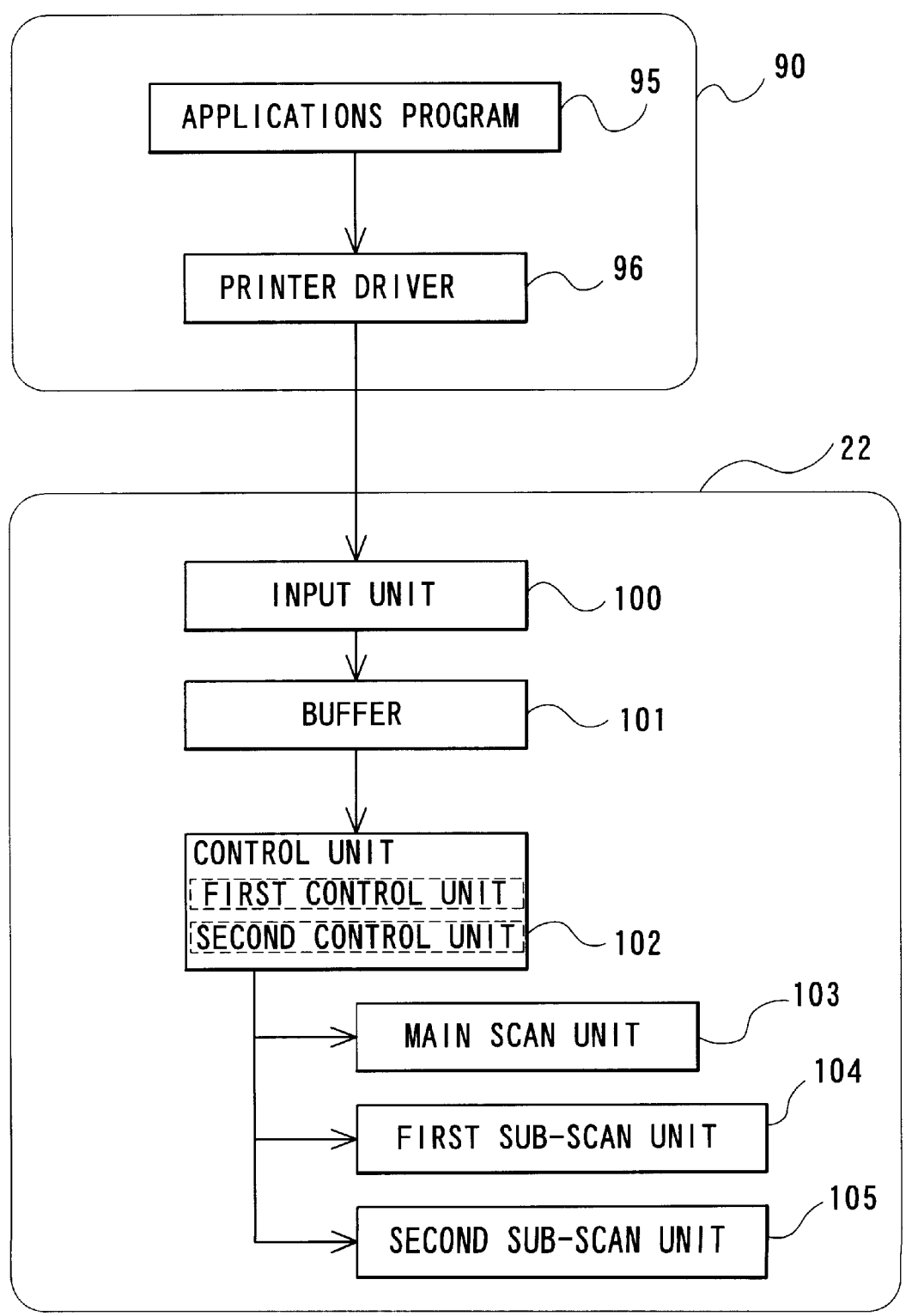
FIG. 2 is a block diagram illustrating the software structure of the printing system.

FIG. 2 is a block diagram illustrating the software structure of the printing system. In the computer 90, an applications program 95 for generating image information to be printed works under a predetermined operating system. When the applications program 95 issues a printing command, a printer driver 96 incorporated in the operating system receives the image information from the applications program 95, converts the image information into print data printable by the printer 22, and outputs the print data to the printer 22. According to a concrete procedure, the printer driver 96 carries out color correction to convert the R, G, and B color components of the image information supplied from the applications program 95 into ink colors C, M, Y, and K used by the printer 22. The printer driver 96 also performs halftone processing to express the tone by the dispersivility of dots.

In the printer 22, the print data output from the printer driver 96 is input into an input unit 100 and stored in a buffer 101. A control unit 102 of the printer 22 reads the print data from the buffer 101 and controls a main scan unit 103 to form raster lines. The control unit 102 also controls a first sub-scan unit 104 and a second sub-scan unit 105 to carry out sub-scans. The first sub-scan unit 104 carries out the sub-scan by a predetermined first feeding amount of relatively high accuracy, whereas the second sub-scan unit 105 carries out the sub-scan by a predetermined second feeding amount of relatively low accuracy. The appropriate feeding amount out of the two alternatives is preset according to the positional relationship between the printing medium and the printing area.

Figure 3:
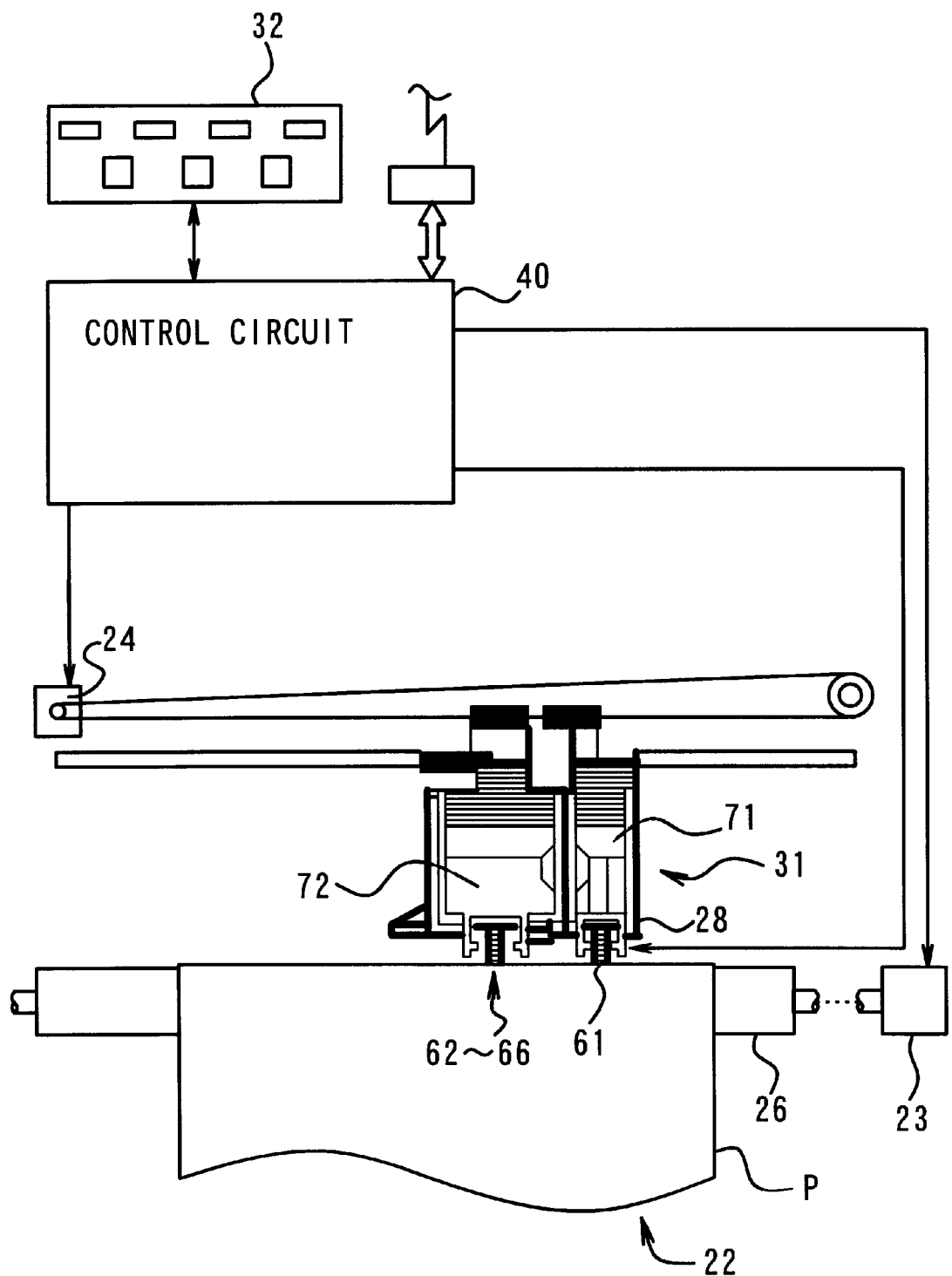
FIG. 3 schematically illustrates the structure of the printer 22 in this embodiment.

The schematic structure of the printer 22 is described with the drawing of FIG. 3. As illustrated in FIG. 3, the printer 22 has a mechanism for causing a sheet feed motor 23 to feed a sheet of printing paper P, a mechanism for causing a carriage motor 24 to move a carriage 31 forward and backward along an axis of a platen 26, a mechanism for driving a print head 28 mounted on the carriage 31 to control spout of ink and creation of dots, and a control circuit 40 that controls transmission of signals to and from the sheet feed motor 23, the carriage motor 24, the print head 28, and a control panel 32.

Figure 4:
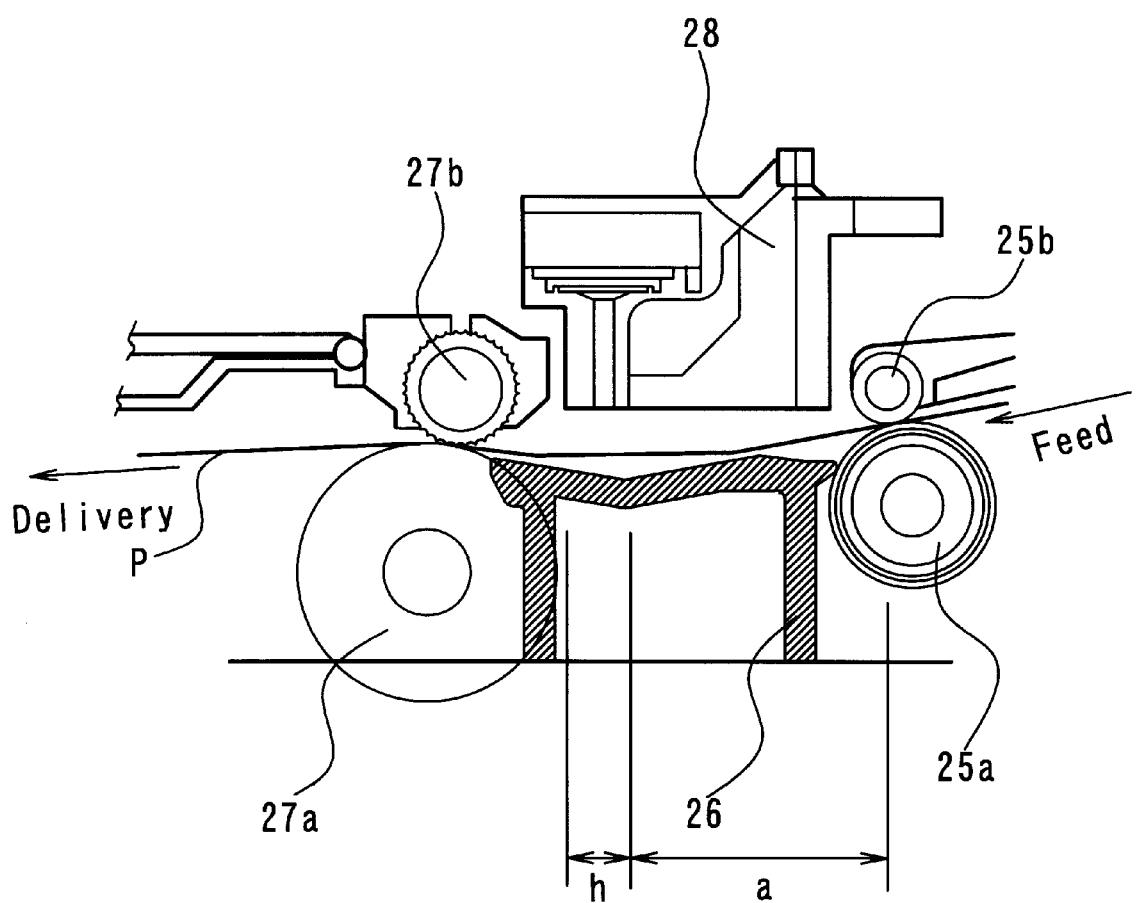
FIG. 4 shows a sheet feeding mechanism in the printer 22 of the embodiment.

The mechanism of feeding the printing paper P in the printer 22 is described with the side sectional view of FIG. 4. The mechanism of feeding the printing paper P includes a feeding roller 25a and a follower roller 25b disposed in a feeder section and a delivering roller 27a and a star-wheel roller 27b disposed in a delivery section. These rollers are driven by the rotation of the sheet feed motor 23 shown in FIG. 3. Referring to FIG. 4, the printing paper P is interposed between the feeding roller 25a and the follower roller 25b and fed from the feeder section with the rotations of these rollers 25a and 25b. When the upper end of the printing paper P reaches the position between the delivering roller 27a and the star-wheel roller 27b, these rollers 27a and 27b cooperate to feed the printing paper P to the delivery section. The print head 28 records an image in a specific area of the printing paper P that is located over the platen 26.

The rollers 25a and 25b in the feeder section ensure the accuracy of sheet feeding. When the printing paper P is fed only by the delivering roller 27a and the star-wheel roller 27b after the lower end of the printing paper P comes off the feeding roller 25a and the follower roller 25b, the accuracy of sheet feeding is accordingly lowered.

A black ink cartridge 71 for black ink (Bk) and a color ink cartridge 72, in which five color inks, that is, cyan (C1), light cyan (C2), magenta (M1), light magenta (M2), and yellow (Y), are accommodated, may be mounted on the carriage 31. A total of six ink spout heads 61 through 66 are formed on the print head 28 that is disposed in the lower portion of the carriage 31.

Figure 5:
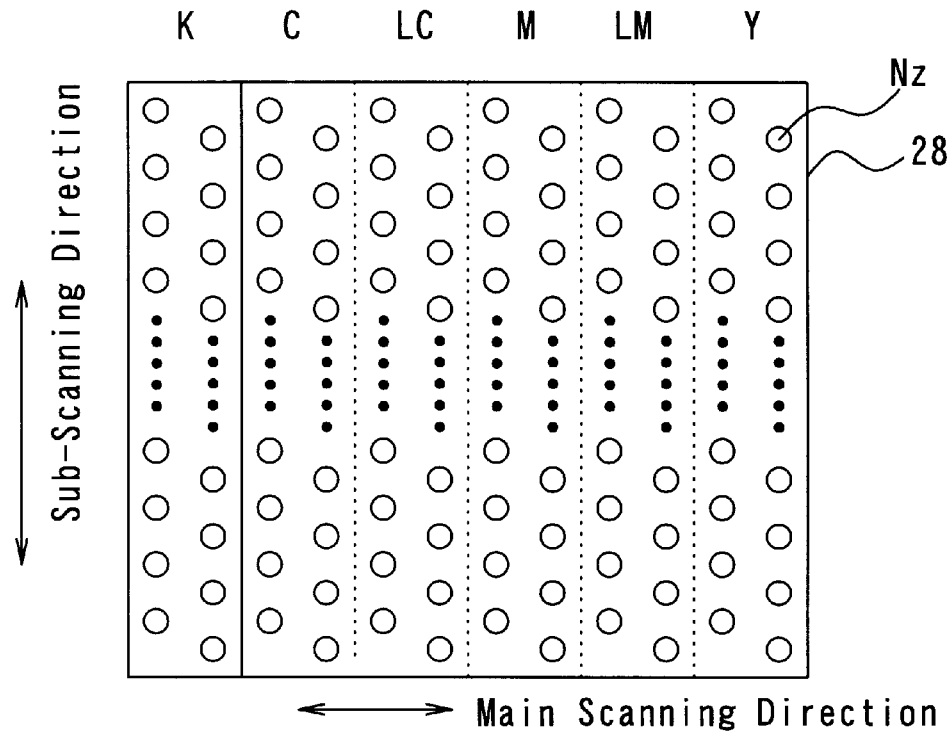
FIG. 5 shows an arrangement of nozzle arrays in the printer 22 of the embodiment.

FIG. 5 shows an arrangement of ink jet nozzles Nz on the ink spout heads 61 through 66. The nozzle arrangement includes six nozzle arrays, wherein each nozzle array spouts ink of each color and includes forty-eight nozzles Nz arranged in zigzag at a fixed nozzle pitch k. The positions of the corresponding nozzles in a sub-scanning direction are identical in the respective nozzle arrays.

Figure 6:
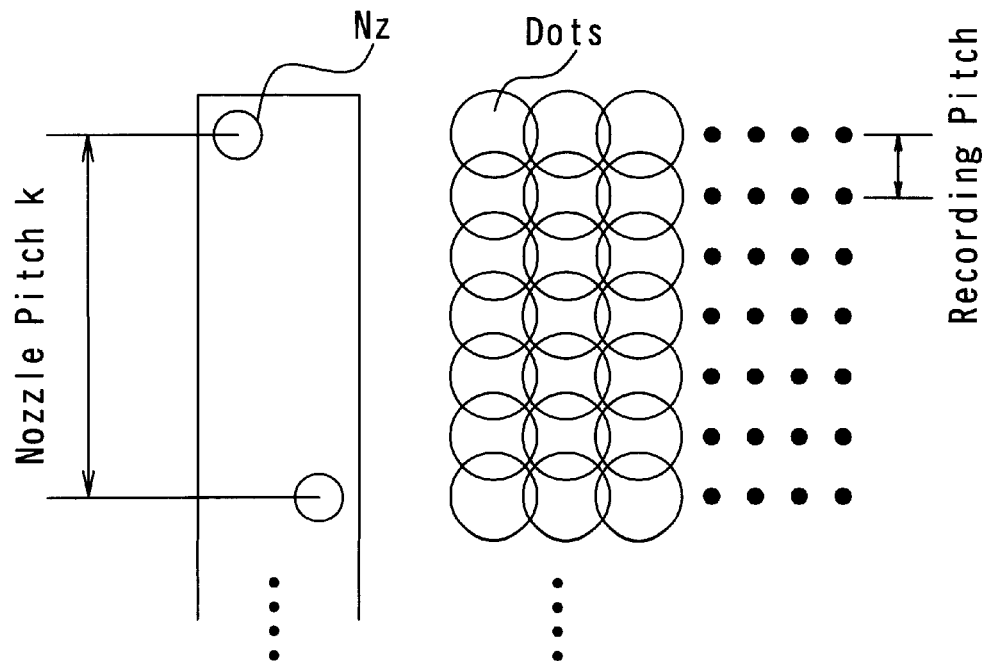
FIG. 6 shows an enlarged part of the nozzle array and dots created by the nozzle array.

FIG. 6 shows an enlarged part of the nozzle array and dots created by the nozzle array. Sub-scans of the nozzle array enable dots to be recorded at a recording pitch that is ⅙ of the nozzle pitch as shown in FIG. 6. Namely the ratio of the nozzle pitch to the recording pitch is 6 to 1 in this embodiment. In order to prevent dropout of a dot, each dot is recorded to partly overlap the adjoining dots both in the main scanning direction and in the sub-scanning direction.

The following describes the mechanism of spouting ink and creating dots. FIG. 7 schematically illustrates the internal structure of the print head 28. When the ink cartridges 71 and 72 are attached to the carriage 31, supplies of inks in the ink cartridges 71 and 72 are sucked out through ink supply conduits 67 by means of the negative pressure and are led to the ink spout heads 61 through 66 formed in the print head 28 arranged in the lower portion of the carriage 31.

A piezoelectric element PE is arranged for each nozzle Nz in the ink spout heads 61 through 66 of the respective colors. FIG. 8 illustrates a configuration of the piezoelectric element PE and the nozzle Nz. As shown in the upper drawing of FIG. 8, the piezoelectric element PE is disposed at a position that comes into contact with an ink conduit 68 for leading ink to the nozzle Nz. As is known, the piezoelectric element PE has a crystal structure that is subjected to mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to extend for the predetermined time period and deform one side wall of the ink conduit 68 as shown in the lower drawing of FIG. 8. The volume of the ink conduit 68 is reduced with the extension of the piezoelectric element PE, and a certain amount of ink corresponding to the reduced volume is sprayed as an ink particle Ip from the end of the nozzle Nz at a high speed. The ink particles Ip soak into the printing paper P set on the platen 26, so as to implement printing.

Figure 9:
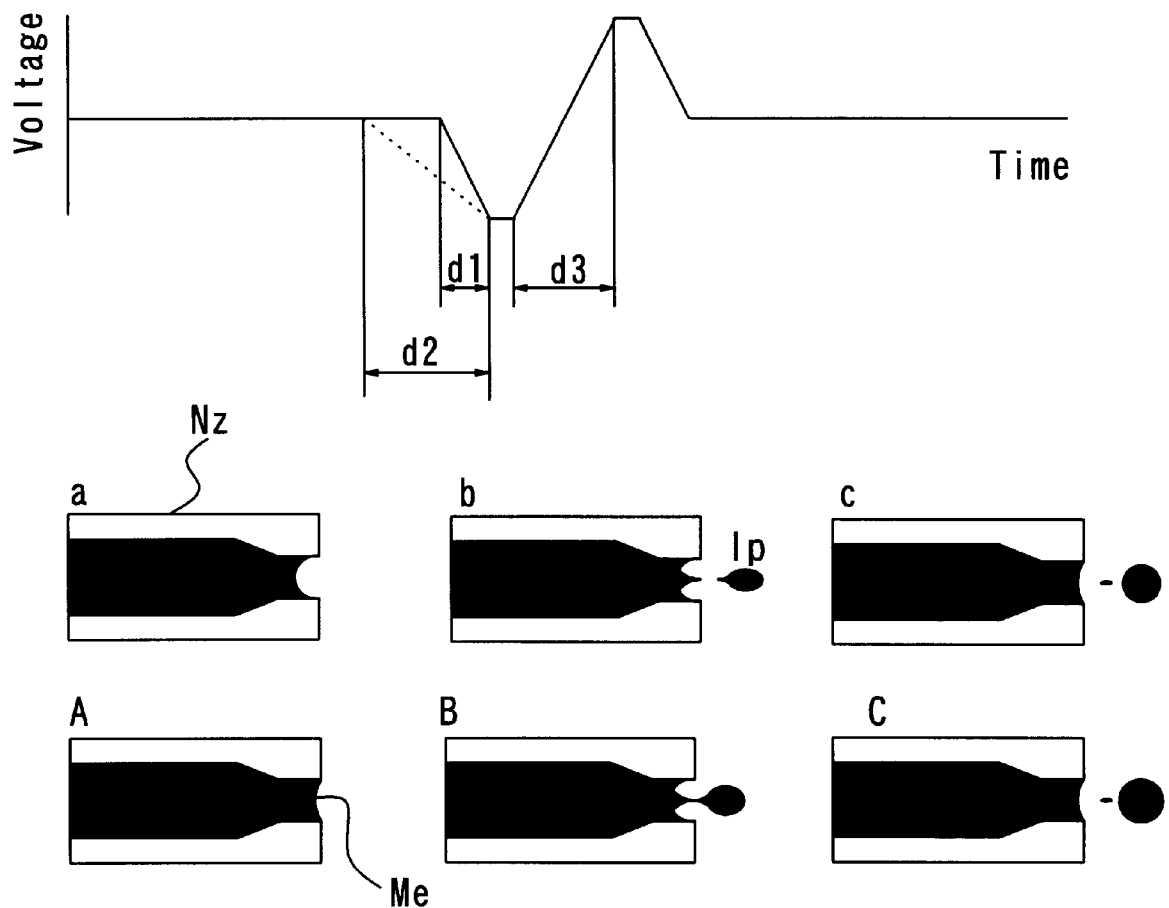
FIG. 9 shows the principle of creating dots of different diameters in the printer 22.

The printer 22 can create three different types of dots having different diameters with the nozzles Nz of a fixed diameter. The following describes the principle of such dot creation technique. FIG. 9 shows the relationship between the driving waveform of the nozzle Nz and the size of the ink particle Ip spouted from the nozzle Nz. The driving waveform shown by the broken line in FIG. 9 is used to create standard-sized dots. Application of a low voltage to the piezoelectric element PE in a division d2 deforms the piezoelectric element PE in the direction of increasing the cross-section of the ink conduit 68, contrary to the case of FIG. 8. As shown in a state A of FIG. 9, an ink interface Me, which is generally referred to as meniscus, is thus slightly concaved inward the nozzle Nz. When the driving waveform shown by the solid line in FIG. 9 is used to abruptly lower the voltage in the division d2, on the other hand, the meniscus is more significantly concaved inward as shown in a state 'a', compared with the state A. A subsequent increase in voltage applied to the piezoelectric element PE in a division d3 causes the ink to be spouted, based on the principle described previously with the drawing of FIG. 8. As shown in states B and C, a large ink droplet is spouted when the meniscus is only slightly concaved inward (state A). As shown in states 'b' and 'c', on the other hand, a small ink droplet is spouted when the meniscus is significantly concaved inward (state 'a').

As discussed above, the dot diameter can be varied according to the rate of change in the divisions d1 and d2 where the driving voltage decreases. This embodiment provides two different driving waveforms, that is, one for creating small dots of a small diameter and the other for creating medium dots of an intermediate diameter, based on the relationship between the driving waveform and the dot diameter. FIG. 10 shows driving waveforms used in this embodiment. A driving waveform W1 is used to create the small dots, whereas a driving waveform W2 is used to create the medium dots. These two driving waveforms enable two different types of dots, that is, the small dot and the medium dot, to be created with the nozzle Nz of an identical diameter.

Large dots of a large diameter are created by using both the driving waveforms W1 and W2 shown in FIG. 10. The lower part of FIG. 10 shows the process of hitting an ink droplet IPs for the small dot and an ink droplet IPm for the medium dot spouted from the nozzle against the printing paper P. When both the small dot and the medium dot are created with the driving waveforms of FIG. 10, the ink droplet IPm for the medium dot has a higher jet speed. Namely there is a difference in jet speed between these two types of ink droplets. In the case where a small ink droplet and a medium ink droplet are spouted in this sequence in the course of moving the carriage 31 in a main scanning direction, regulation of the scanning speed of the carriage 31 and the jet timings of both the ink droplets according to the distance between the carriage 31 and the printing paper P enables both the ink droplets to reach the printing paper P at a substantially identical timing. In this manner, the embodiment creates a large dot having the largest diameter with the two driving waveforms of FIG. 10.

Figure 11:
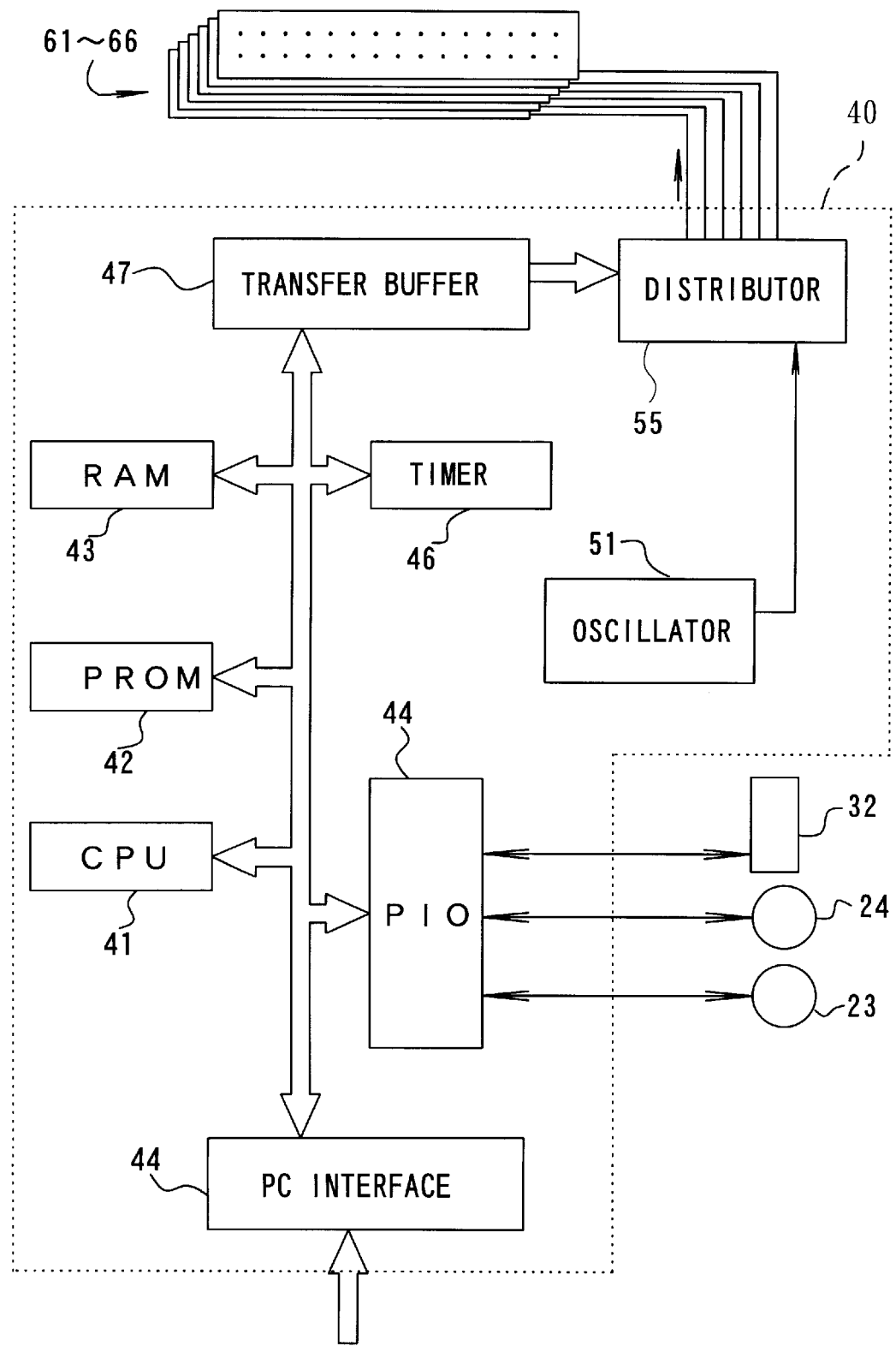
FIG. 11 shows the internal structure of the control circuit 40 in the printer 22.

The following describes the internal structure of the control circuit 40 in the printer 22 and the method of driving the print head 28 with the plurality of nozzles Nz. FIG. 11 illustrates the internal structure of the control circuit 40. Referring to FIG. 11, the control circuit 40 includes a CPU 41, a PROM 42, a RAM 43, a PC interface 44 that transmits data to and from the computer 90, a peripheral input-output unit (PIO) 45 that transmits signals to and from the sheet feed motor 23, the carriage motor 24, and the control panel 32, a timer 46 that counts the time, and a transfer buffer 47 that outputs ON-OFF signals of dots to the ink spout heads 61 through 66. These elements and circuits are mutually connected via a bus 48. The control circuit 40 further includes an oscillator 51 that outputs driving waveforms at a predetermined frequency and a distributor 55 that distributes the output of the oscillator 51 into the ink spout heads 61 through 66 at a specified timing. The control circuit 40 receives print data processed by the computer 90 and stores the print data into the transfer buffer 47. The ON-OFF state of each nozzle in the ink spout heads 61 through 66 is set, based on the data output from the transfer buffer 47 to the distributor 55. The nozzle set in the ON state spouts an ink particle Ip, in response to a driving waveform output from the oscillator 51.

In the printer 22 having the hardware structure discussed above, while the sheet feed motor 23 rotates the rollers 25*a* and 25*b* in the feeder section and the other related rollers to feed the printing paper P (hereinafter referred to as the sub-scan), the carriage motor 24 moves the carriage 31 forward and backward (hereinafter referred to as the main scan), simultaneously with actuation of the piezoelectric elements PE on the respective ink spout heads 61 through 66 of the print head 28. The printer 22 accordingly sprays the respective color inks to create dots and thereby forms a multi-color image on the printing paper P.

In this embodiment, the printer 22 has the head that uses the piezoelectric elements PE to spout ink as discussed previously. The printer may, however, adopt another technique for spouting ink. One available structure of the printer supplies electricity to a heater installed in an ink conduit and utilizes the bubbles generated in the ink conduit to spout ink. In this structure, different types of dots having different amounts of ink are created by varying the supply of electricity to the heater.

(2) Dot Creation Control

Figure 12:
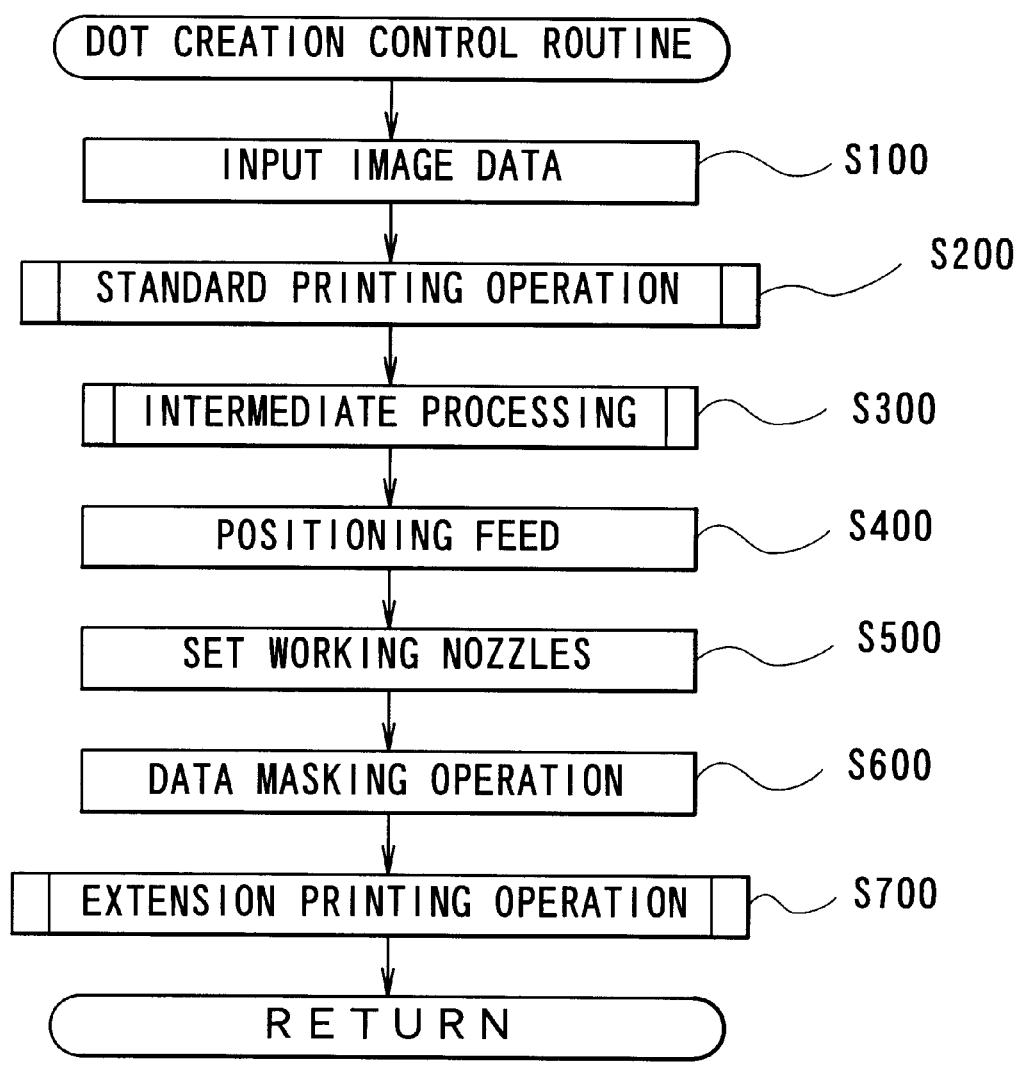
FIG. 12 is a flowchart showing a dot creation control routine executed in the first embodiment.
Figure 13:
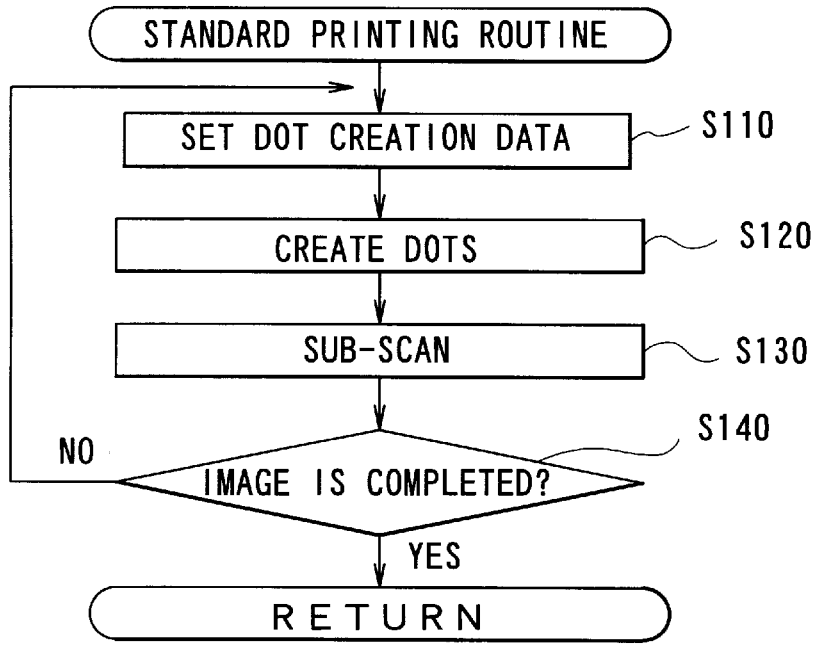
FIG. 13 is a flowchart showing a standard printing routine executed at step S200 in the flowchart of FIG. 12.

The following concretely describes a process of creating dots and recording an image through the main scan of the head and the sub-scan of the printing paper in the printer 22 of this embodiment. FIGS. 12 and 13 are flowcharts showing a dot creation control routine to control the main scan and the sub-scan executed in this embodiment. The CPU 41 of the control circuit 40 in the printer 22 shown in FIG. 3 executes the dot creation control routine to implement the control.

When the program enters the dot creation control routine of FIG. 12, the CPU 41 first inputs image data at step S100. The image data have been subjected to color correction and other image processing operations carried out by the printer driver 96 shown in FIG. 2, and specify the positions of the respective color dots to be created in the main scanning direction and in the sub-scanning direction on the printing paper. In this embodiment, the procedure of step S100 inputs all the data relating to an image to be printed. Another possible application successively inputs data while creating the required dots.

Figure 14:
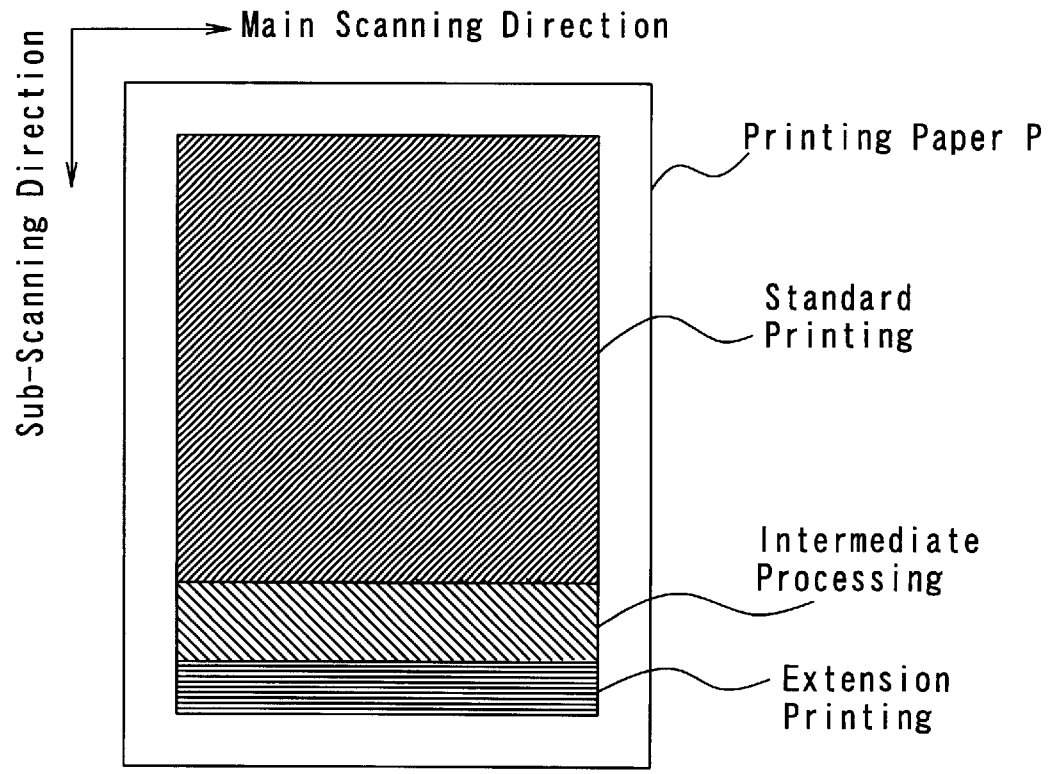
FIG. 14 shows a printable area, in which an image can be recorded, in this embodiment.

The CPU 41 then carries out a standard printing operation to record an image at step S200. The standard printing operation in this embodiment adopts the interlace method. The flowchart of FIG. 13 shows the routine of the standard printing operation executed at step S200 in the flowchart of FIG. 12. FIG. 14 shows a printable area, in which an image can be recorded, in this embodiment. The printable area is divided into three areas, based on the positional relationship between the sheet feeding mechanism and the printing paper P shown in FIG. 4.

The first area is the area of standard printing shown in FIG. 14. The image in the first area is recorded in the state that the printing paper P is fed by the feeding roller 25*a* and the follower roller 25*b* shown in FIG. 4, that is, in the state that the sufficient accuracy of sheet feeding is ensured. The second area is the area of intermediate processing shown in FIG. 14. This corresponds to a transient area located between the area of standard printing and the third area described below. The sufficient accuracy of sheet feeding is also ensured in this second area. The third area is the area of extension printing shown in FIG. 14. The image in the third area is recorded in the state that the lower end of the printing paper P comes off the feeding roller 25*a* and the follower roller 25*b* and the printing paper P is fed by the delivering roller 27*a* and the star-wheel roller 27*b*. The image is thus recorded with lower accuracy of sheet feeding in the area of extension printing than in the area of standard printing and the area of intermediate processing. The printer 22 of this embodiment can record, in principle, an image over the whole area of the printing paper P. There are, however, some margins set by taking into account the errors in size of the printing paper P and in printing area at the time of insertion of the printing paper P into the printer 22.

The printer 22 of this embodiment may execute printing in a different print mode that does not perform the extension printing operation. The user can determine whether the extension printing is carried out or not, prior to a start of printing. The method of setting the print mode will be discussed later. The following describes the procedure of printing when the user sets a print mode that performs the extension printing operation.

Figure 15:
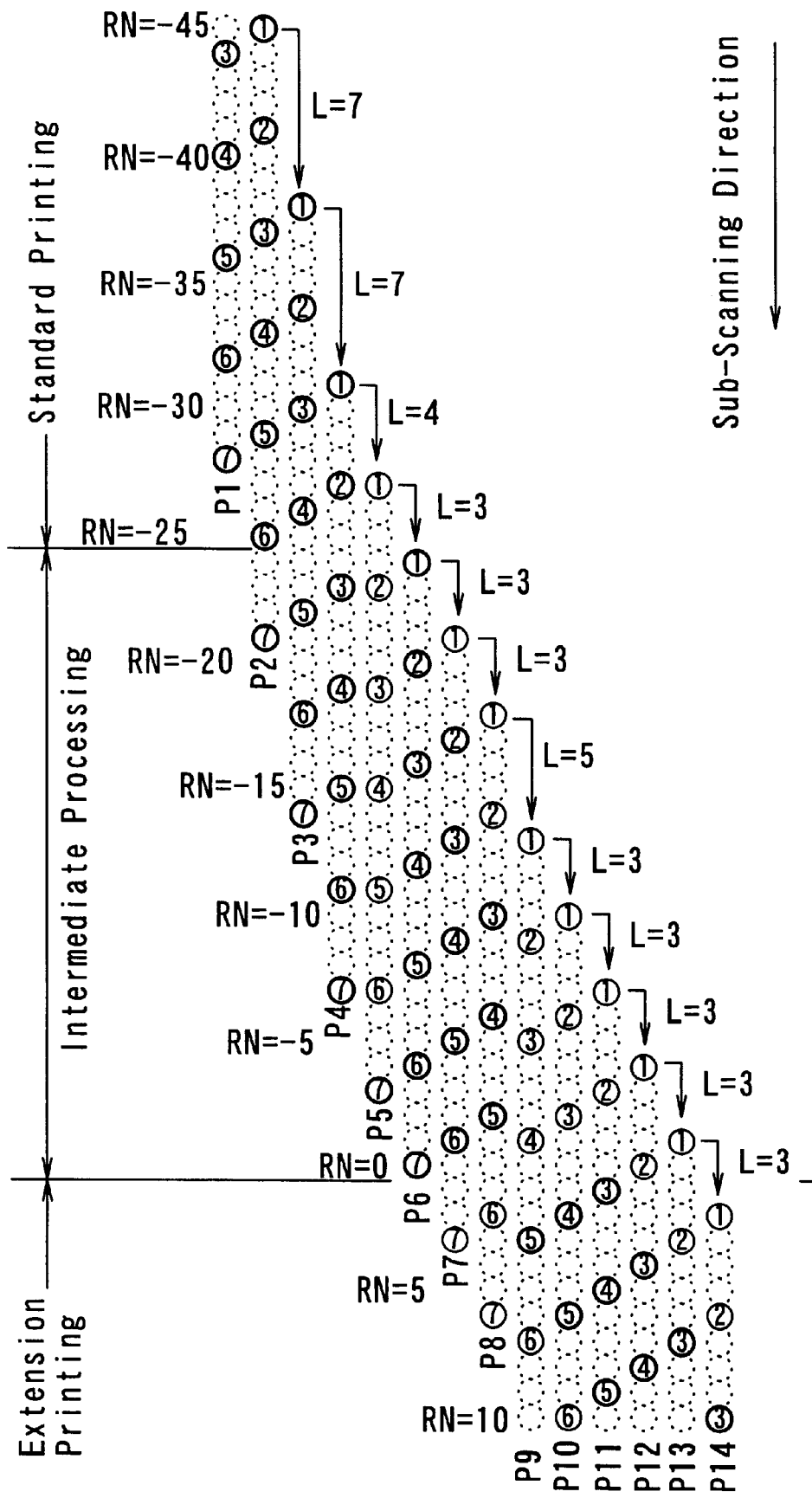
FIG. 15 shows the state of dot creation in the first embodiment.

FIG. 15 shows the state of dots created according to the dot creation control procedure shown in the flowcharts of FIGS. 12 and 13. FIG. 16 is a table showing the raster lines formed by the respective nozzles in each pass of the main scan in the state of FIG. 15. For convenience of explanation, the nozzle pitch is set equal to 4 raster lines and the number of nozzles is reduced to 7 in the example of FIGS. 15 and 16.

FIG. 15 shows the positions of the nozzles in the sub-scanning direction on each pass of the main scan. The vertical direction of FIG. 15 corresponds to the sub-scanning direction. For simplicity of illustration, the positions of the nozzles shown in FIG. 15 are successively shifted rightward by every pass of the main scan. The symbols P1, P2, . . . in FIG. 15 denote the passes of the main scan, for example, the first pass of the main scan and the second pass of the main scan. The circles including numerals represent the positions of the nozzles in the sub-scanning direction on each pass of the main scan. The numerals included in thick circles denote the nozzle numbers in the state that dots are created at the corresponding positions by the nozzles, whereas the numerals included in thin circles denote the nozzle numbers in the state that no dots are created by the nozzles located there. As a matter of convenience, raster numbers RN are allocated to the respective raster lines. The raster number 0 (RN=0) is assigned to the lower-most raster line that is recorded by this recording process while the sufficient accuracy of sheet feeding in the sub-scan is ensured. Positive numbers are assigned to the lower raster lines below the raster line RN=0, whereas negative numbers are assigned to the upper raster lines. Each value L denotes the amount of sheet feeding in each sub-scan expressed as the number of raster lines.

When the program enters the standard printing routine shown in the flowchart of FIG. 13, the CPU 41 sets dot creation data at step S110 and creates dots while carrying out the main scan at step S120. In the example of FIG. 15, the nozzle pitch corresponds to 4 raster lines, so that the dot creation data are provided by successively extracting the input image data on every fourth raster line from the head in the main scanning direction. The CPU 41 transfers the dot creation data thus obtained to the transfer buffer 47 shown in FIG. 11. The CPU 41 drives the print head 28 to spout ink and create dots in response to the driving waveform, which is output synchronously with the position of the head 28 in the main scanning direction. In the course of the pass P1 of the main scan shown in FIG. 15, dots are created on every fourth raster line in the area above the raster line RN=−28 (that is, the area of RN≦−28).

The table of FIG. 16 shows the raster numbers corresponding to the nozzle positions in each pass of the main scan. The numbers #1, #2, . . . , in the left-most column of FIG. 16 correspond to the respective nozzle numbers in FIG. 15, and the symbols P1, P2 . . . in the upper-most row of FIG. 16 correspond to the symbols P1, P2 . . . representing the respective passes of the main scan in FIG. 15. The values in the table show the raster numbers RN allocated to the raster lines formed by the respective nozzles in each pass of the main scan. For example, the nozzle #1 forms a raster line RN=−52 in the pass P1 of the mainscan. The raster line RN=−52 is included in the area above the area shown in FIG. 15.

The CPU 41 subsequently controls the sheet feed motor 23 to carry out the sub-scan at step S130. The method of sheet feeding is described previously with the drawing of FIG. 4. In the example of FIG. 15, the position of the head 28 is moved to the pass P2 by the sheet feeding of 7 raster lines. The optimum amount of sheet feeding that enables the nozzles to be used most effectively is selected among alternative amounts of sheet feeding that enable an image to be recorded with no dropout of raster lines by the interlace method. The amount of sheet feeding is determined according to the nozzle pitch, the number of nozzles, and the number of repeated scans. The details of the determination are known in the art and are thus not specifically described here.

After the sub-scan, the program repeats the processing of steps S110 through S130 to create the dots at the positions shown by the pass P2 of the main scan of FIG. 15, that is, in the area above the raster line RN=−20. The repetition of the processing enables raster lines to be formed in an intermittent manner and thereby records a desired image. By way of example, the execution of the passes P1 through P4 of the main scan complete the image in the area of the raster lines RN=−34 through RN=−25 as clearly understood from FIG. 15. The processing is repeated until the image is completed at step S140. In this embodiment, however, printing in a different print mode is carried out after the standard printing operation (step S200 in the flowchart of FIG. 12) as described later. The completion of the image here accordingly does not mean the completion of printing of the whole input image data, but implies the completion of the image according to the standard printing routine.

Completion or non-completion of the image by the standard printing operation is determined according to the number of raster lines to be formed by the intermediate processing (step S300 in the flowchart of FIG. 12) and by the extension printing operation (step S700). In the case where the size of the printing paper P is specified in advance, both the total number of raster lines in the input image data and the number of raster lines to be formed by the intermediate processing and by the extension printing operation are known. The number of raster lines, starting from the upper end of the image data, to be formed by the standard printing operation is thus determined, based on these pieces of information. Comparison between the expected number of raster lines and the number of raster lines actually formed readily determines whether or not the standard printing operation is to be concluded. The structure of the embodiment gives some margin to the area of standard printing. This is because the size of the printing paper P is not strictly identical and there may be an error in printing area due to the slippage at the time of insertion of the printing paper P into the printer 22 and other factors.

In the case where the size of the printing paper P is unknown, one modification of the embodiment provides a sensor, which is disposed at a predetermined position before the feeding roller 25a and the follower roller 25b of FIG. 4 to detect the end of the printing paper P, and determines conclusion or non-conclusion of the standard printing operation, based on the information from the sensor. For example, a known optical sensor may be used to detect the end of the printing paper P. At the time when the end of the printing paper P is detected, known are the distance between the position in which printing is currently curried out and the lower end of the printing paper P and thereby the number of raster lines to be recorded in the corresponding area. The method determines completion or non-completion of the image by the standard printing operation, based on these pieces of information.

After completion of the image by the standard printing operation, the CPU 41 carries out printing of the image by the intermediate processing at step S300 in the flowchart of FIG. 12. The basic flow of dot creation by the intermediate processing is similar to that of the standard printing routine shown in the flowchart of FIG. 13 and is thus not specifically illustrated. The difference between the intermediate processing and the standard printing operation is the amount of sheet feeding in the sub-scan.

Different from the sheet feeding of 7 raster lines in the standard printing operation, the intermediate processing of step S300 first carries out the sheet feeding of 4 raster lines and forms a raster line in the pass P5 of the main scan of FIG. 15. The meaning of this sheet feeding amount corresponding to 4 raster lines will be described later. The intermediate processing then carries out the sheet feeding of 3 raster lines and forms raster lines in the passes P6 through P8 of the main scan of FIG. 15. Like the nozzle #1 in the pass P7 of the main scan, the nozzles may be present at the positions where dots of the raster lines have already been created. The dot creation data are masked for such nozzles, in order to interfere with further creation of dots at the positions. The symbol n/a in the table of FIG. 16 denotes the nozzle for which the dot creation data is masked. The position of the pass P8 of the main scan in FIG. 15 represents the limit position that carries out sheet feeding while ensuring the sufficient accuracy. Namely this is the state immediately before the lower end of the printing paper P comes off the feeding roller 25a and the follower roller 25b. In this embodiment, the position of the pass P8 of the main scan is determined by adding a margin of 2 millimeters to the actual limit position.

The following describes the settings of the sheet feeding amount in the intermediate processing. The intermediate processing of the embodiment carries out the sheet feeding by a fixed amount of 3 raster lines, which follows a transient feed of 4 raster lines. The fixed amount of sheet feeding corresponds to the amount of sheet feeding in the process of interlace printing with three nozzles arranged at the nozzle pitch of 4 raster lines. The intermediate processing of this embodiment sets the amount of sheet feeding to carry out recording by the interlace method with three out of the seven nozzles. In the pass P8 of the main scan of FIG. 15, only three nozzles, the nozzles #3 through #5, create dots. More than 3 nozzles are used in the passes P6 and P7 of the main scan. This arrangement ensures smooth connection with the area of the standard printing and thereby prevents dropout of raster lines. The transient feed of 4 raster lines in the beginning of the intermediate processing is also set to prevent dropout of raster lines. The amount of transient feed depends upon the parameters, such as the amounts of sheet feeding, in the standard printing operation and the intermediate processing.

As described above, the intermediate processing carries out the interlace printing with the apparently reduced number of working nozzles. This recording process extends the area that carries out recording of the image while ensuring the sufficient accuracy of sheet feeding. This point is described in detail by comparing the state of FIG. 15 with the state of FIG. 44.

Figure 44:
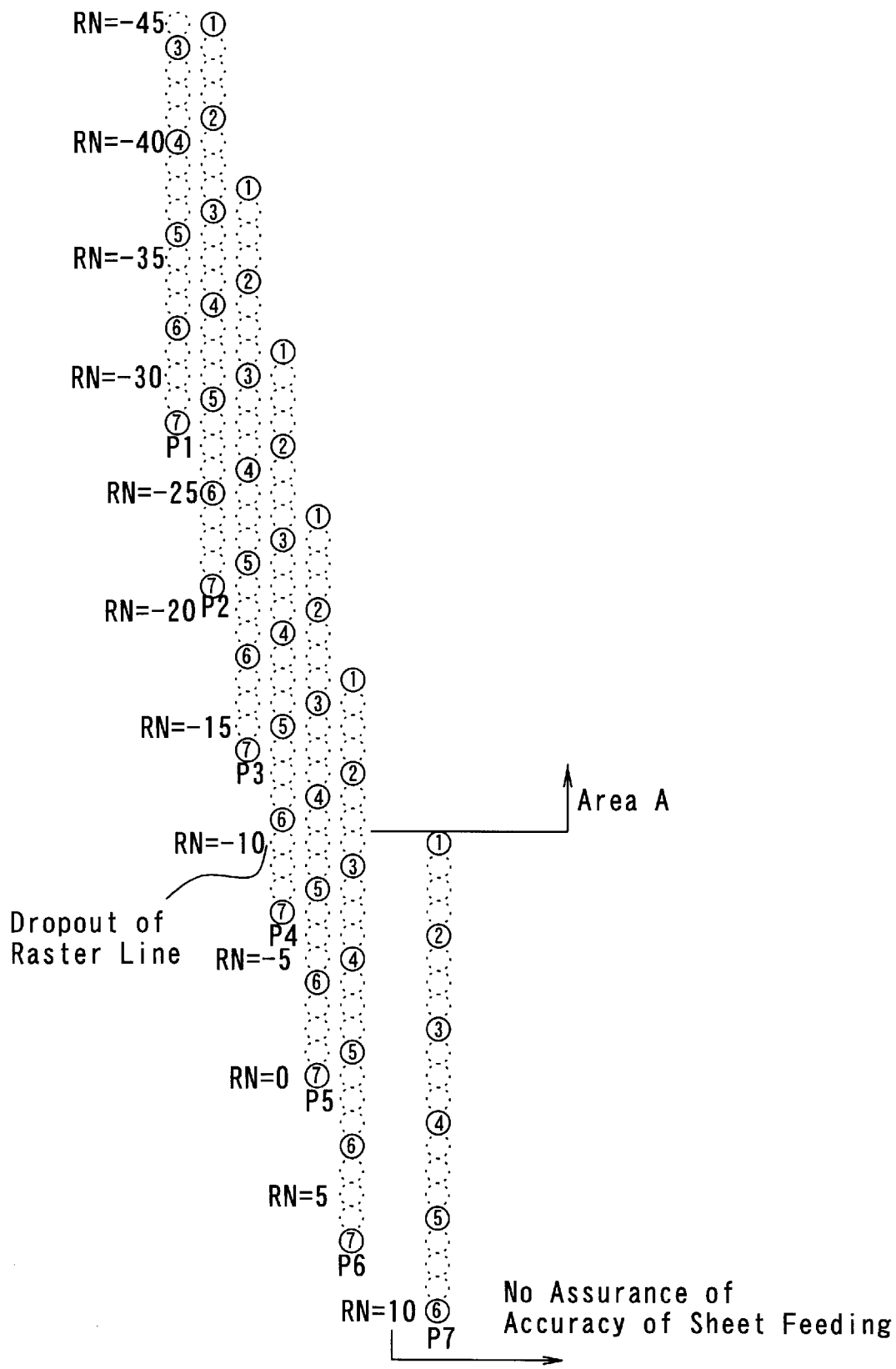
FIG. 44 shows the state of dot creation by the interlace method of the prior art technique.
Figure 45:
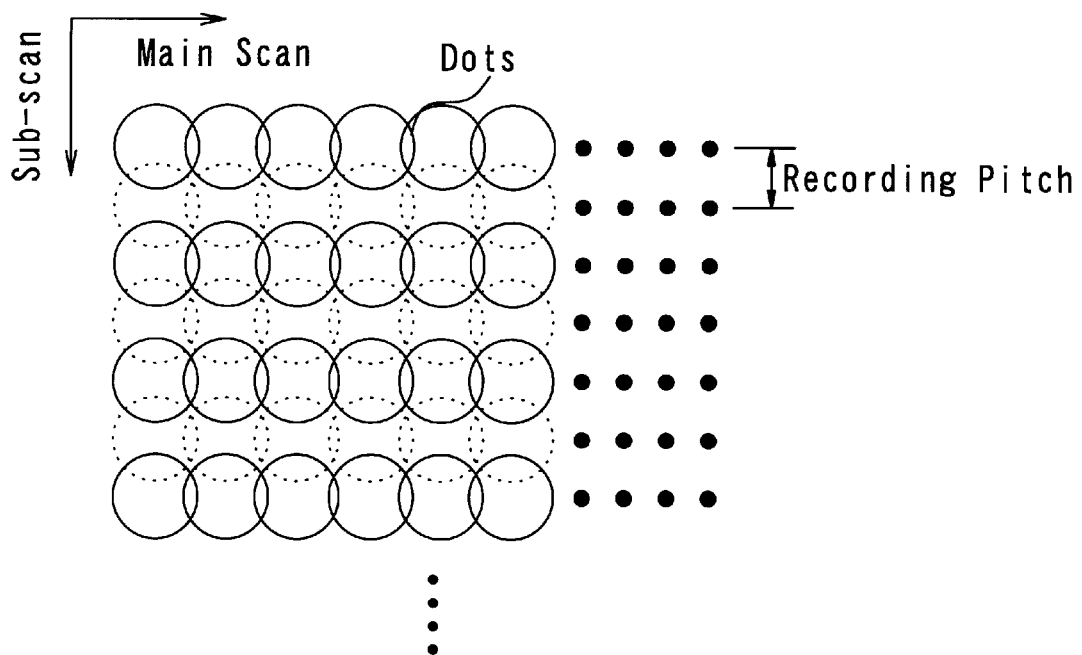
FIG. 45 shows the state of dot creation when the sufficient accuracy of sheet feeding in the sub-scan is ensured.
Figure 46:
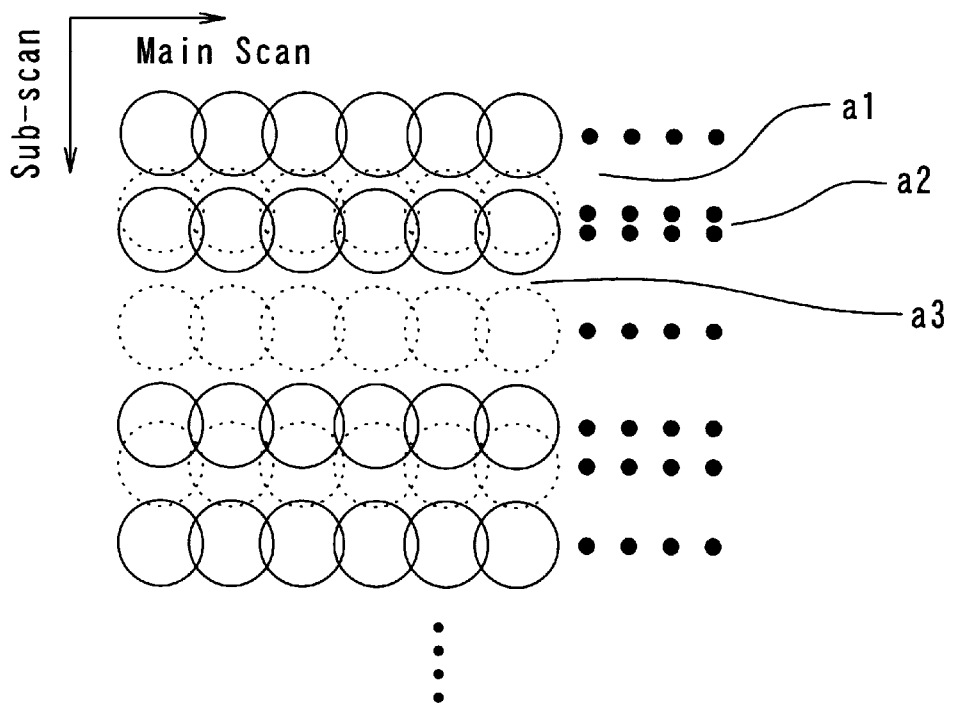
FIG. 46 shows the state of dot creation when the sufficient accuracy of sheet feeding in the sub-scan is not ensured.

As described previously, FIG. 44 shows the state of recording the image by the interlace method with the fixed amount of sheet feeding corresponding to 7 raster lines. In the drawings of FIGS. 15 and 46, the positions of the raster lines in the sub-scanning direction are fixed. For example, the position of the nozzle #7 corresponds to the raster line RN=−7 in the pass P4 of the main scan. The nozzle pitch and the number of nozzles are also identical in both the examples of FIGS. 15 and 46. In the example of FIG. 44, the area up to the pass P6 of the main scan is the area with the sufficient accuracy of sheet feeding. There is dropout of a raster line RN=−10, so that the image is completed only in the area above the raster line RN=−11 (that is, the area of RN≦−11). In the example of FIG. 15, on the other hand, the intermediate processing enables the image to be completed in the area up to the raster line RN=0 (that is, the area of RN≦0).

The intermediate processing with the reduced number of working nozzles enables extension of the area where the image is recorded with the sufficient accuracy of sheet feeding. The reduction in number of working nozzles, on the other hand, lowers the efficiency of dot creation and decreases the printing speed. The reduction in number of working nozzles may further cause the adjoining raster lines to be formed by the same nozzle. The structure of this embodiment sets the intermediate processing with the above amount of sheet feeding by comprehensively taking into account these facts. The amount of sheet feeding in the intermediate processing may be varied according to these facts. In any case, however, the amount of sheet feeding in the intermediate processing should be smaller than the amount of sheet feeding in the standard printing operation. The greater amount of sheet feeding in the intermediate processing than in the standard processing operation does not enable extension of the area that records the image while ensuring the sufficient accuracy of sheet feeding.

After the dot recording operation by the intermediate processing, the CPU 41 carries out a positioning feed at step S400. The positioning feed is a sub-scan to the position of the pass P9 of the main scan in FIG. 15. The amount of positioning feed is set according to the amount of sheet feeding in the subsequent extension printing operation. The concept of the positioning feed is described with the drawings of FIGS. 17 and 18, prior to the description of the extension printing operation in this embodiment.

Figure 17:
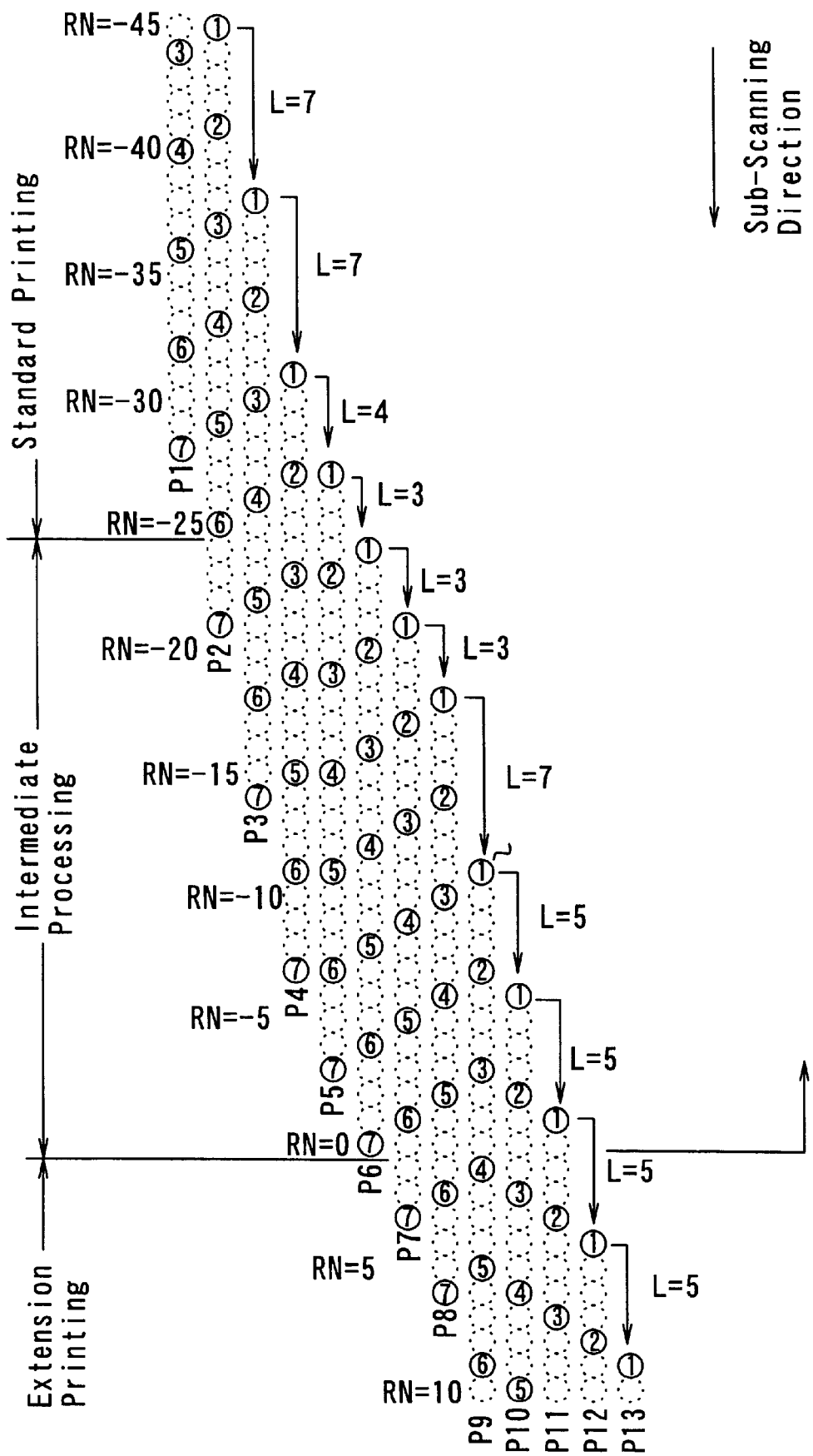
FIG. 17 shows one example of the extension printing operation.

FIG. 17 shows one example of the extension printing operation, and FIG. 18 is a table showing the raster lines formed by the respective nozzles in each pass of the main scan in the state of FIG. 17. The dot creation by the standard printing operation and the intermediate processing in the example of FIG. 17 is identical with the dot creation of this embodiment described previously with the drawing of FIG. 15. The dot creation by the extension printing operation in the example of FIG. 17 is different from the dot creation of this embodiment shown in FIG. 15.

As described previously, the intermediate processing completes the image in the area above the raster line RN=0 (that is, the area of RN≦0) in this embodiment. In the subsequent extension printing operation, the image should be recorded in the area below the raster line RN=1 (that is, the area of RN≧1). As clearly understood from FIG. 17, at the time when the intermediate processing is concluded, the nozzles #6 and #7 are already present in this area. Since the sub-scan is carried out only in one direction, the nozzles #6 and #7 can not be used for the extension printing operation. Namely the extension printing operation carries out recording by the interlace method only with five nozzles, the nozzles #1 through #5. In the description hereinafter, the nozzle #5 may be referred to as the end nozzle in this sense. If the extension printing operation is carried out with four nozzles up to the nozzle #4, the end nozzle is the nozzle #4.

When the intermediate processing is concluded, that is, in the pass P8 of the main scan of FIG. 17, the end nozzle #5 is located at the raster line RN=−2, which is above the area of the completed image. In order to record the image adjoining to and below the raster line RN=1, it is required to carry out the interlace recording from the state in which the nozzle #5 is located at the position of the raster line RN=0.

Further sub-scan by a certain amount of sheet feeding set for the interlace recording is required for the extension printing operation. When the technique of setting the amount of sheet feeding by the interlace method in the standard printing operation is adopted for the extension printing operation, the amount of sheet feeding in the extension printing operation is set equal to 5 raster lines. This amount of sheet feeding is smaller than the amount of sheet feeding in the standard printing operation, since the number of working nozzles is reduced in the extension printing operation.

When there are five available nozzles, that is, the nozzles #1 through #5, for the interlace recording in the extension printing operation, the amount of positioning feed at step S400 is set equal to 7 raster lines as the sum of the 2 raster lines, which is required for moving the end nozzle #5 to the position of the raster line RN=0, and the 5 raster lines, which is the amount of sheet feeding in the extension printing operation. The example of FIG. 17 carries out the positioning feed of 7 raster lines thus calculated and then records dots according to the interlace method by the fixed amount of sheet feeding corresponding to 5 raster lines.

The arrangement of this embodiment shown in FIG. 15, on the other hand, carries out the positioning feed of 5 raster lines and then records dots while carrying out the sub-scan by the fixed amount of sheet feeding corresponding to 3 raster lines in the extension printing area. As mentioned above, the five nozzles #1 through #5 are available for the extension printing operation. The example of FIG. 17 records dots with all of these available nozzles. The embodiment shown in FIG. 15, on the other hand, excludes the nozzles #1 and #2 from the five available nozzles and records dots only with the three nozzles #3 through #5. This setting further decreases the amount of sheet feeding for the interlace recording to 3 raster lines. The amount of positioning feed at step S400 is accordingly set equal to 5 raster lines as the sum of the 2 raster lines, which is required for moving the end nozzle #5 to the position of the raster line RN=0, and the 3 raster lines, which is the amount of sheet feeding in the extension printing operation. The reason why the number of working nozzles in the extension printing operation is reduced to three in this embodiment will be discussed later.

After the positioning feed, the CPU 41 sets the working nozzles at step S500 and carries out the data masking operation for the non-working nozzles at step S600. This embodiment sets the three nozzles, the nozzles #3 through #5, as the working nozzles as described above. The data masking operation prevents the dot creation data from being transferred to the transfer buffer 47 (see FIG. 11) and thereby interferes with creation of dots. In the table of FIG. 16, the symbol n/a is allocated to the nozzles #1, #2, #6, and #7 in the extension printing operation.

The CPU 41 subsequently carries out the extension printing operation at step S700. The basic flow of dot creation by the extending printing operation is similar to that of the standard printing routine shown in the flowchart of FIG. 13 and is thus not specifically illustrated. The difference between the standard printing operation and the extension printing operation is the amount of sheet feeding in the sub-scan. The extension printing operation adopts the interlace method by the fixed amount of sheet feeding corresponding to 3 raster lines to create dots as described previously. Namely the extension printing operation creates the dots at the positions in the passes P10 through P14 of the main scan shown in FIG. 15. Since the image has already been recorded in the area above the raster line RN=0 (that is, the area of RN≦0), no dots are created by the nozzles that are present in this area. For example, the nozzle #3 forms raster lines only in and after the pass P11 of the main scan in the course of extension printing.

In the printer 22 of the embodiment described above, the interlace method is applied for the area of standard printing to give an image of high picture quality. The intermediate processing extends the area that records the image while ensuring the sufficient accuracy of sheet feeding. The image recording by the interlace method in the extended printable area ensures the high picture quality of the resulting printed image. The extension printing operation further extends the printable area, in which the image can be recorded. In the case where the user selects the print mode without the extension printing operation, printing is concluded either at step S200 or at step S300 in the flowchart of FIG. 12.

The reduction of the number of working nozzles to three results in decreasing the sheet feeding amount of the sub-scan in the extension printing operation. In the case where five nozzles are used for the extension printing operation, the sheet feeding amount of the sub-scan is 5 raster lines as shown in FIG. 17. The arrangement of this embodiment, however, uses only three nozzles for the extension printing operation, so that the sheet feeding amount of the sub-scan is 3 raster lines in the extension printing operation as shown in FIG. 15. In the area of extension printing, the accuracy of sheet feeding in the sub-scan is not sufficiently ensured as described previously with the drawing of FIG. 4. The error in sheet feeding of the sub-scan is generally caused by a slippage of the printing paper P against the rollers used for sheet feeding. The smaller amount of sheet feeding reduces the slippage and thereby the error in sheet feeding. The arrangement of this embodiment reduces the number of working nozzles used for the extension printing operation with sacrifice of a little decrease in printing speed, in order to decrease the amount of sheet feeding and thereby reduce the error in sheet feeding of the sub-scan. The printer 22 of this embodiment accordingly gives an image of relatively favorable picture quality even in the area of extension printing.

In addition to the above effect, the printer 22 of the embodiment makes the unevenness of density, which is caused by a variation in interval between each pair of adjoining raster lines due to the sheet feeding error, relatively inconspicuous, thereby improving the picture quality in the area of extension printing.

The structure of the above embodiment carries out dot recording by the interlace method with the smaller number of nozzles in the extension printing operation than that in the standard printing operation. In the dot recording procedure by the interlace method, values that are prime to each other are generally set to the nozzle pitch k (dots) and the number of nozzles N. The sub-scan by a fixed amount of sheet feeding equal to N raster lines, which corresponds to the number of nozzles N, enables the dot recording by the interlace method. The above embodiment sets the number of nozzles and the amount of sheet feeding by taking into account this relationship.

When the number of nozzles and the amount of sheet feeding are specified in the above manner, raster lines of the number corresponding to the number of working nozzles are formed consecutively in the sub-scanning direction or in the reverse direction. The raster-forming process in the extension printing area is described in the example of FIG. 17. As described previously, the example of FIG. 17 implements dot recording by the interlace method with the five nozzles arranged at the intervals of 4 dot pitch in the extension printing area. The five raster lines RN=5 through RN=9 are successively formed by the five consecutive passes P9 through P13 of the main scan. When the amount of sheet feeding is set to satisfy the above relationship in the interlace method, raster lines of the number corresponding to the number of working nozzles are consecutively formed in this manner. Although the raster lines are successively formed in the sub-scanning direction in the example of FIG. 17, the raster lines may be formed successively in the reverse direction. The four raster lines RN=1 through RN=4 are also formed consecutively. In this case, the number of raster lines formed consecutively is less than the number of working nozzles, because these raster lines are formed immediately after the start of the extension printing operation.

Figure 19:
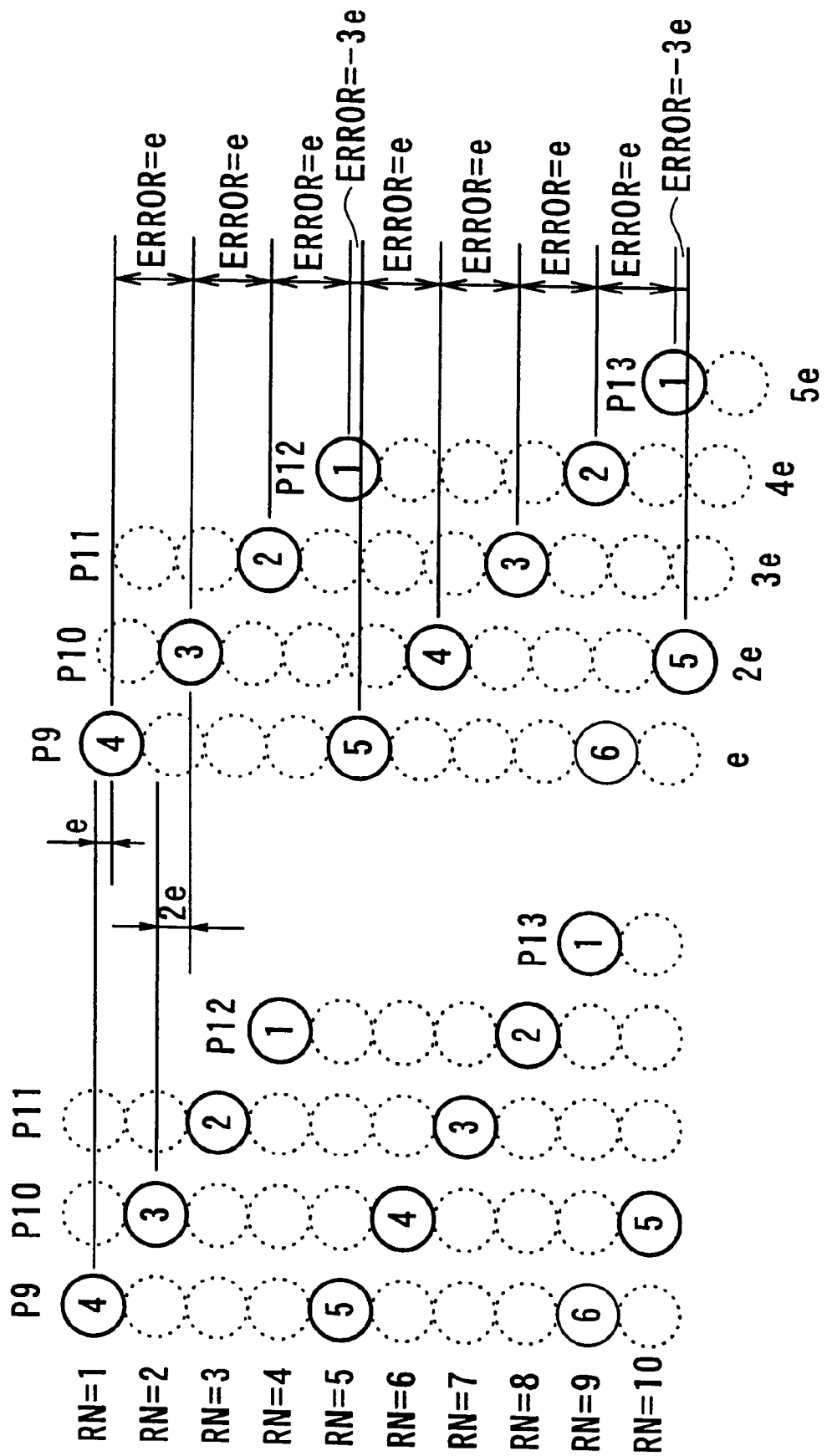
FIG. 19 shows a variation in interval between each pair of adjoining raster lines in the extension printing area of FIG. 17.

The accuracy of sheet feeding in the sub-scanning direction in the extension printing area is lower than that in the standard printing area. FIG. 19 shows a variation in interval between each pair of adjoining raster lines in the extension printing area of FIG. 17. Only the dots created in the extension printing area of FIG. 17 are shown in FIG. 19. The symbols in FIG. 19 have the same meanings as those in FIG. 17. The left-side drawing of FIG. 19 shows the positions of the dots without any error in the sub-scan, whereas the right-side drawing of FIG. 19 shows the positions of the dots when a fixed amount of sheet feeding error 'e' occurs in each sub-scan. The error 'e' arises in the direction of increasing the amount of sheet feeding in the example of FIG. 19.

The position of the nozzle #4 in the pass P9 of the main scan in the left-side drawing of FIG. 19 is compared with the same in the right-side drawing. In the case with the sheet feeding error, the nozzle #4 records a dot at the position deviated by the error 'e' from the position of the dot in the case without the sheet feeding error. Another sheet feeding error 'e' arises in the pass P10 of the main scan, in addition to the error 'e' in the pass P9 of the main scan. Namely the pass P10 of the main scan has the accumulated amount of sheet feeding error equal to 2e. In the case with the sheet feeding error, dots in the pass P10 of the main scan are recorded at the positions deviated by the amount 2e in the sub-scanning direction from the positions of the dots in the case without the sheet feeding error. The accumulated amount of sheet feeding error gradually increases as 3e, 4e, and 5e in the respective passes P11, P12, and P13 of the main scan. The values in the bottom of the right-side drawing in FIG. 19 denote the accumulated amounts of sheet feeding error in the respective passes of the main scan.

The values on the right side of FIG. 19 denote the errors in interval between each pair of adjoining raster lines, in the case where the dots are recorded with the sheet feeding error. The error of the interval between each pair of adjoining raster lines is calculated as the difference in accumulated amount of sheet feeding error between the passes of the main scan that form the adjoining raster lines. By way of example, the error of the interval between the adjoining raster lines formed by the pass P10 (accumulated error of 2e) and the pass P9 (accumulated error of e) of the main scan is equal to 'e', which is obtained by subtracting the accumulated amount of sheet feeding error in the pass P9 from that in the pass P10 of the main scan. The error of the interval between each pair of adjoining raster lines is calculated in this manner. As clearly understood from FIG. 19, the error of the interval between the adjoining raster lines formed by the consecutive passes of the main scan is fixed to the value 'e'. There is an error '−3e' of the interval between the adjoining raster lines that are formed by the non-consecutive passes of the main scan. The adjoining raster lines formed by the non-consecutive passes of the main scan appear at intervals corresponding to the number of working nozzles. In the example of FIG. 17, the interval between the adjoining raster lines is significantly deviated on every fifth raster line. This part may be recognized visually as banding, which deteriorates the picture quality.

Figure 20:
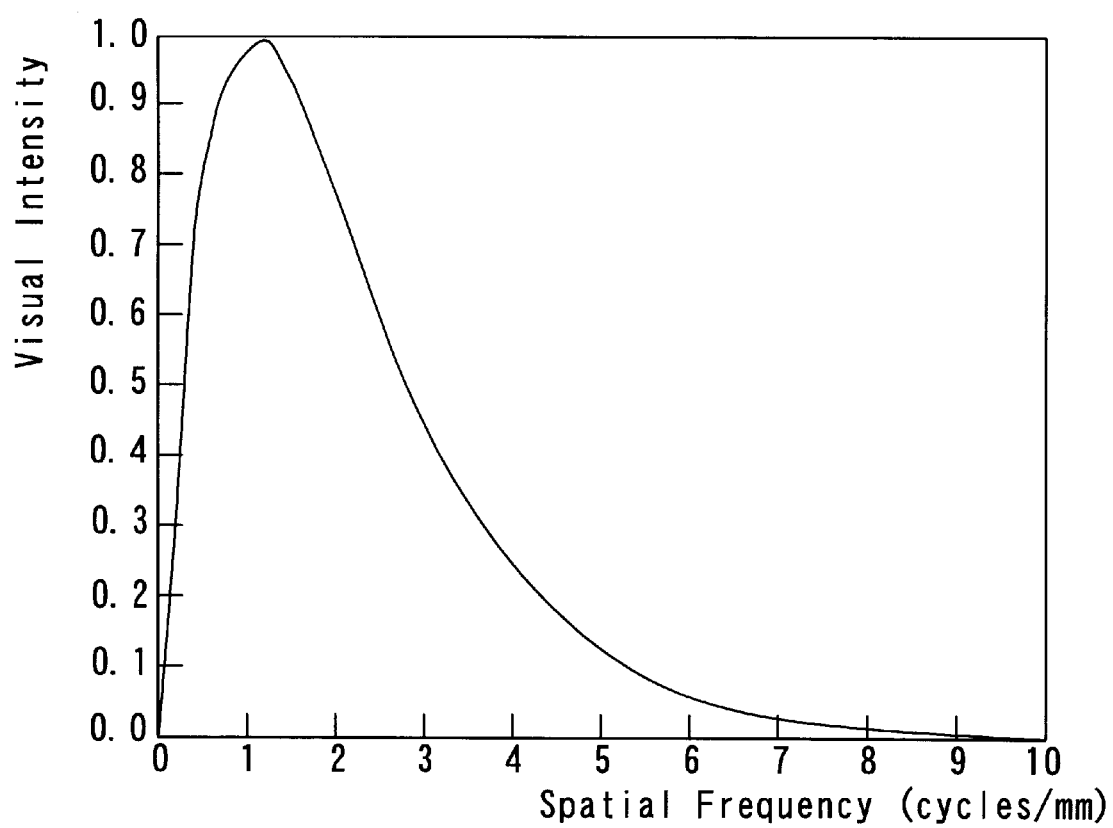
FIG. 20 is a graph showing the relationship between the spatial frequency and the visual intensity.

Measurement of the spatial frequency determines whether or not the deviation of the interval between the adjoining raster lines is conspicuous. The graph of FIG. 20 shows the relationship between the spatial frequency and the visual intensity. The visual intensity reaches a peak at the spatial frequency of approximately 1 cycle/mm as shown in FIG. 20. This means that the human vision is sensitive to the unevenness of density at the spatial frequency of about 1 cycle/mm. When there is a variation in density at the intervals corresponding to the number of working nozzles as described with the drawing of FIG. 19, an increase in the number of working nozzles enhances the variation in density at the spatial frequency of about 1 cycle/mm. The variation in density due to the lower accuracy of sheet feeding is thus readily recognized as the banding.

The variation in density due to the lower accuracy of sheet feeding is discussed in the structure of the embodiment shown in FIG. 15. The embodiment of FIG. 15 forms three adjoining raster lines by the consecutive passes of the main scan in the area of extension printing. For example, the raster lines RN=1 through RN=3 are formed by the consecutive passes of the main scan. In the example of FIG. 15, the adjoining 4 raster lines formed by the non-consecutive passes of the main scan appear on every third raster line. This shortens the interval of the variation in density and thereby increases the spatial frequency, compared with the example of FIG. 19. The absolute value of the deviation of the interval between the adjoining raster lines formed by the non-consecutive passes of the main scan in the example of FIG. 15 is equal to '2e', which is smaller than the absolute value of the deviation '3e' in the example of FIG. 19. The dot recording procedure of the embodiment shown in FIG. 15 accordingly causes the variation in density due to the lower accuracy of sheet feeding in the sub-scan to be not readily recognized as the banding and thereby improves the picture quality of the resulting printed image.

Figure 21:
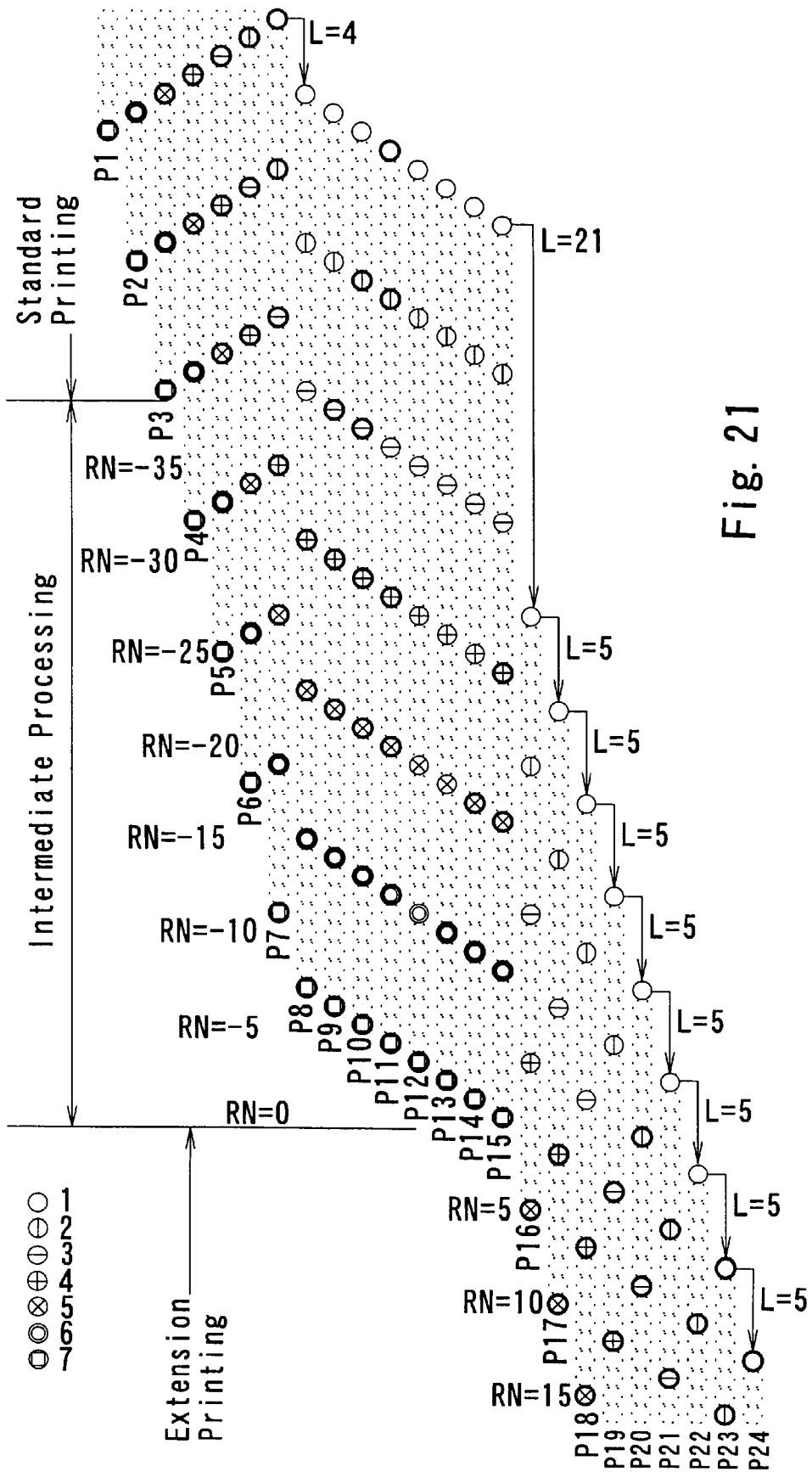
FIG. 21 shows the state of dot creation in a first modified arrangement of the first embodiment.

One modification of the above embodiment is the recording method that heightens the frequency of the variation in density in the sub-scanning direction and thereby improves the picture quality in the extension printing area. FIG. 21 shows the state of dots recorded in this modified arrangement, and FIG. 22 is a table showing the raster lines formed by the respective nozzles in each pass of the main scan in the state of FIG. 21. The example of FIG. 21 uses seven nozzles arranged at the nozzle pitch of 8 raster lines. For convenience of illustration, the respective nozzles #1 through #7 are shown by symbols, which are defined in the lower left portion of FIG. 21.

In the standard printing area, the recording procedure carries out the sub-scan by a fixed amount of sheet feeding corresponding to 7 raster lines. After a transient feed of 4 raster lines, the intermediate processing records dots while carrying out the fine sheet feeding of one raster line. A variety of other settings may be applicable for the amount of sheet feeding in the intermediate processing.

After a transient feed of 21 raster lines, the extension printing operation is carried out with a less number of working nozzles than the number of working nozzles used for the standard printing operation. The method of setting the amount of transient feed is discussed above with the drawing of FIG. 15. This modified structure of the embodiment carries out the extension printing operation with five nozzles. The number of working nozzles used for the extension printing operation is set in the following manner.

In the interlace recording, values that are prime to each other are generally set to the nozzle pitch and the number of nozzles as described previously. This modified structure of the embodiment sets the number of working nozzles equal to a value that is prime to the nozzle pitch (=8) and is selected among the values except k·s±1, where k denotes the nozzle pitch and s denotes the number of repeated scans or the number of passes of the main scan required for forming each raster line. Since this example has the nozzle pitch k=8 and the number of repeated scans s=1, the number of working nozzles is selected among the values except 9 and 7. In this example, the number of working nozzles is set equal to 5, which satisfies the above two conditions.

When the number of nozzles and the nozzle pitch are prime to each other, the sub-scan by the amount of sheet feeding corresponding to the number of nozzles implements the interlace recording. In the modified application of the embodiment, the extension printing operation carries out the sub-scan by a fixed amount of sheet feeding corresponding to 5 raster lines. As clearly understood from FIG. 21, any pair of adjoining raster lines in the extension printing area are formed by the non-consecutive passes of the main scan. This is because the number of working nozzles is selected among the values except k·s±1.

Figure 23:
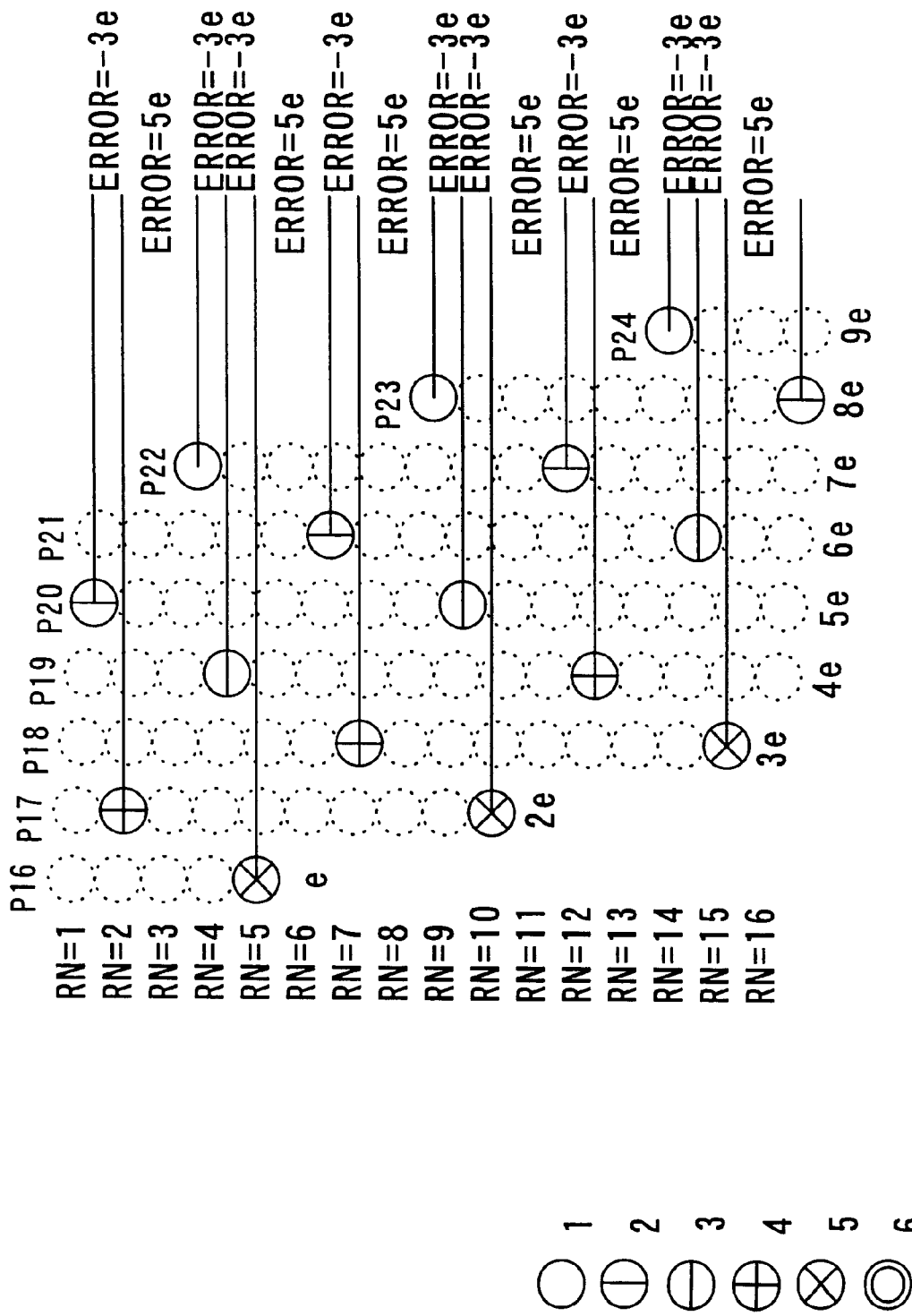
FIG. 23 shows a variation in interval between each pair of adjoining raster lines in the extension printing area of FIG. 21.

FIG. 23 shows a variation in interval between each pair of adjoining raster lines in the extension printing area of FIG. 21. The symbols assigned to the respective nozzles are shown in the lower left portion of FIG. 23. Only the positions of the dots in the case with the sheet feeding error of the sub-scan are shown in FIG. 23. The accumulated amount of sheet feeding error gradually increases from e to 9e in the passes P16 through P24 of the main scan. The values on the right side of FIG. 23 denote the errors in interval between the adjoining raster lines. The deviation of the interval between the adjoining raster lines is varied at the cycle of −3e, 5e, and −3e. The maximum deviation is 5e and appears on every third raster line in the sub-scanning direction. This example is compared with one comparative example, in which seven adjoining raster lines corresponding to a nozzle pitch are formed by the consecutive passes of the main scan. In this case, the maximum deviation is equal to 7e and appears on every seventh raster line as described above with the drawing of FIG. 19. The maximum deviation in the modified arrangement of the embodiment is smaller than the maximum deviation in the comparative example where seven adjoining raster lines are formed consecutively. The interval of the appearance of the maximum deviation in the example of FIG. 21 is less than half the interval of the appearance of the maximum deviation in the comparative example. This ensures the higher spatial frequency, which depends upon the sheet feeding error, in the arrangement of FIG. 21.

In addition to the effect of improving the picture quality by reducing the number of working nozzles used for the extension printing operation, the modified arrangement of the embodiment enhances the spatial frequency, which depends upon a variation in interval between each pair of adjoining raster lines in the extension printing area, so as to make the banding inconspicuous. Any possible setting for the number of working nozzles used in the extension printing area based on the above conditions effectively reduces the part of the extension printing area in which adjoining raster lines are formed by the consecutive passes of the main scan. Possible settings for the nozzle pitch and the number of nozzles are thus not restricted to those in the example of FIG. 21. In the example of FIG. 21, no pair of adjoining raster lines are formed by the consecutive passes of the main scan in the extension printing area. Other arrangements that allow adjoining raster lines to be formed by the consecutive passes of the main scan in only an extremely small part of the extension printing area, however, have substantially similar effects.

Figure 24:
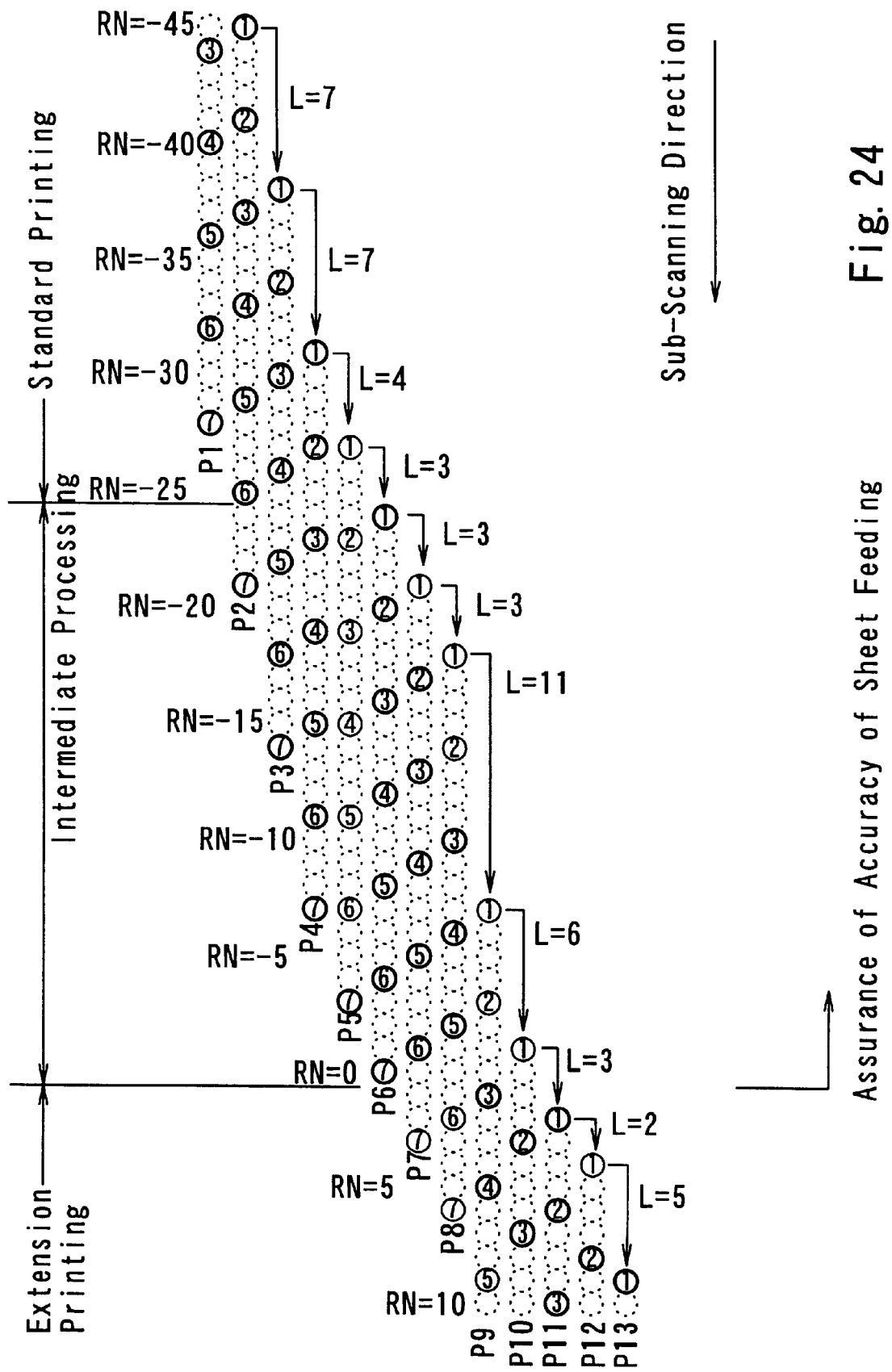
FIG. 24 shows the state of dot creation in a second modified arrangement of the first embodiment.

The recording procedure that shortens the cycle of variation in interval between each pair of adjoining raster lines in the extension printing area can be implemented even when a value that is not prime to the nozzle pitch is set to the number of working nozzles. This arrangement is discussed below as a second modified application of the embodiment. FIG. 24 shows the state of dots recorded in this second modified arrangement, and FIG. 25 is a table showing the raster lines formed by the respective nozzles in each pass of the main scan in the state of FIG. 24. The example of FIG. 24 uses seven nozzles arranged at the nozzle pitch of 4 raster lines.

Like the procedure of the first embodiment discussed above with the drawing of FIG. 15, this second modified arrangement carries out the sub-scan by a fixed amount of sheet feeding corresponding to 7 raster lines in the standard printing operation. After a transient feed of 4 raster lines, the intermediate processing carries out the sub-scan by a fixed amount of sheet feeding corresponding to 3 raster lines. This arrangement implements the extension printing operation after a transient feed of 11 raster lines. The method discussed above in the first embodiment is adopted to set the amount of transient feed. In the second modified arrangement, the number of working nozzles used for the extension printing operation is set equal to 4, which corresponds to the nozzle pitch and is less than the number of working nozzles used for the standard printing operation.

In this case, the sub-scan by a fixed amount of sheet feeding does not implement the interlace recording. This arrangement accordingly carries out the sub-scan in the extension printing area by periodically changing the amount of sheet feeding at the cycle of 6 dots, 3 dots, 2 dots, and 5 dots. The mean amount of sheet feeding is equal to 4 dots, which is coincident with the number of working nozzles. The combination of the amounts of sheet feeding is determined to prevent an identical raster line from being recorded by different nozzles in an overlapping manner and to satisfy the condition that the mean amount of sheet feeding coincides with the number of working nozzles. Possible settings for the number of nozzles and the nozzle pitch are not restricted to those in the example of FIG. 24.

The extension printing operation with the varying amount of sheet feeding significantly reduces the number of adjoining raster lines formed by the consecutive passes of the main scan as clearly shown in FIG. 24. There are only two adjoining raster lines formed by the consecutive passes of the main scan in the extension printing area. The extension printing operation in this second modified arrangement enhances the spatial frequency, which depends upon a variation in interval between each pair of raster lines, so as to make the banding inconspicuous, in addition to the effect of improving the picture quality by reducing the number of working nozzles.

In the first embodiment and its modified applications discussed above, dots of a fixed diameter are created to record an image. Another possible application creates dots of a greater diameter in the extension printing area than the diameter of dots created in the standard printing area and the intermediate processing area. As a matter of convenience of explanation, the dots created in the standard printing area and the intermediate processing area are hereinafter referred to as the small dots, and those created in the extension printing area are referred to as the large dots. The principle of creating the large dots is discussed previously with the drawings of FIGS. 9 and 10.

Figure 26:
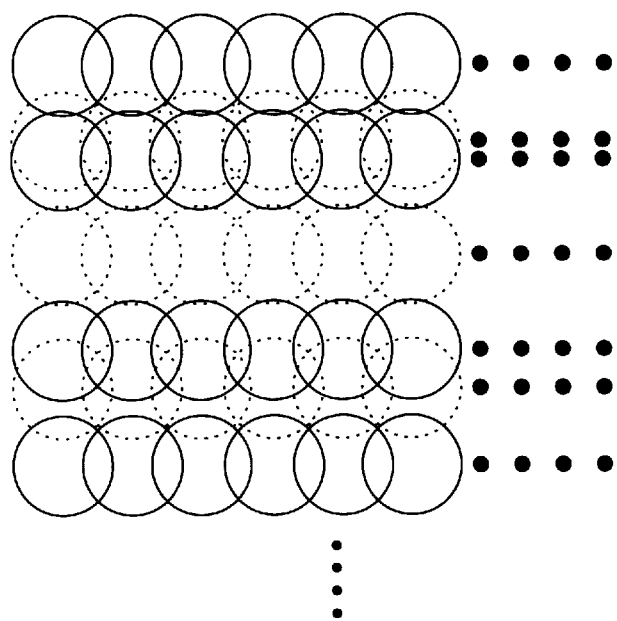
FIG. 26 shows the state in which large dots are created.

FIG. 26 shows the state in which large dots are created. For better understanding of illustration, the raster lines filled with dots are shown alternately by the solid line and the broken line. As discussed previously with the drawing of FIG. 46, the lower accuracy of sub-scan changes the recording pitch in the sub-scanning direction and occasionally causes dropout of a raster line (see the area 'a3' in FIG. 46). In the example of FIG. 26, large dots are recorded at the varying recording pitch in the sub-scanning direction, which is identical with that in the example of FIG. 46. The comparison between the states of FIG. 26 and FIG. 46 shows that the larger dot diameter enables the adjoining dots to overlap each other even in the case of the lower accuracy of sub-scan and thereby prevents dropout of a raster line. The human vision is extremely sensitive to the dropout, so that prevention of the dropout significantly improves the picture quality.

The large dots have a higher density per unit area. A simple increase in dot diameter may thus result in increasing the density of the resulting image to a higher level than the expected density. It is thus preferable to set the ratio of small dots to large dots adequately in the range that does not damage the tone of the resulting image.

Figure 27:
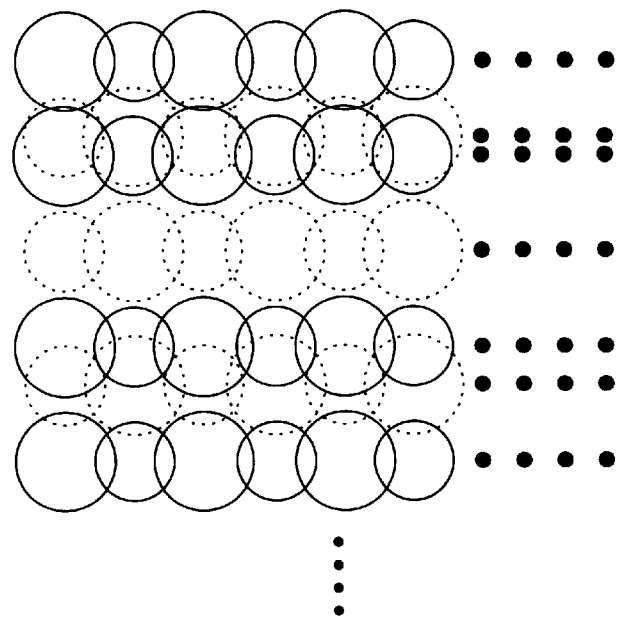
FIG. 27 shows the state in which dots of different diameters are mixed.

FIG. 27 shows the state in which dots of different diameters are mixed at the ratio that does not damage the tone of the resulting image. The recording pitch in the sub-scanning direction in FIG. 27 is identical with that in FIGS. 28 and 48. Creating the large dots at an adequate ratio prevents dropout of a raster line as shown in FIG. 27. The large dots and the small dots may be created at random or according to a predetermined pattern, such as checker.

Figure 28:
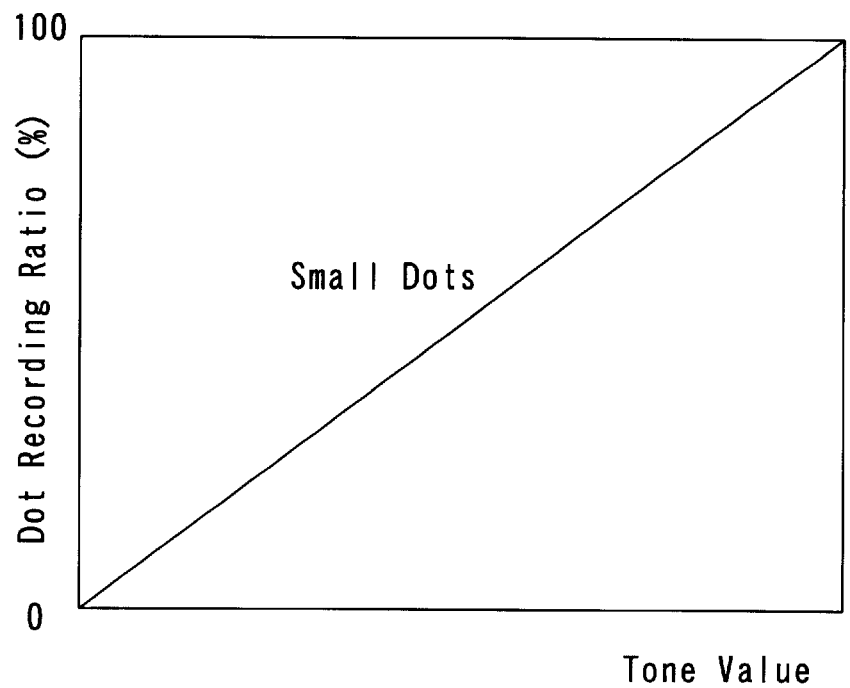
FIG. 28 is a graph showing a curve of dot recording ratio in the case where only small dots are created to record the image.
Figure 30:
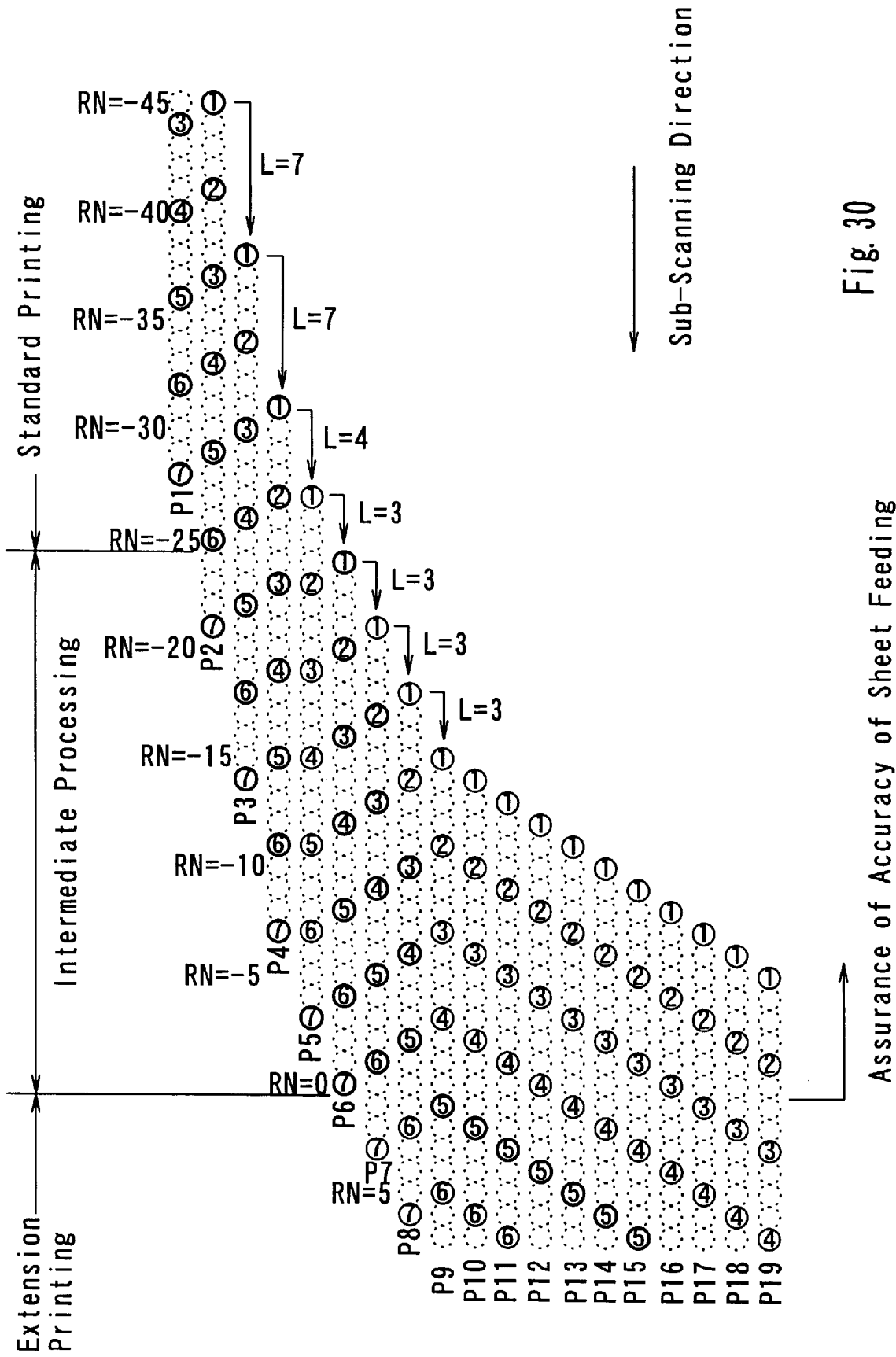
FIG. 30 shows the state of dot creation in a second embodiment according to the present invention.

FIGS. 30 and 31 are graphs showing variations in dot recording ratio. The graph of FIG. 28 shows a curve of dot recording ratio in the case where only small dots are created to record the image in the standard printing area. The recording ratio of small dots increases with an increase in tone value. The dot recording ratio represents the rate of dots created to express a certain tone in a solid area.

Figure 29:
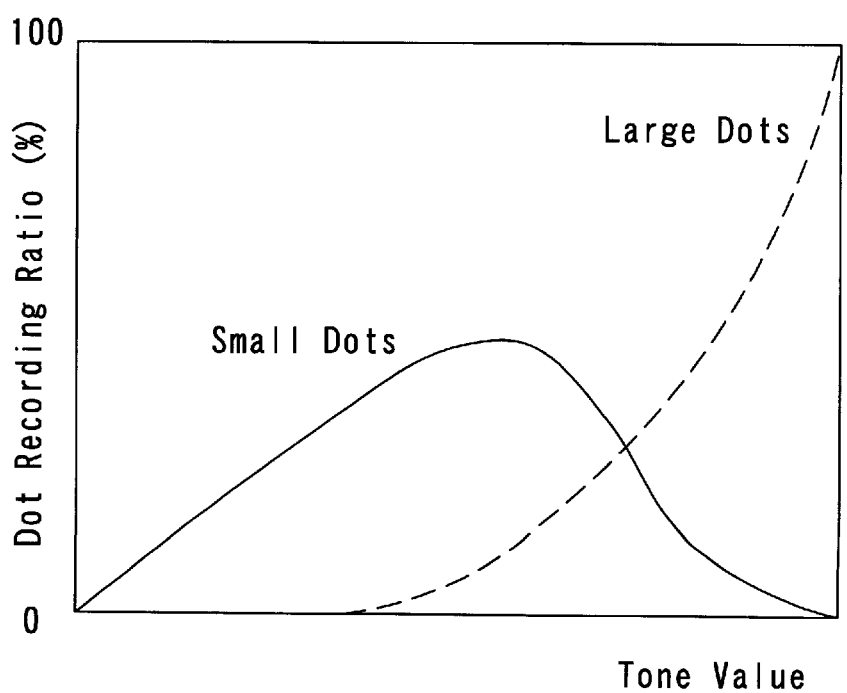
FIG. 29 is a graph showing curves of dot recording ratio in the case where large dots and small dots are mixed to record the image.

The graph of FIG. 29 shows curves of dot recording ratio in the case where large dots and small dots are mixed to record the image in the extension printing area. The ratio of small dots gradually decreases after creation of large dots starts and increases with an increase in tone value. A variety of settings may be applicable for the ratio of large dots to small dots according to their dot diameters. Creation of large dots may start at the lower tone value than that shown in FIG. 29. This example of FIG. 29 has experimentally set the dot recording ratio, in order to ensure adequate expression of the tone while making the banding inconspicuous in the extension printing area. The standard printing operation may also create both the large dots and the small dots to record the image. In this case, it is preferable to provide at least two different settings for the dot recording ratio (one for the standard printing operation and the other for the extension printing operation), in order to enhance the dot recording ratio in the extension printing area.

As shown in FIG. 5, the printer 22 of this embodiment has a higher-density ink and a lower-density ink for cyan and magenta. In the case where dots of a greater diameter are created, the lower-density ink may be used according to the tone of the image to be expressed. The curves of dot recording ratio as shown in FIG. 29 may be provided in advance to determine the rates of the respective dots in this case.

The technique of creating dots of a greater diameter in the extension printing area to improve the picture quality may be used effectively alone or applicable to the extension printing operation by the amount of sheet feeding shown in FIG. 17.

(3) Dot Creation Control in Second Embodiment

The following describes the procedure of dot creation control in a second embodiment according to the present invention. The printer of the second embodiment has the same hardware structure as that of the first embodiment. The main flow of dot creation control is also similar to that of the first embodiment shown in the flowcharts of FIGS. 12 and 13.

FIG. 30 shows the state of dot creation in the second embodiment, and FIG. 31 is a table showing the raster lines formed by the respective nozzles in each pass of the main scan in the state of FIG. 30. As clearly understood from these drawings, the standard printing operation in the second embodiment forms raster lines while carrying out the sheet feeding of 7 raster lines. In the same manner as that of the first embodiment, the intermediate processing records the image with the sub-scan of 3 raster lines after a transient feed of 4 raster lines.

Figure 32:
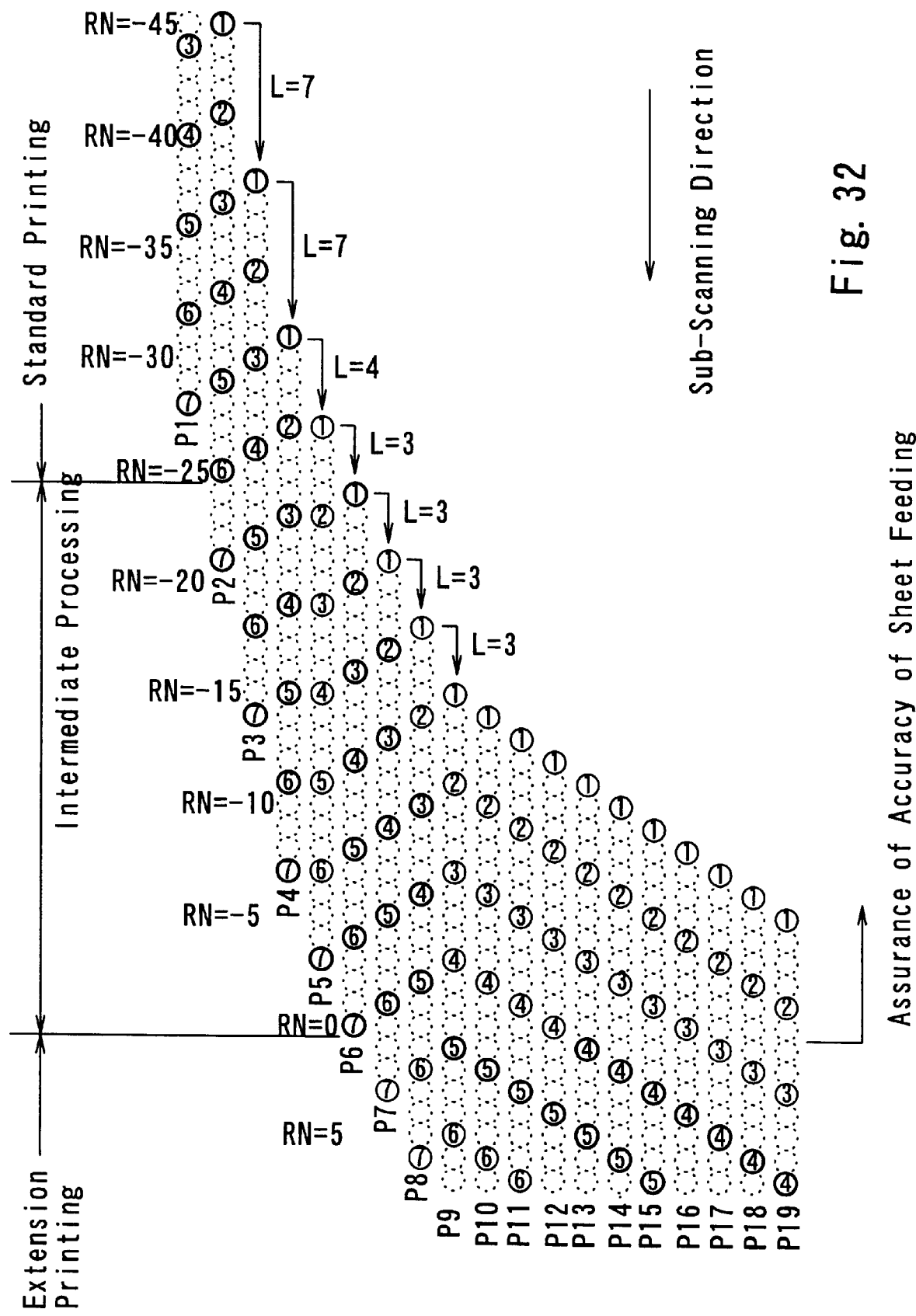
FIG. 32 shows the state of dot creation in a modified arrangement of the second embodiment.

The difference between the second embodiment and the first embodiment is the amount of sheet feeding in the extension printing area. As shown in FIGS. 32 and 33, the extension printing operation of the second embodiment (the pass P9 and the subsequent passes of the main scan in FIG. 30) carries out the fine sheet feeding of one raster line to record the image. Since it is not required to create dots on the raster line that has already been recorded, only the nozzle #5 is used to create dots in the extension printing area. The nozzle #5 is used for the extension printing operation since this is the end nozzle at the time of conclusion of the intermediate processing and minimizes the amount of transient feed before the extension printing operation.

The principle of positioning feed discussed above in the first embodiment is applied to determine the amount of sheet feeding in the sub-scan before the extension printing operation, that is, the sheet feeding amount between the passes P8 and P9 of the main scan in FIG. 30. The amount of positioning feed here is set equal to 3 raster lines as the sum of the 2 raster lines, which is required for moving the end nozzle #5 to the position of the raster line RN=0, and the 1 raster line, which is the amount of sheet feeding in the extension printing operation.

The printer of the second embodiment adopts the fine sheet feeding technique and thereby ensures the sub-scan with the highest possible accuracy in the extension printing area. This arrangement favorably improves the picture quality in the extension printing area.

One possible modification of the second embodiment causes each raster line to be formed by two passes of the main scan in the extension printing area. FIG. 32 shows the state of dot creation in this modified arrangement, and FIG. 33 is a table showing the raster lines formed by the respective nozzles in each pass of the main scan in the state of FIG. 32.

In the modified example of FIG. 32, the process of dot recording in the standard printing area and the intermediate processing area, that is, in the passes P1 through P8 of the main scan, is identical with that of the second embodiment discussed above with the drawing of FIG. 30. The sub-scan in the extension printing area is also identical with that of the second embodiment.

In the dot recording procedure of FIG. 32, however, each raster line is formed by two passes of the main scan with the two nozzles #4 and #5 in the extension printing area. For example, part of the dots on the raster line RN=1 are created by the nozzle #5 in the pass P9 of the main scan, whereas the residual dots on the raster line RN=1 are created by the nozzle #4 in the pass P13 of the main scan. The technique of creating each raster line by two or more passes of the main scan is called the overlap method.

Figure 34:
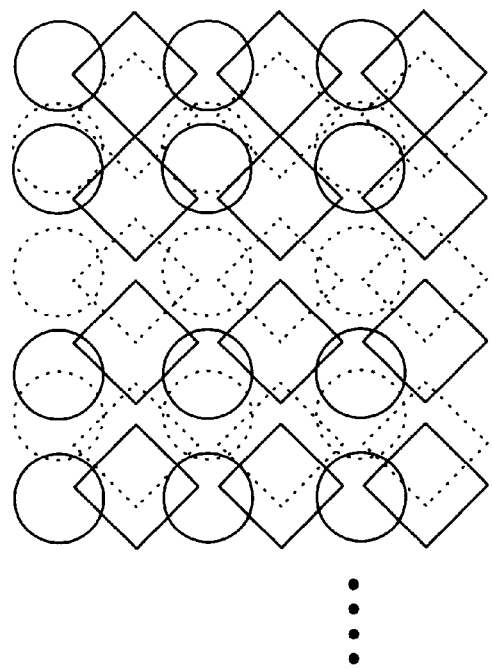
FIG. 34 shows the state of dots in a first arrangement when the overlap method is adopted.

FIG. 34 shows the state of dots created in the extension printing area by the technique of FIG. 32. The dots shown by the circle in FIG. 34 are those created with the nozzle #5 and the dots shown by the rhombus are those created with the nozzle #4. For better understanding of illustration, the raster lines filled with dots are shown alternately by the solid line and the broken line. In the example of FIG. 34, the nozzle #5 creates dots of odd numbers on each raster line in the main scanning direction, and the nozzle #4 creates dots of even numbers.

This recording procedure effectively disperses the error of the sub-scan in each raster line and thus further improves the picture quality. Part of the dots on a certain raster line are created with the nozzle #5, and the residual dots on the raster line are created with the nozzle #4 after several sub-scans. When the sub-scan has some sheet feeding errors, dots on each raster line are not perfectly aligned in the main scanning direction. In many cases, this reduces the mean sheet feeding error of each raster line in the sub-scanning direction, thereby improving the picture quality in the extension printing area.

Figure 35:
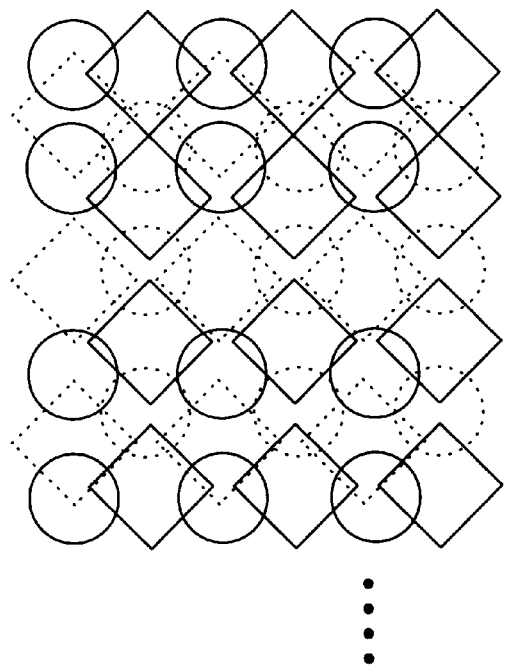
FIG. 35 shows the state of dots in a second arrangement when the overlap method is adopted.

A variety of methods may be applied to create the dots on each raster line in an intermittent manner by two passes of the main scan. For example, the dots created with each of the nozzles #4 and #5 have identical positions in the main scanning direction as shown in FIG. 34. Another example causes each of the nozzles #4 and #5 to create dots in a zigzag arrangement as shown in FIG. 35. A variety of other patterns are applicable to the dot creation. Instead of two passes of the main scan, each raster line may be formed by three or more passes of the main scan.

(4) Dot Creation Control in Third Embodiment

The following describes the procedure of dot creation control in a third embodiment according to the present invention. The printer of the third embodiment has the same hardware structure as that of the first embodiment. The main flow of dot creation control is also similar to that of the first embodiment shown in the flowcharts of FIGS. 12 and 13. For convenience of explanation, the third embodiment uses six nozzles arranged at the nozzle pitch of 4 raster lines, although the number of nozzles and the nozzle pitch are not restricted to these values.

Figure 36:
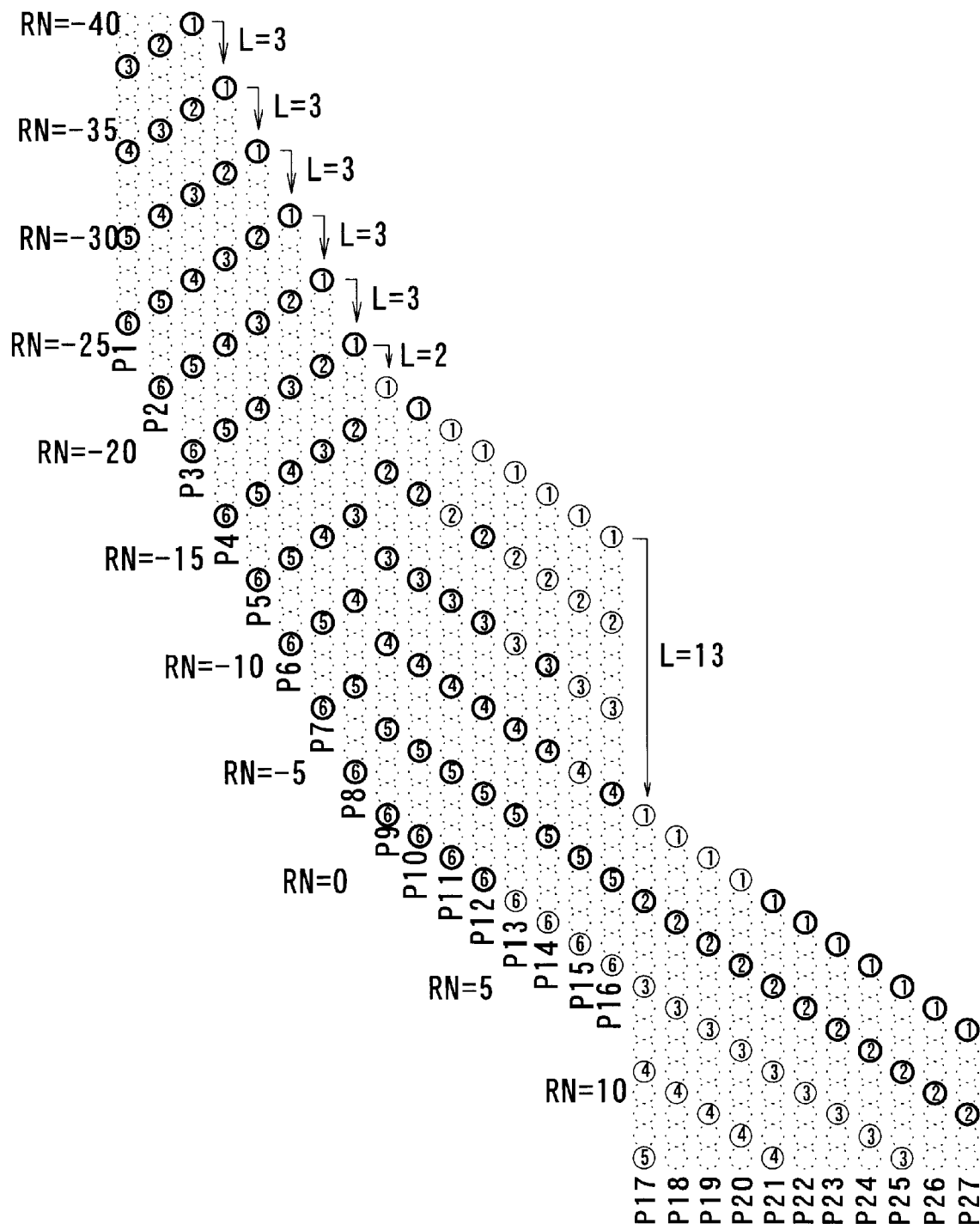
FIG. 36 shows the state of dot creation in a third embodiment according to the present invention.

FIG. 36 shows the state of dot creation in the third embodiment, and FIG. 37 is a table showing the raster lines formed by the respective nozzles in each pass of the main scan in the state of FIG. 36.

In the third embodiment, the standard printing operation carries out the sheet feeding of 3 raster lines (the passes P1 through P8 of the main scan in FIG. 36). As clearly understood from FIG. 36, each raster line is formed by two passes of the main scan in the standard printing area. Namely the overlap method with the number of repeated scans s equal to 2 is adopted to record dots. The dot recording procedure by the overlap method is described previously with the drawing of FIG. 34. Like the first embodiment, the structure of the third embodiment selects the optimum amount of sheet feeding that enables the nozzles to be used most effectively among alternative amounts of sheet feeding that enable an image to be recorded with no dropout of raster lines by the interlace method. The amount of sheet feeding is necessarily set to allow adjoining raster lines to be formed with different nozzles.

After conclusion of the standard printing operation, the intermediate processing carries out a transient feed of 2 raster lines to create dots in the pass P9 of the main scan and subsequently the fine sheet feeding of one raster line to record the image in the passes P10 through P16 of the main scan. In the area of intermediate processing, each raster line is also formed by two passes of the main scan. After the intermediate processing, the extension printing operation carries out a transient feed of 13 raster lines and then the fine sheet feeding of one raster line. Each raster line is formed by two passes of the main scan with the two nozzles #1 and #2 in the extension printing area.

The printer of the third embodiment adopts the intermediate processing and the extension printing operation to extend the printable area where the image can be recorded, while implementing the dot recording by the overlap method, thereby giving the image of higher picture quality.

In the third embodiment, the procedure adopts the overlap method to record dots with the fine sheet feeding of one raster line in the extension printing area. A variety of settings other than the fine sheet feeding of one raster line are available for the amount of sheet feeding in the extension printing area. As discussed above in the modified structures of the first embodiment, it is possible to set the amount of sheet feeding in such a manner that the spatial frequency, which depends upon a variation in interval between each pair of adjoining raster lines, is made sufficiently higher than 1 cycle/mm. In order to implement the printing with a fixed amount of sheet feeding in the sub-scan, the number of nozzles is selected among the values except k·s±1, based on the condition that the 'number of nozzles/number of repeated scans s' is prime to the nozzle pitch k. The sub-scan by the amount of sheet feeding corresponding to the 'number of nozzles/number of repeated scans s' effectively reduces the part in which adjoining raster lines are formed by the consecutive passes of the main scan, as discussed above in the modified structures of the first embodiment.

(5) Other Applications

Figure 38:
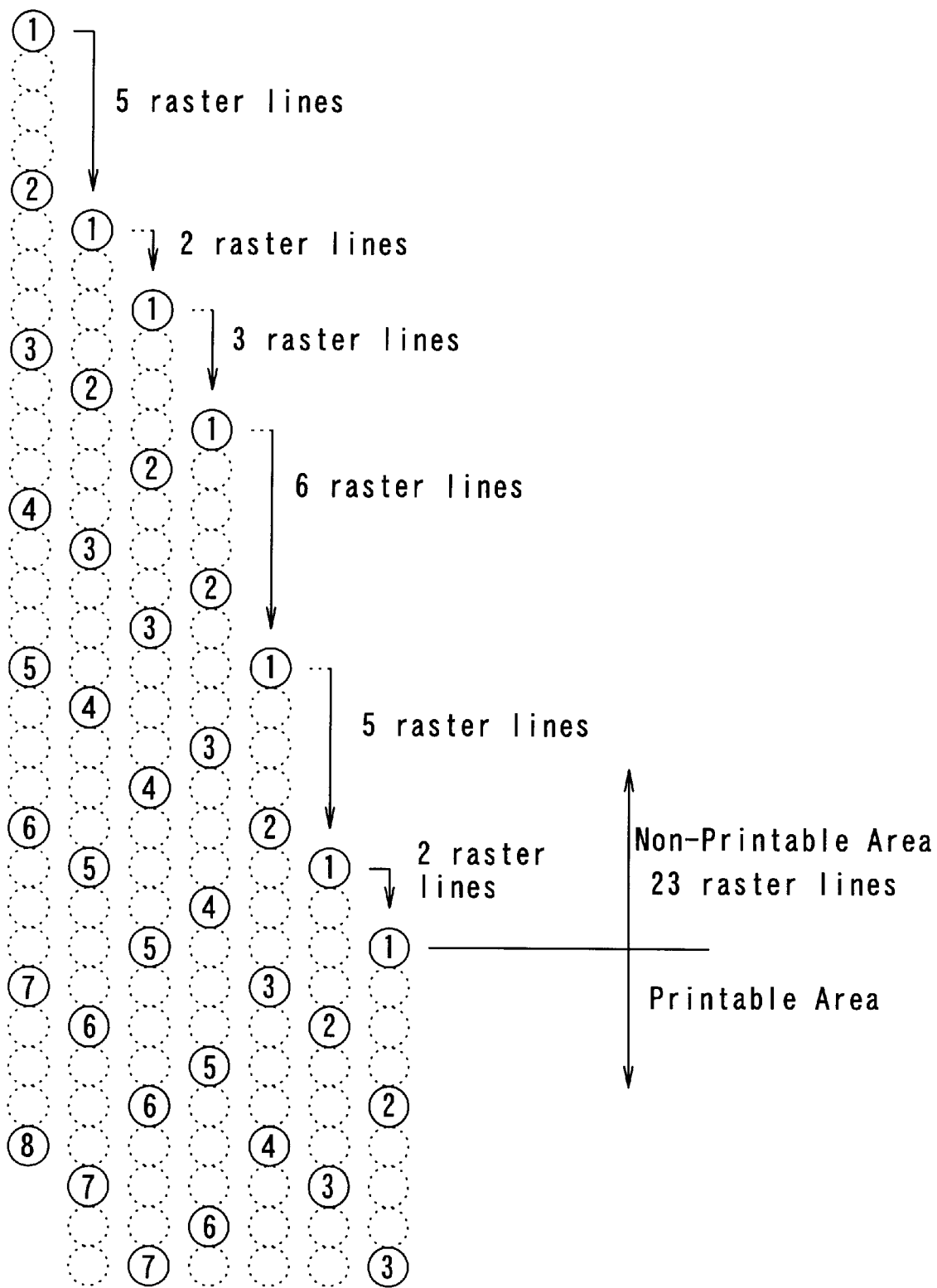
FIG. 38 shows the state of dot creation in the case of irregular feeding.

In the printers of the first through the third embodiments discussed above, the standard printing operation carries out the sheet feeding of a fixed amount. One possible modification adopts the irregular feeding technique using a combination of different feeding amounts as one cycle. FIG. 38 shows an example of the irregular feeding, in which dots are recorded with the head having eight nozzles arranged at the nozzle pitch of 4 raster lines. Different from the above embodiments, this modified structure carries out the sheet feeding in one cycle consisting of 5 raster lines, 2 raster lines, 3 raster lines, and 6 raster lines and records the image with the number of repeated scans equal to 2. In the printers of the respective embodiments, a variety of sheet feeding amounts may be set for the standard printing operation, the intermediate processing, and the extension printing operation.

In the above embodiments, the standard printing operation carries out printing in a fixed cycle of feeding amounts from the upper end of the image. In the case where the interlace method is applied to record the image, there is a non-printable area, in which the image can not be recorded, in an upper-end portion as clearly understood from the example of FIG. 38. One modification carries out upper-end processing in the upper-end portion. The upper-end processing implements the sub-scan by a predetermined feeding amount that is different from the feeding amounts in the standard printing operation.

Figure 39:
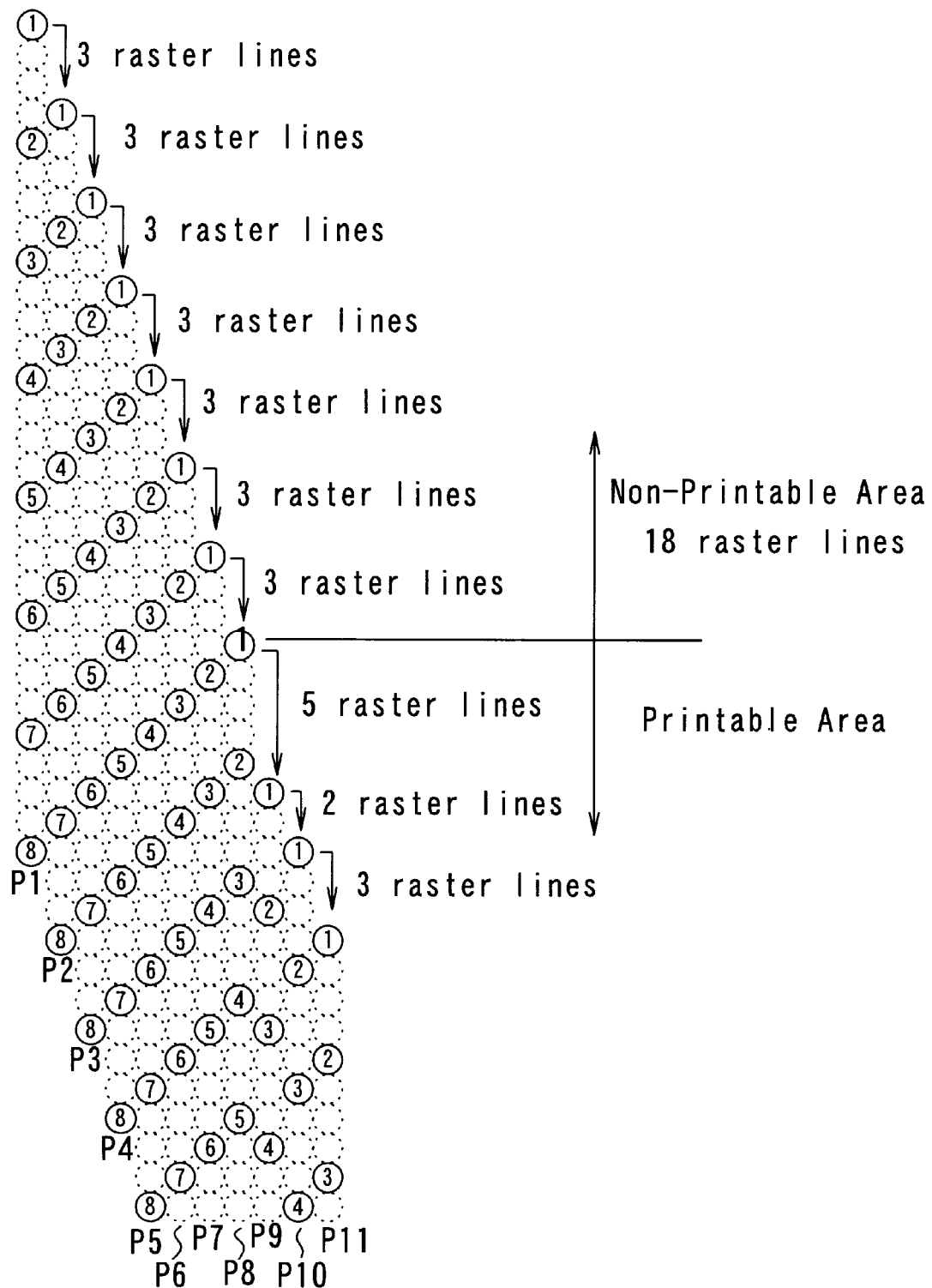
FIG. 39 shows an example of upper-end processing.

FIG. 39 shows an example of the upper-end processing. This upper-end processing is carried out prior to the irregular feeding shown in FIG. 38. Referring to FIG. 39, seven sub-scans are performed by a fixed amount of 3 raster lines, prior to the irregular feeding. There is a non-printable area corresponding to 23 raster lines when no upper-end processing is carried out as shown in the example of FIG. 38. The upper-end processing reduces this non-printable area to the range of 18 raster lines. Other techniques of the upper-end processing may be applied for the printers of the embodiments.

In the above embodiments, the accuracy of sheet feeding is ensured by the rollers in the feeding section as described previously with the drawing of FIG. 4. The principle of the present invention is also applicable to the arrangement in which the accuracy of sheet feeding is ensured by the rollers in the delivering section. In the latter case, opposite to the embodiments discussed above, the procedure carries out the extension printing operation, the intermediate processing, and the standard printing operation in this sequence to record the image from the upper end of the printable area. The arrangements of the above embodiments are applicable for the extension printing area in the vicinity of the upper end of the printable area.

Figure 40:
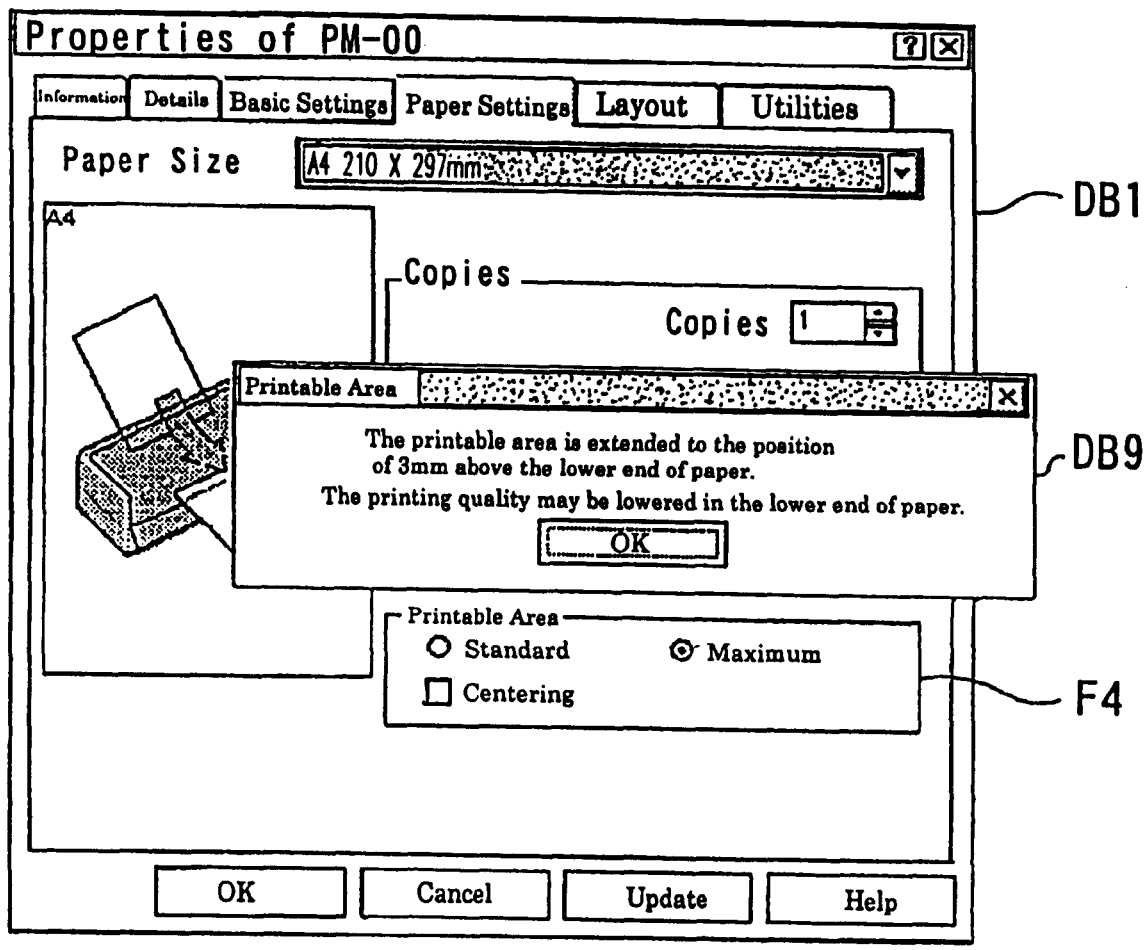
FIG. 40 shows an exemplified window for specifying the print mode.

The following describes the procedure of specifying the print mode in the above embodiments. The user may specify the print mode and other required printing conditions in a window displayed on a CRT 21 (see FIG. 1) connected to the computer 90 in any of the above embodiments. FIG. 40 shows an exemplified window for specifying the printing conditions.

The user selects desired options with respect to a variety of parameters displayed in a dialog box DB1, so as to specify the printing conditions. One of the parameters set by the user is the type of printing paper; possible alternatives include standard paper, superfine paper for high picture quality, and glossy paper. Another parameter is the resolution; possible alternatives include the resolution of 720×720 dpi (dots per inch) for high picture quality and a low resolution for high-speed printing. The user also specifies whether or not printing is carried out in the extension printing area.

Figure 41:
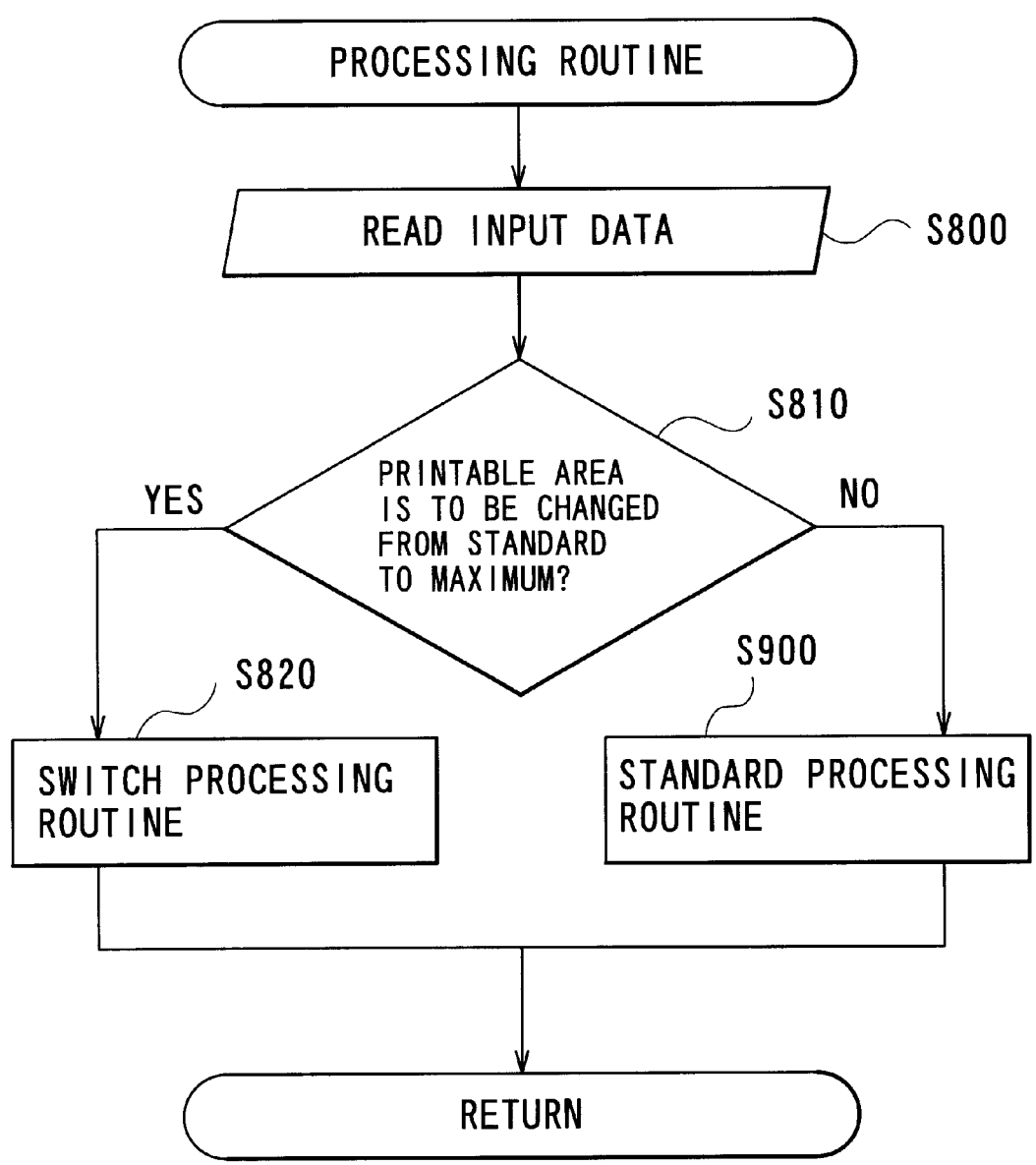
FIG. 41 is a flowchart showing a processing routine for specifying the print mode.

FIG. 41 is a flowchart showing a processing routine carried out in response to the input of these settings. A CPU in the computer 90 executes this processing routine. When the program enters the processing routine of FIG. 41, the CPU first reads input data at step S800. The input data here represent the printing conditions.

The CPU then determines whether or not the specification of the printable area is to be changed from a Standard mode to a Maximum mode at step S810. The extension printing operation is carried out in the Maximum mode but not in the Standard mode. When it is determined that the printable area is not to be changed from the Standard mode to the Maximum mode, that is, when the specification of the printable area is the Standard mode, the program carries out a standard processing routine at step S900. The standard processing routine outputs the settings of the printing resolution and other parameters to the printer 22, based on the input printing conditions.

Figure 42:
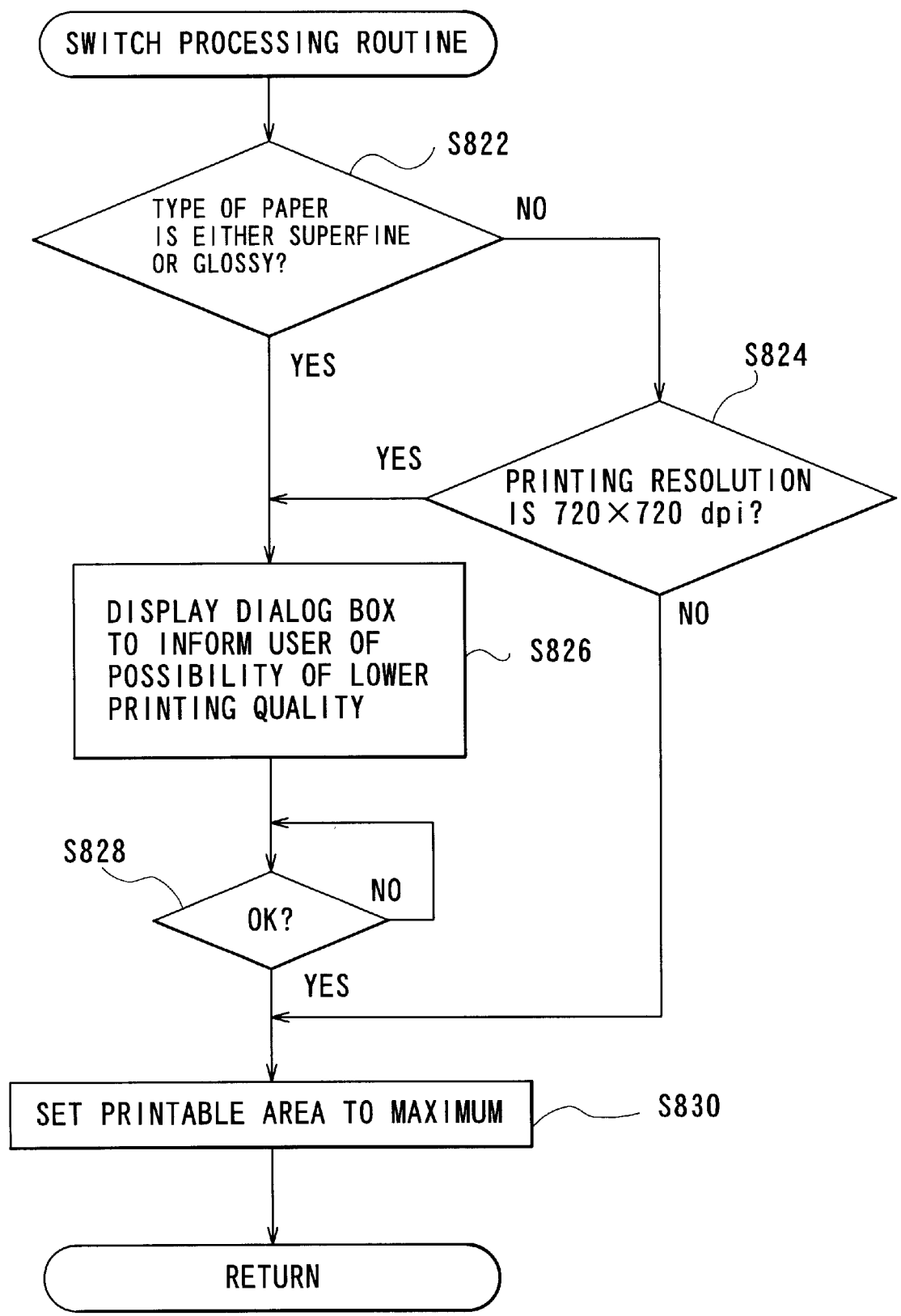
FIG. 42 is a flowchart showing a switch processing routine executed at step S820 in the flowchart of FIG. 41.
Figures 43A, 43B, 43C:
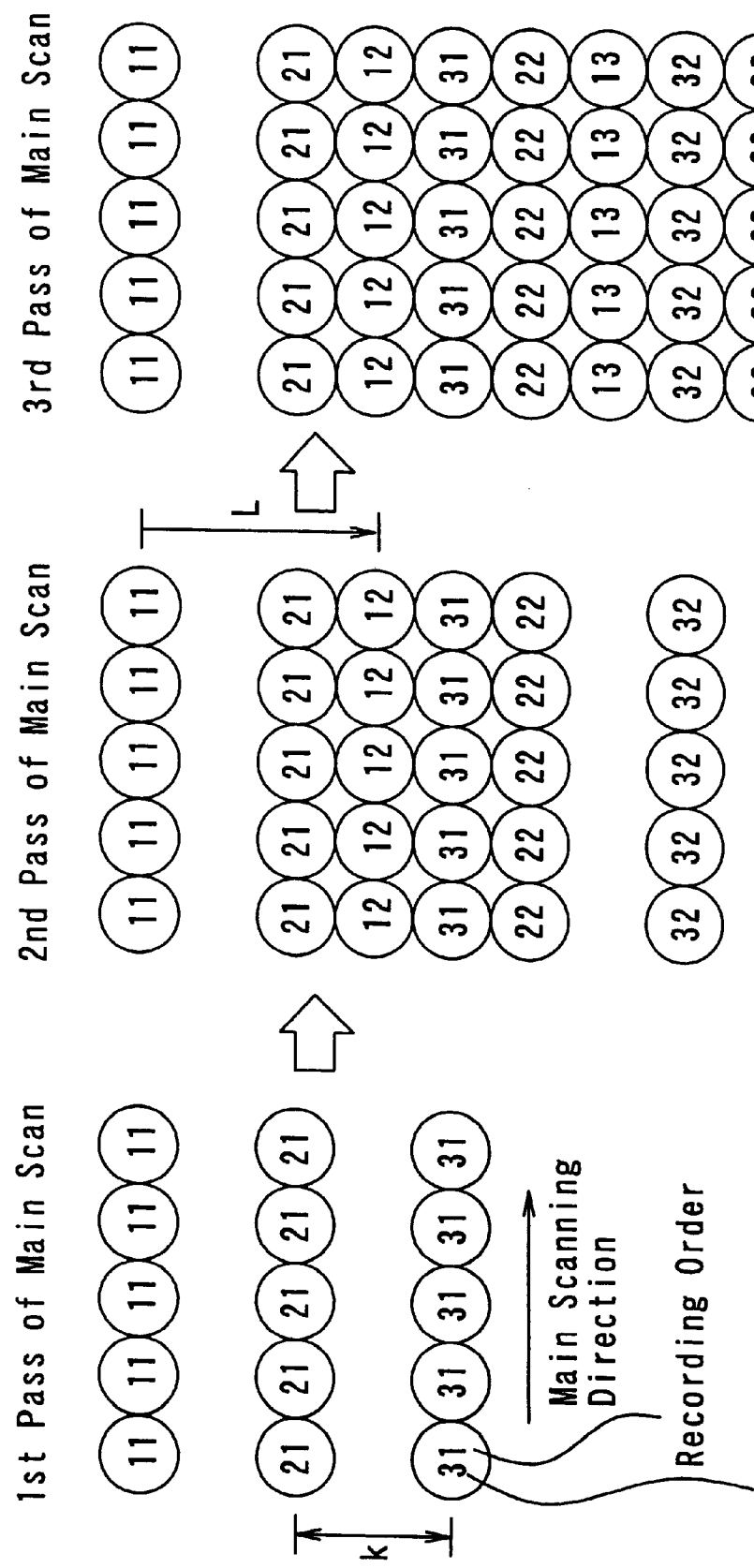
FIG. 43 shows a process of dot recording by the interlace method.

When it is determined that the printable area is to be changed from the Standard mode to the Maximum mode at step S810, on the other hand, the program carries out a switch processing routine at step S820. The flowchart of FIG. 42 shows the details of the switch processing routine executed at step S820 in the flowchart of FIG. 41.

The CPU determines whether or not the input type of printing paper is either one of superfine and glossy paper at step S822 and whether or not the printing resolution is 720×720 dpi at step S824. When either one of the two conditions is satisfied, it is assumed that the user requires printing of the high picture quality. Since the picture quality in the extension printing area is generally lower than the picture quality in the standard printing area, execution of the extension printing operation may result in undesirable picture quality. In this case, the CPU displays a dialog box that informs the user of the possibility of lower picture quality at step S826. An example of the dialog box is given as DB9 in FIG. 40. After the display of the dialog box DB9, the CPU waits for a click of an OK button by the user at step S828 and sets the printable area to the Maximum mode at step S830. When neither of the two conditions is satisfied at steps S822 and S824, it is assumed that the user does not require printing of the high picture quality. The program thus sets the printable area to the Maximum mode at step S830 without the display of the dialog box DB9.

As described above, the printer compares the picture quality realizable in the extension printing area with the picture quality desired by the user and specifies the printable area based on the result of comparison. This arrangement avoids execution of printing with the undesirably low picture quality and thereby prevents the wasteful consumption of printing paper. The relationship between the printing conditions and the printing quality desired by the user may be set arbitrarily. In the above example, the printing paper and the resolution are the parameters used for the determination of the desired picture quality. The determination of the desired picture quality may be based on whether or not the image data represents a photograph or whether or not the specified size of dots is other than the large diameter.

All the above embodiments carry out the intermediate processing between the standard printing operation and the extension printing operation. One possible modification omits the intermediate processing and carries out the extension printing operation immediately after the standard printing operation. The arrangements of the above embodiments are applicable for the extension printing operation in this case.

In all the above embodiments, the CPU 41 incorporated in the printer 22 executes the dot creation control shown in the flowcharts of FIGS. 12 and 13. This structure enables the printer driver 96 to output the image data of a fixed format irrespective of the method of dot creation and thereby reduces the processing load of the computer 90. In accordance with one possible modification, the printer driver 96 may set the data for dot creation in the dot creation control routine discussed above. In this case, the dot data to be created in the first pass of the main scan, the sheet feeding amount of the sub-scan, the dot data to be created in the second pass of the main scan, . . . , are successively transferred to the printer 22. The format of the image data output from the printer driver 96 should be varied according to the method of dot creation. This structure, however, facilitates a change to a later version and enables a new dot recording method to be actualized without changing the PROM 42 and the other related elements of the printer 22.

In the printers of the embodiments, the computer carries out the control of the head to record the dots. Another application of the present invention is a recording medium, in which a program for actualizing the control procedure is recorded. Available examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media. Still another application of the invention is a program supply apparatus that supplies a computer program, which causes the computer to carry out the control procedure of the head and record the dots, to the computer via a communications path.

The present invention is not restricted to the above embodiments or their modifications, but there may be many other modifications, changes, and alterations without departing from the scope or spirit of the main characteristics of the present invention. The above embodiments regard the printer that forms raster lines while the head carries out the main scan. The principle of the present invention is, however, applicable to other printers, for example, a line printer that forms raster lines without the main scan. The principle of the present invention is also applicable to color printers with various numbers of color inks as well as to monochromatic printers.

It should be clearly understood that the above embodiments are only illustrative and not restrictive in any sense. The scope and spirit of the present invention are limited only by the terms of the appended claims.

What is claimed is:

1. A printer that forms a plurality of raster lines with a head, each of the raster lines comprising an array of dots aligned in a raster-forming direction, which is one direction of a printing medium, and carries out a sub-scan that moves said printing medium in a sub-scanning direction, which is another direction crossing the raster-forming direction, thereby printing an image corresponding to input image data on said printing medium, said printer comprising:

said head having a plurality of nozzles configured to create dots of an identical color and arranged in the sub-scanning direction at a fixed interval;

a raster-forming unit that drives said head to form the plurality of raster lines;

a first sub-scan unit that carries out the sub-scan with a first accuracy;

a second sub-scan unit that carries out the sub-scan with a second accuracy, which is lower than the first accuracy, when said printing medium is located at a predetermined position;

a first control unit that controls said first sub-scan unit and said raster-forming unit in a first area where said first sub-scan unit carries out the sub-scan to record the image; and a second control unit that controls said second sub-scan unit and said raster-forming unit in a second area where said second sub-scan unit carries out the sub-scan, to compensate for a decrease in accuracy of the sub-scan and form the raster lines.

2. A printer in accordance with claim 1, wherein said second control unit controls said raster-forming unit and said second sub-scan unit to form the raster lines while carrying out the sub-scan in the second area by a predetermined amount of sheet feeding that is smaller than a mean amount of sheet feeding in the first area.

3. A printer in accordance with claim 2, wherein the predetermined amount of sheet feeding by said second control unit is equal to one raster line.

4. A printer in accordance with claim 2, wherein said second control unit carries out the sub-scan to enable adjoining raster lines to be formed with different nozzles included in a set of nozzles selected as raster-forming nozzles among the plurality of nozzles mounted on said head.

5. A printer in accordance with claim 4, wherein said second control unit carries out the sub-scan by an amount of sheet feeding that makes a frequency of variation in interval between adjoining raster lines significantly greater than 1 cycle/mm.

6. A printer in accordance with claim 4, wherein said second control unit carries out the sub-scan by an amount of sheet feeding that reduces a number of adjoining raster lines formed by consecutive passes of main scan to be less than k, when the plurality of nozzles are arranged at the predetermined interval corresponding to k raster lines, where k is an integer of not less than 2.

7. A printer in accordance with claim 6, wherein said raster-forming unit forms the raster lines while carrying out the main scan that moves said head forward and backward relative to said printing medium, and said second control unit carries out the sub-scan by a fixed amount of sheet feeding equal to N/s, where s is a natural number and represents a number of passes of the main scan required to form each raster line and N represents a number of the selected nozzles and is a value that is prime to k and excludes a range of k·s±1.

8. A printer in accordance with claim 1, wherein said raster-forming unit drives said head to form the raster lines while carrying out main scan that moves said head forward and backward relative to said printing medium, and said second control unit controls said raster-forming unit and said second sub-scan unit to form each raster line in the second area by a certain number of passes of the main scan, which is less than a number of passes of the main scan required to form each raster line in the first area.

9. A printer in accordance with claim 1, wherein said head enables at least two different types of dots having different amounts of ink to be created by a plurality of nozzles provided for each color and arranged in the sub-scanning direction, and said second control unit controls said raster-forming unit to create dots having a greater amount of ink in the second area at a predetermined ratio that is higher than a ratio in the first area.

10. A printer in accordance with claim 1, wherein said first control unit carries out the sub-scan by a predetermined the amount of sheet feeding that enables adjoining raster lines to be formed by different nozzles in a predetermined section of the first area that does not adjoin to the second area, and carries out the sub-scan by a second predetermined amount of sheet feeding different than the first predetermined amount in a middle area that adjoins to both the predetermined section of the first area and the second area.

11. A printer in accordance with claim 10, wherein said head has p nozzles arranged at intervals of n raster lines in the sub-scanning direction, where p is an integer of not less than 2 and n is an integer of not less than 2, and the middle area is within m+1 raster lines, where m denotes an integer of p×(n−1).

12. A printer in accordance with claim 10, wherein the sub-scan in the middle area causes adjoining raster lines to be formed with different nozzles.

13. A printer in accordance with claim 10, wherein the sub-scan in the middle area has a feeding amount of one raster line.

14. A printer in accordance with claim 1, said printer further comprising:

a memory that stores a correlation, which determines whether or not a printing quality corresponding to each possible choice of a parameter is realizable by said second control unit;

a quality input unit that inputs a desired choice of the parameter;

a print mode specification unit that inputs an instruction of execution of printing by said second control unit; and a restriction unit that refers to the correlation and, when it is determined that a printing quality corresponding to the input choice of the parameter is not realizable by said second control unit, restricts the input of said print mode specification unit.

15. A method of forming a plurality of raster lines with a head, each raster line comprising an array of dots aligned in a raster-forming direction, which is one direction of a printing medium, and carrying out a sub-scan that moves said head in a sub-scanning direction, which is another direction crossing the raster-forming direction, relative to said printing medium, thereby printing an image corresponding to input image data on said printing medium, said head having a plurality of nozzles configured to create dots of an identical color and arranged in the sub-scanning direction at a fixed interval, said method comprising the steps of:
(a) carrying out the sub-scan with a first accuracy to form the raster lines in a first area on said printing medium; and
(b) carrying out the sub-scan with a second accuracy, which is lower than the first accuracy, to form the raster lines in a second area, where the sub-scan with the first accuracy is not allowable, in such a manner that compensates for a decrease in accuracy of the sub-scan.

16. A method in accordance with claim 15, wherein said step (b) carries out the sub-scan by a predetermined amount of sheet feeding that is smaller than a mean amount of sheet feeding in said step (a).

17. A method in accordance with claim 16, wherein said step (b) carries out the sub-scan to enable adjoining raster lines to be formed with different nozzles included in a set of nozzles selected as raster-forming nozzles among the plurality of nozzles mounted on said head.

18. A method in accordance with claim 15, wherein said step (a) forms the raster lines while carrying out main scan that moves said head forward and backward relative to said printing medium, and said step (b) forms each raster line in the second area by a certain number of passes of the main scan, which is less than a number of passes of the main scan required to form each raster line in the first area in said step (a).

19. A method in accordance with claim 15, wherein said head enables at least two different types of dots having different amounts of ink to be created by a plurality of nozzles provided for each color and arranged in the sub-scanning direction, and a ratio of creating dots having a greater amount of ink is higher in said step (b) than in said step (a).

20. A computer program product, in which a program for causing a printer to form raster lines and carry out a sub-scan in order to print an image on a printing medium is recorded in a computer readable manner, said program causing a computer to carry out the functions of:
dividing a printable area, in which the image is configured to be recorded, into a first area where the sub-scan is carried out with a first accuracy and a second area where the sub-scan is carried out with a second accuracy, which is lower than the first accuracy; and outputting a control signal to carry out the sub-scan in the second area by a predetermined amount of sheet feeding that is smaller than a mean amount of sheet feeding in the first area.

21. A computer program product in accordance with claim 20, wherein the predetermined amount of sheet feeding in the second area enables adjoining raster lines to be formed with different nozzles included in a set of nozzles selected as raster-forming nozzles among a plurality of nozzles provided in said printer.

22. A computer program product, in which a program for causing a printer to form raster lines and carry out a sub-scan in order to print an image on a printing medium is recorded in a computer readable manner, said program causing a computer to carry out the functions of:
dividing a printable area, in which the image is configured to be recorded, into a first area where the sub-scan is carried out with a first accuracy and a second area where the sub-scan is carried out with a second accuracy, which is lower than the first accuracy; and outputting a control signal to form each raster line in the second area by a certain number of passes of the main scan, which is less than a number of passes of the main scan required to form each raster line in the first area.

23. A computer program product, in which a program for causing a printer, which enables creation of at least two different types of dots having different amounts of ink, to create dots and carry out a sub-scan in order to print an image on a printing medium is recorded in a computer readable manner, said program causing a computer to carry out the functions of:
dividing a printable area, in which the image is configured to be recorded, into a first area where the sub-scan is carried out with a first accuracy and a second area where the sub-scan is carried out with a second accuracy, which is lower than the first accuracy; and outputting a control signal to create dots having a greater amount of ink in the second area at a predetermined ratio that is higher than a ratio in the first area.

24. A computer program product, in which a program for causing a printer, which carries out two different types of sub-scan having different accuracy, to print an image on a printing medium is recorded in a computer readable manner, said program causing a computer to carry out the functions of:
storing a correlation, which determines whether or not a printing quality corresponding to each possible choice of a parameter is realizable by the sub-scan of lower accuracy;

inputting a desired choice of the parameter;

inputting a specific print mode that instructs execution of printing with the sub-scan of lower accuracy; and referring to the correlation and, when it is determined that a printing quality corresponding to the input choice of the parameter is not realizable by the sub-scan of lower accuracy, restricting the input of the specific print mode.

* * * * *